United States Patent
Taguchi

(10) Patent No.: US 9,350,834 B2
(45) Date of Patent: May 24, 2016

(54) DEVICE COMPRISING HOUSINGS

(75) Inventor: Hirofumi Taguchi, Higashiyamato (JP)

(73) Assignee: NEC CORPORATION, Tokyo (JP)

( * ) Notice: Subject to any disclaimer, the term of this patent is extended or adjusted under 35 U.S.C. 154(b) by 697 days.

(21) Appl. No.: 13/551,114

(22) Filed: Jul. 17, 2012

(65) Prior Publication Data
US 2012/0282984 A1 Nov. 8, 2012

Related U.S. Application Data

(62) Division of application No. 12/868,854, filed on Aug. 26, 2010, now Pat. No. 8,787,992.

(30) Foreign Application Priority Data

Aug. 28, 2009 (JP) ................................. 2009-197689
May 31, 2010 (JP) ................................. 2010-125380

(51) Int. Cl.
*H04M 1/00* (2006.01)
*H04M 1/02* (2006.01)
(Continued)

(52) U.S. Cl.
CPC ........... *H04M 1/0214* (2013.01); *G06F 1/1616* (2013.01); *G06F 1/1622* (2013.01); *G06F 1/1624* (2013.01); *G06F 1/1681* (2013.01);
(Continued)

(58) Field of Classification Search
CPC .. H04B 10/11; H04M 1/7253; H04M 1/0214; H04M 1/0216; H04M 1/0233; H04M 1/0237; H04M 1/0249; H04M 1/0266; H04M 2250/16; H04W 4/027; H04W 4/043; H04W 52/0251

USPC .......................... 455/575.1–575.9, 90.1–90.3
See application file for complete search history.

(56) References Cited

U.S. PATENT DOCUMENTS

| 6,892,082 B2 | 5/2005 | Boesen |
| 7,065,835 B2 | 6/2006 | Kuramochi |
| 7,278,184 B2 | 10/2007 | Kuramochi |

(Continued)

FOREIGN PATENT DOCUMENTS

| CN | 1929504 | 3/2007 |
| CN | 1929504 A | * 3/2007 |

(Continued)

OTHER PUBLICATIONS

JP Office Action dated Dec. 10, 2013, with English Translation; Application No. 2010-125380.

(Continued)

*Primary Examiner* — Lana N Le
(74) *Attorney, Agent, or Firm* — Young & Thompson

(57) ABSTRACT

The portable telephone of the invention comprises two housings having a display screen on one of the housings, a first connection section that connects the two housings such that the housings can be opened and closed in a first direction, and a second connection section that connects the two housings such that the housings can move from an overlapped state in a second direction that is different than the first direction such that step is formed on the end sections of the housings. When the portable telephone is placed on a flat surface such as a desk, the portable telephones stably stands on its own by way of the step with the display screen facing upward at an angle. Therefore, the angle between the display screen and the line of sight of the user becomes nearly perpendicular, so the display screen is easy for the user to see.

3 Claims, 58 Drawing Sheets

(51) Int. Cl.
*G06F 1/16* (2006.01)
*H04M 1/04* (2006.01)

(52) U.S. Cl.
CPC .......... *H04M 1/0212* (2013.01); *H04M 1/0237* (2013.01); *H04M 1/04* (2013.01)

(56) References Cited

U.S. PATENT DOCUMENTS

| | | |
|---|---|---|
| 7,599,487 B2 | 10/2009 | Lim |
| 7,813,776 B2 | 10/2010 | Lee et al. |
| 7,877,125 B2 | 1/2011 | Takizawa et al. |
| 8,024,019 B2 * | 9/2011 | Miyaoka .................... 455/575.4 |
| 8,233,948 B2 * | 7/2012 | Francisco et al. .......... 455/575.4 |
| 8,249,669 B2 * | 8/2012 | Jeong .................. H04M 1/0237 455/575.1 |
| 8,811,012 B2 * | 8/2014 | Moon et al. ................ 455/575.1 |
| 2003/0125081 A1 | 7/2003 | Boesen |
| 2006/0256960 A1 | 11/2006 | Bae et al. |
| 2006/0258413 A1 * | 11/2006 | Park ........................... 455/575.4 |
| 2007/0032278 A1 * | 2/2007 | Lee ..................... H04M 1/0247 455/575.4 |
| 2008/0161075 A1 * | 7/2008 | Kim et al. ................... 455/575.4 |
| 2009/0017875 A1 | 1/2009 | Boesen |
| 2009/0036181 A1 * | 2/2009 | Lee ..................... H04M 1/0237 455/575.4 |
| 2010/0157517 A1 * | 6/2010 | Bestle et al. ............. 361/679.08 |
| 2010/0323772 A1 * | 12/2010 | Kiryu .................. H04M 1/0245 455/575.4 |

FOREIGN PATENT DOCUMENTS

| | | |
|---|---|---|
| JP | 05-108229 | 4/1993 |
| JP | 2004-215180 | 7/2004 |
| JP | 2004-235687 | 8/2004 |
| JP | 2005-061559 | 3/2005 |
| JP | 2006-128982 | 5/2006 |
| JP | 2006-270836 | 10/2006 |
| JP | 2007-074411 | 3/2007 |
| JP | 2007-132508 | 5/2007 |
| JP | 2007-181050 | 7/2007 |
| JP | 2008-301244 | 12/2008 |
| JP | 2009-055137 | 3/2009 |
| JP | 2009-059102 | 3/2009 |
| JP | 2009-081704 | 4/2009 |
| JP | 2009-100086 | 5/2009 |
| JP | 2009-138790 | 6/2009 |
| JP | 2009-186710 | 8/2009 |

OTHER PUBLICATIONS

Official Action issued Sep. 27, 2012 in U.S. Appl. No. 12/868,854.
CN Office Action dated Sep. 4, 2013, with English translation; Application No. 201010267662.7.

* cited by examiner

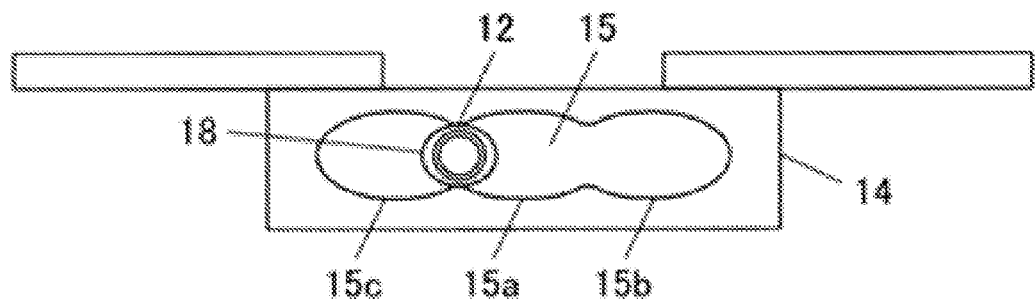
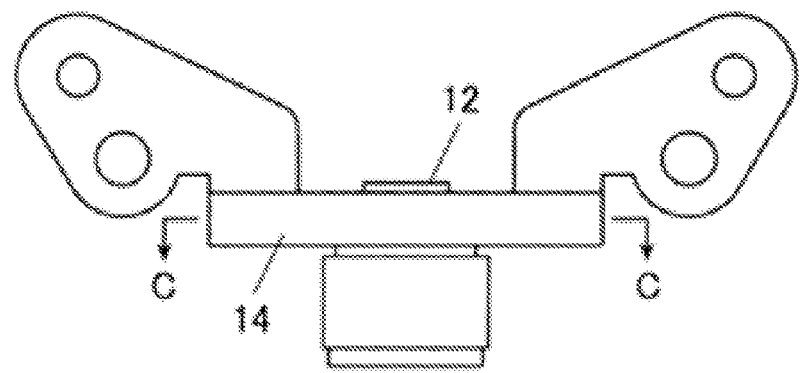
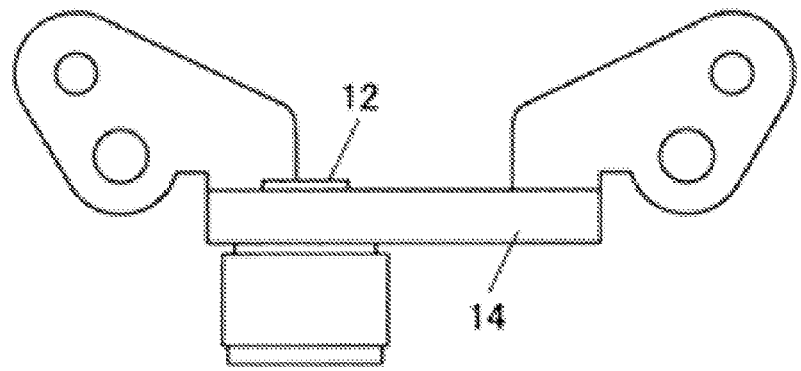

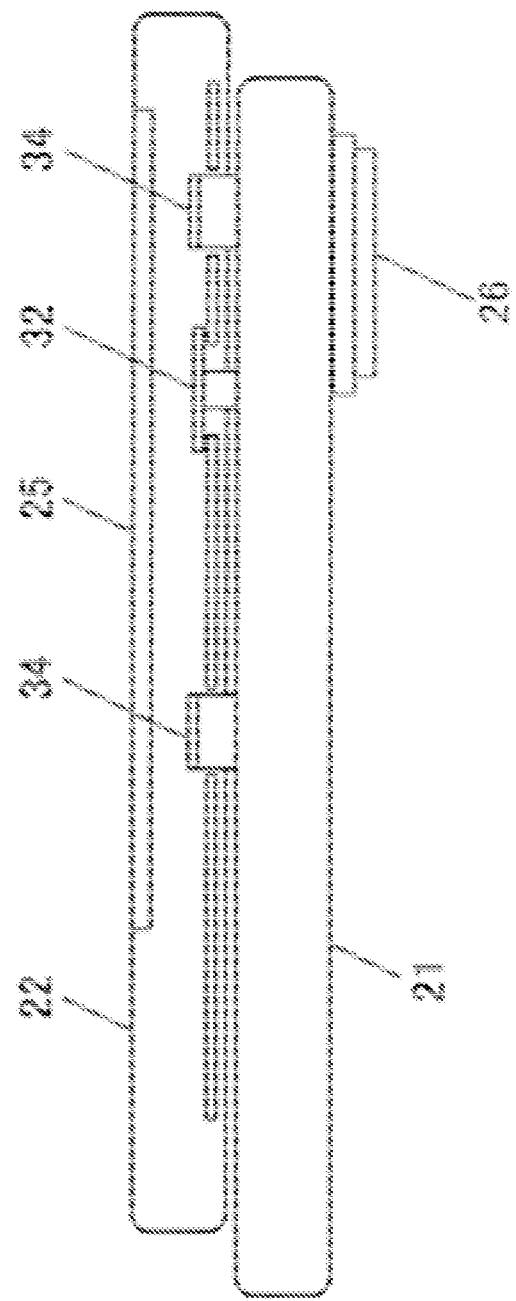

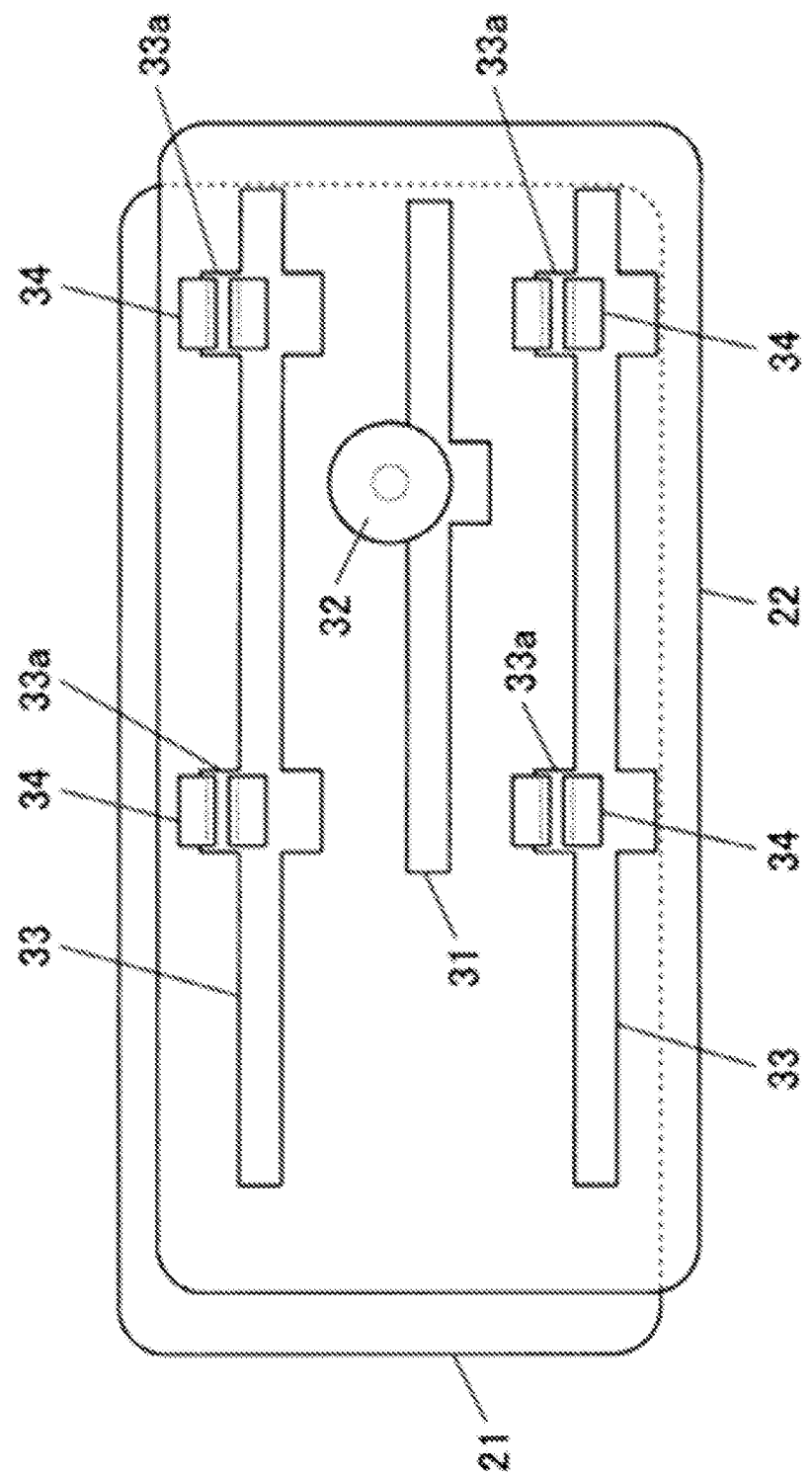

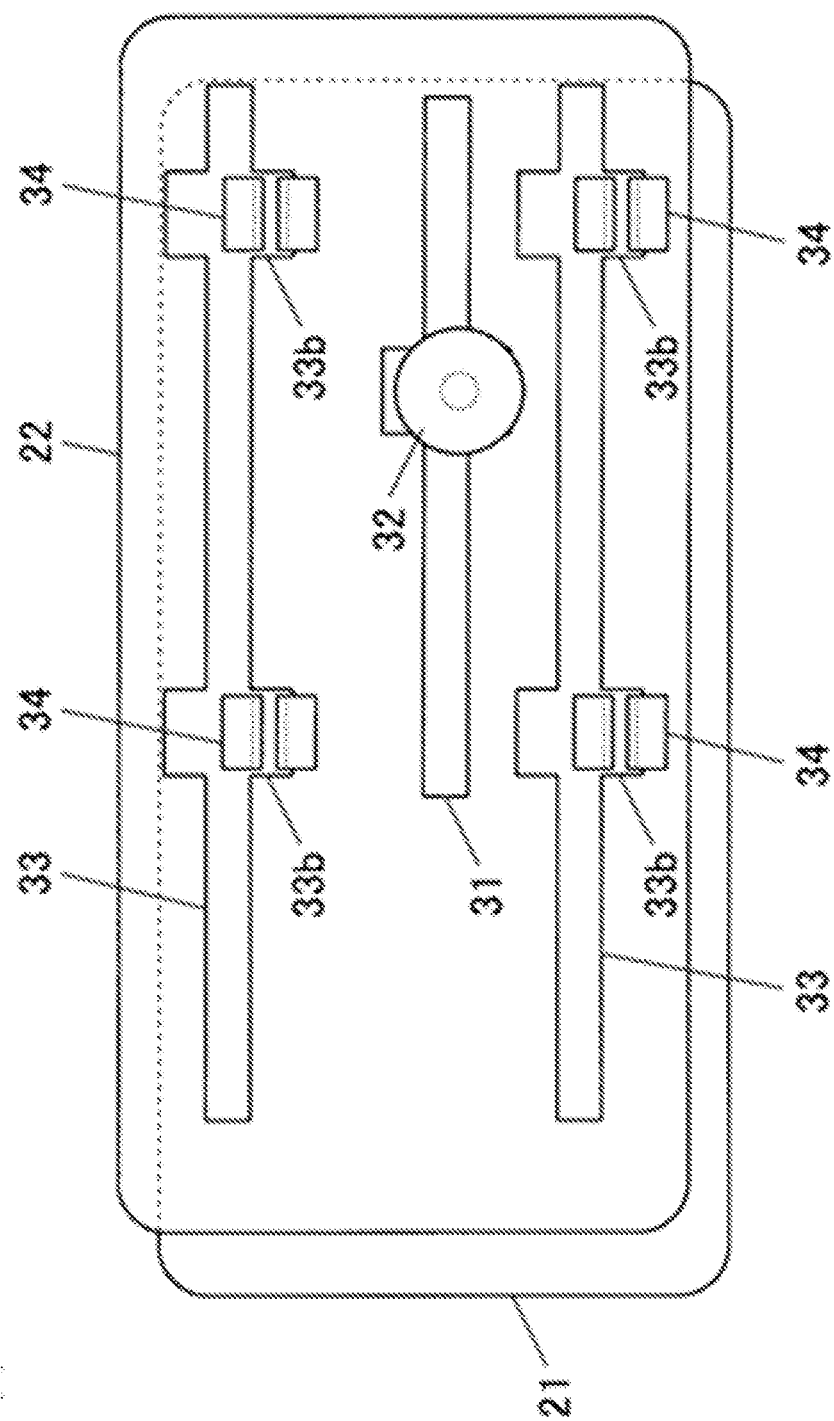

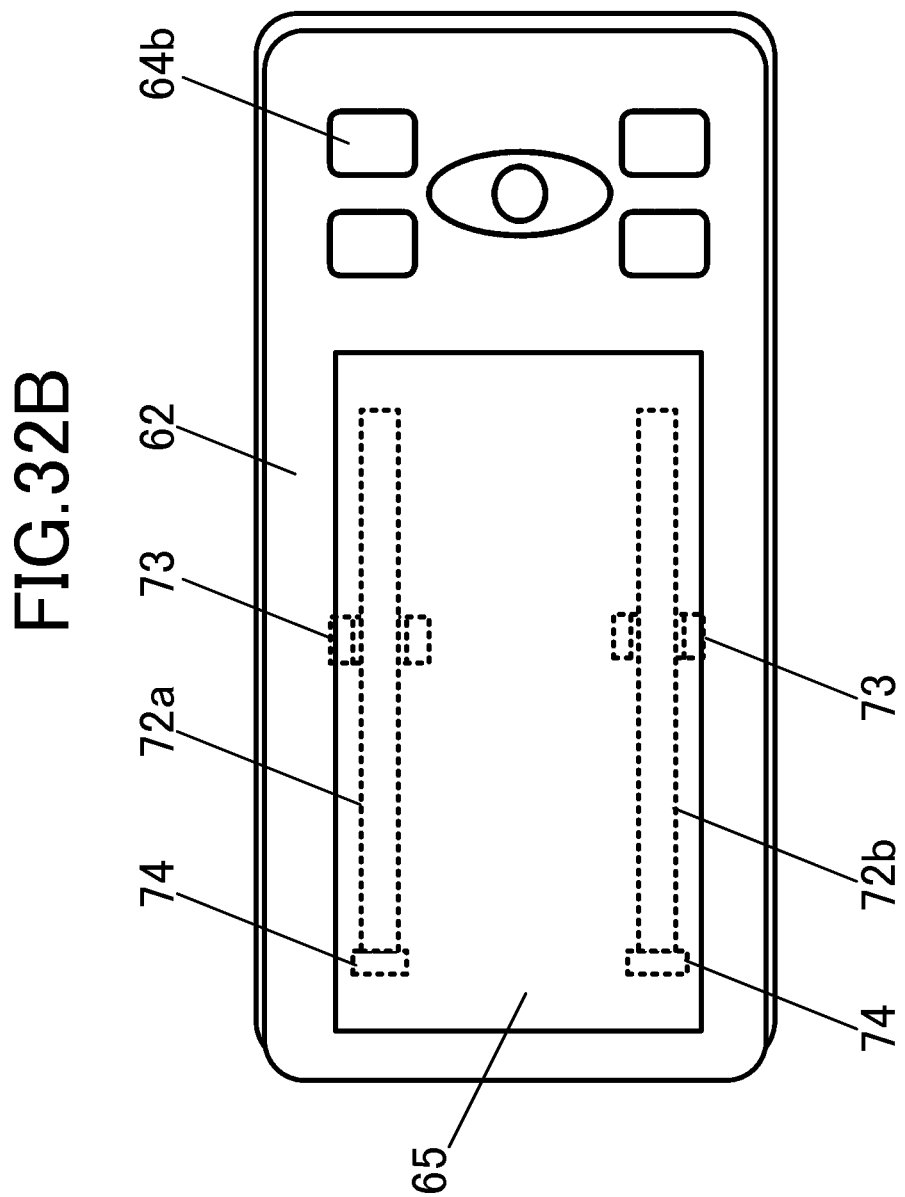

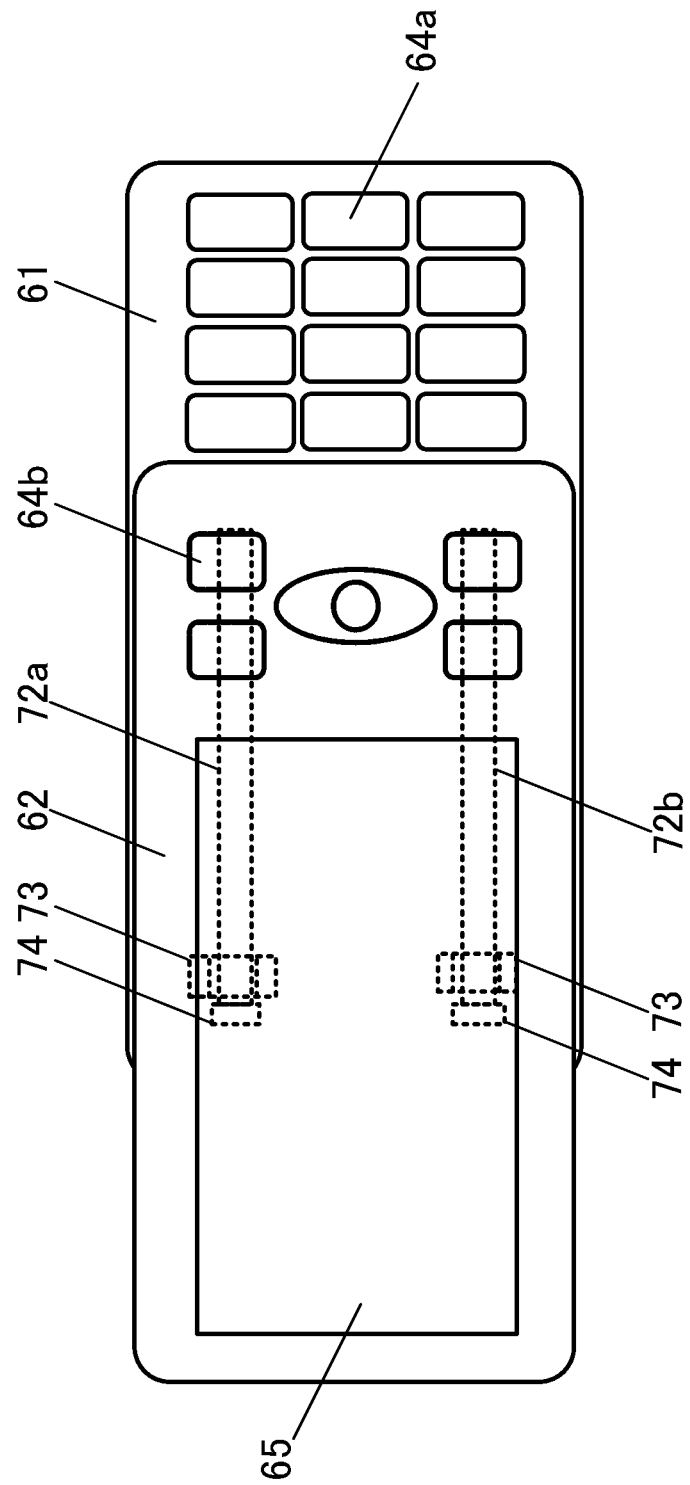

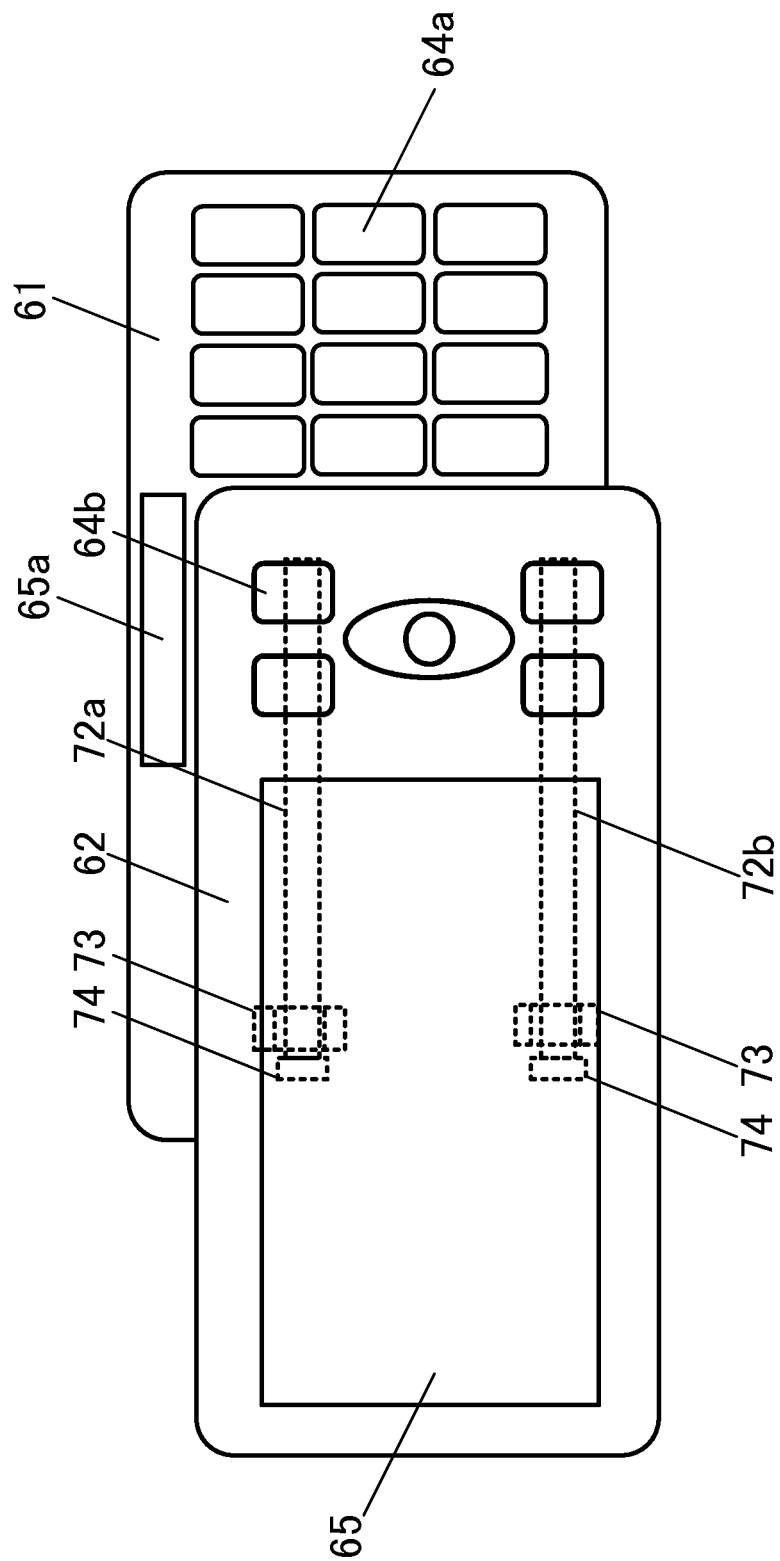

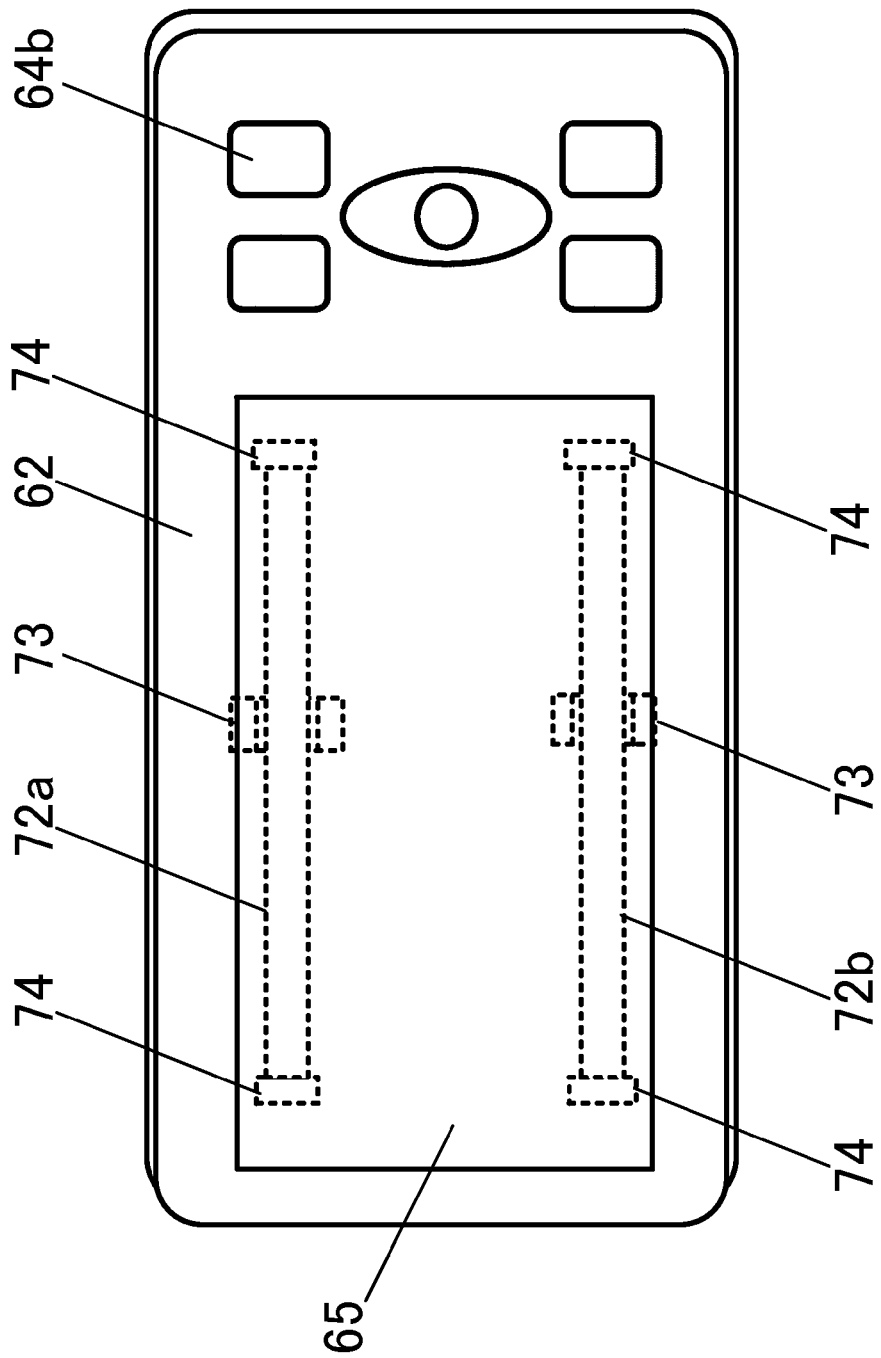

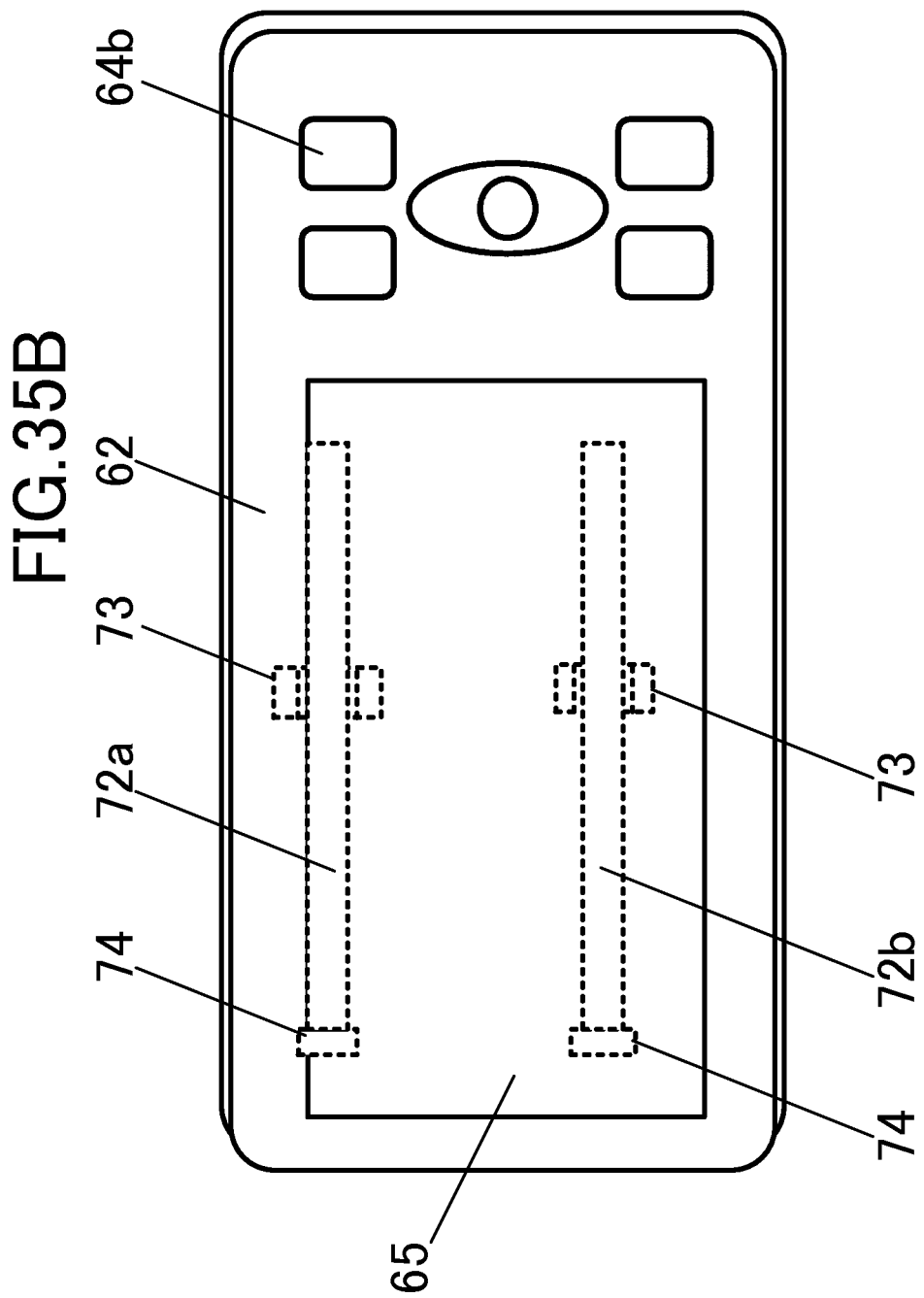

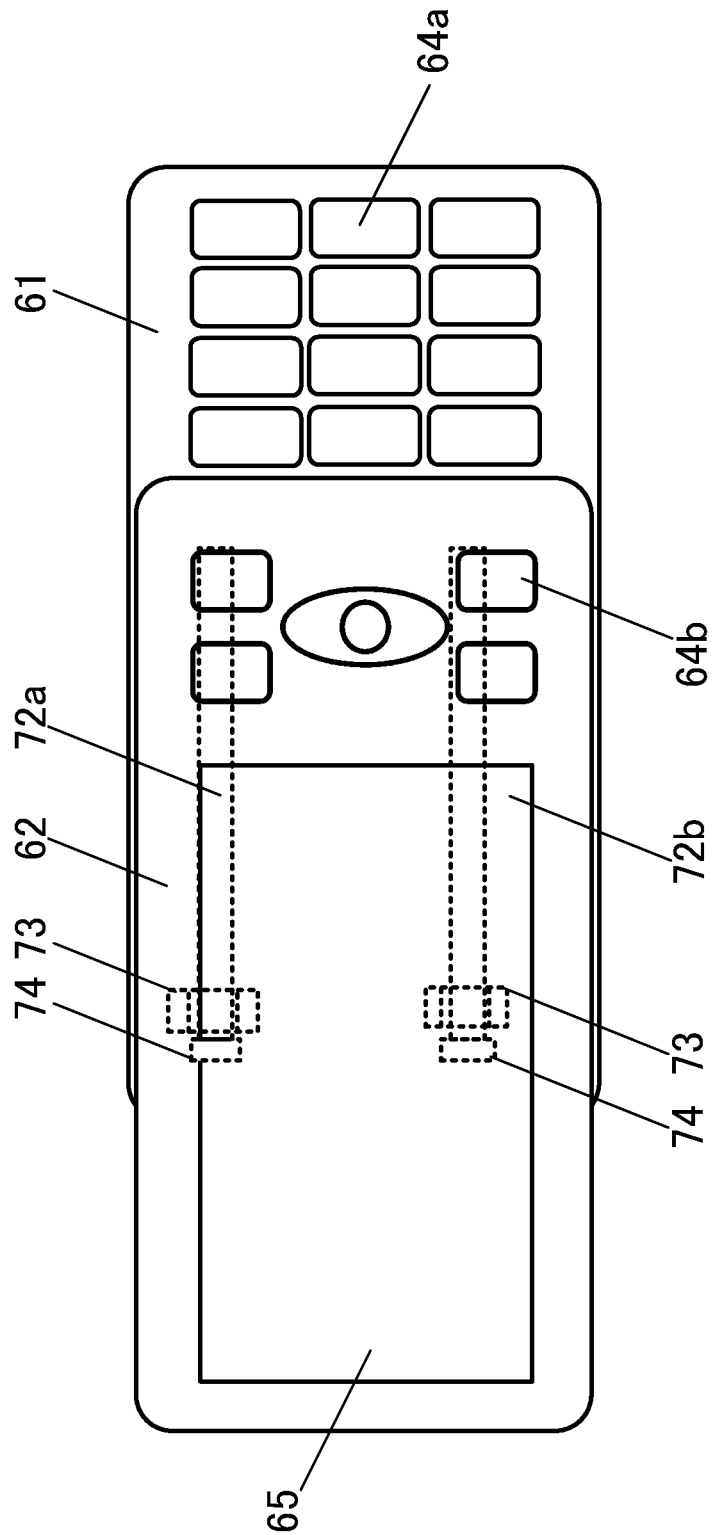

FIG.40C
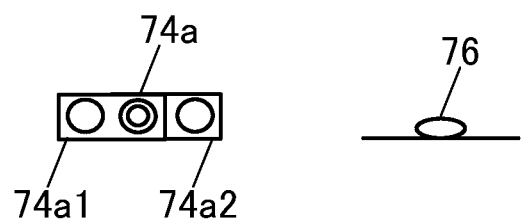
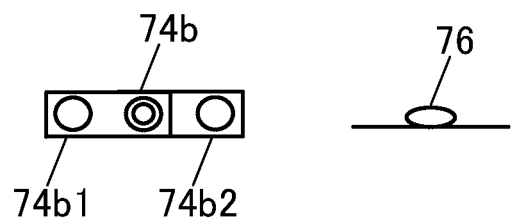

FIG. 43A
FIG. 43B
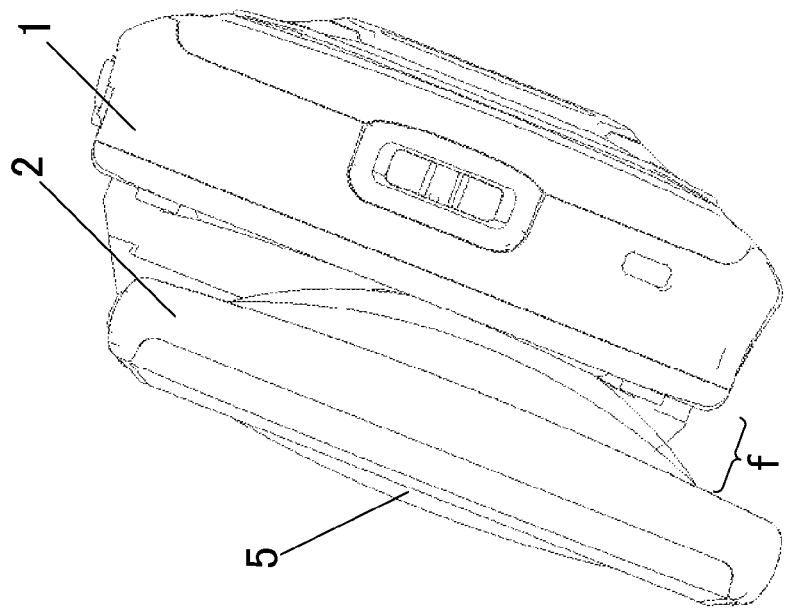
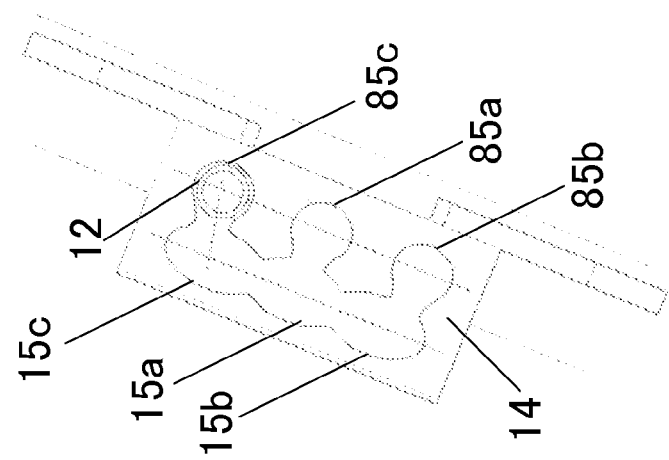

12

12

12

DEVICE COMPRISING HOUSINGS

CROSS REFERENCE TO RELATED APPLICATIONS

This application is a division of co-pending application Ser. No. 12/868,854 filed on Aug. 26, 2010, which claims foreign priority to Japanese Patent Application No. 2009-197689, filed Aug. 28, 2009 and Japanese Patent Application No. 2010-125380, filed May 31, 2010. The entire content of each of these applications is hereby expressly incorporated by reference.

TECHNICAL FIELD

The present invention relates to a device having construction in which two housings overlap, and to a portable device comprising this housing construction.

BACKGROUND ART

Unexamined Japanese Patent Application KOKAI Publication No. 2006-128982 discloses a portable telephone comprising construction in which two housings overlap. This portable telephone, when opened in the lengthwise direction for speaking or using an e-mail function, for example, is used as a vertical screen. Moreover, this portable telephone, when folded such that the screen is on top for using a television function, for example, is used as a horizontal screen.

SUMMARY

A device comprising construction in which two housings overlap may be placed in a closed state on a table or desk and used while providing one surface thereof to the user. In this state, in order for the user to use the provided surface efficiently, it is preferred that the angle between the line that connects the user and the device and provided surface be close to being perpendicular. For example, in the case of the portable telephone of Unexamined Japanese Patent Application KOKAI Publication No. 2006-128982, when folded so that the screen is on top and used as a horizontal screen, for example, for using the television function, preferably the portable telephone can be used when placed on a table or desk. However, in the case of the portable telephone of Unexamined Japanese Patent Application KOKAI Publication No. 2006-128982, the screen stands perpendicular with respect to the desk when placed on a desk. Therefore, the line that connects the user and portable telephone is not perpendicular to the screen. Consequently, when using the television function, the screen is difficult for the user to see. Typically, in the case of a device comprising construction in which two housings overlap, when the device is used by placing the device on a desk and providing one surface to the user, the line of sight of the user is not perpendicular to that surface, so the surface is difficult for the user to use.

The same problem occurs for the surface in which the camera lens (line of sight) of the device is provided. In other words, it is difficult for the user to be within the view angle of the camera located in a device comprising construction in which a plurality of housings overlap.

The exemplary object of the present invention is to make it easier to face one surface of a device comprising construction in which a plurality of housings overlap toward the user when the device is placed on table or desk with the housings in an overlapped state.

In order to accomplish the exemplary object described above, a device of a first exemplary aspect of the invention includes:
a first housing including a first end section;
a second housing including a second end section; and
a first connection section and a second connection section that connect the first housing and the second housing; wherein
the first connection section connects the first housing and the second housing such that the first housing is movable with respect to the second housing along a first direction; and
the second connection section connects the first housing and the second housing such that the first housing is movable with respect to the second housing along a second direction that is different from the first direction, between a position where the first housing and the second housing are overlapped so that the first end section flushes with the second end section, and a position where the first housing and the second housing are overlapped so as to make a step between the first end section and the second end section.

In order to accomplish the exemplary object described above, a device of a second exemplary aspect of the invention includes:
a first housing including a first end section;
a second housing including a second end section; and
a first connection section and a second connection section that connect the first housing and the second housing; wherein
the first connection section connects the first housing and the second housing such that the first housing is movable with respect to the second housing along a first direction; and
the second connection section connects the first housing and the second housing such that the first housing is movable with respect to the second housing along a second direction that is different from the first direction, between a position where the first housing and the second housing are overlapped so that the first end section flushes with the second end section, and a position where the first housing is apart from the second housing by a specified distance while maintaining that the first end section flushes with the second end section.

In order to accomplish the exemplary object described above, a device of a third exemplary aspect of the invention includes:
a first housing including a first end section;
a second housing including a second end section; and
a first connection means and a second connection means that connect the first housing and the second housing; wherein
the first connection means connects the first housing and the second housing such that the first housing is movable with respect to the second housing along a first direction; and
the second connection means connects the first housing and the second housing such that the first housing is movable with respect to the second housing along a second direction that is different from the first direction, between a position where the first housing and the second housing are overlapped so that the first end section flushes with the second end section, and a position where the first housing and the second housing are overlapped so as to make a step between the first end section and the second end section.

In order to accomplish the exemplary object described above, a device of a fourth exemplary aspect of the invention includes:
a first housing including a first end section;
a second housing including a second end section; and a first connection means and a second connection means that connect the first housing and the second housing; wherein the first connection means connects the first housing and the second housing such that the first housing is movable with respect to the second housing along a first direction; and the second connection means connects the first housing and the second housing such that the first housing is movable with respect to the second housing along a second direction that is different from the first direction, between a position where the first housing and the second housing are overlapped so that the first end section flushes with the second end section, and a position where the first housing is apart from the second housing by a specified distance while maintaining that the first end section flushes with the second end section.

A portable telephone of the invention that is placed in view style on a surface such as a desk stands on its own such that it is inclined a little with respect to the desk. Therefore, the screen of the portable telephone is at nearly a perpendicular angle with the line of sight of the user, so the screen of the portable telephone becomes easy to see.

BRIEF DESCRIPTION OF THE DRAWINGS

A more complete understanding of this application can be obtained when the following detailed description is considered in conjunction with the following drawings, in which:

FIG. 18B is a diagram illustrating the relationship between the slide member and second rotating shaft illustrated in FIG. 18A.

FIG. 19A is a top view of the slide member and second rotating shaft of a portable telephone of a sixth variation of the first exemplary embodiment.

FIG. 19B is a top view illustrating the slide member and second rotating shaft illustrated in FIG. 19A when the positional relationship is changed.

FIG. 23C is a side view illustrating the slide mechanism of a slide-type portable telephone of a second exemplary embodiment.

FIG. 26A is a front view of the portable telephone illustrated in FIGS. 23A to 23C when slid to one side in the crosswise direction.

FIG. 27A is a front view of the portable telephone illustrated in FIGS. 23A to 23C when slid to the other side in the crosswise direction.

FIG. 32B is a front view of the normal state of a slide-type portable telephone of a fifth exemplary embodiment.

FIG. 32C is a front view of the slide-type portable telephone of a fifth exemplary embodiment when slid in the lengthwise direction.

FIG. 33B is a front view of the portable telephone illustrated in FIG. 33A.

FIG. 34 is a front view of a slide-type portable telephone of a variation of the fifth exemplary embodiment.

FIG. 35B is a front view of the normal state of a slide-type portable telephone of a sixth exemplary embodiment.

FIG. 35C is a front view of the normal state of a slide-type portable telephone of a sixth exemplary embodiment when slid in the lengthwise direction.

FIG. 40C is a diagram illustrating the extended state of the arm section and torsion coil spring of a slide-type portable telephone of a tenth variation.

FIG. 43A is a diagram illustrating the positional relationship between a slide member and second rotating shaft of the portable telephone illustrated in FIGS. 42A and 42B when a first housing and the second housing are slid in the separating direction after being slid in the crosswise direction.

FIG. 43B is a side view of the portable telephone illustrated in FIGS. 42A and 42B when a first housing and second housing are slid in the separating direction after being slid in the crosswise direction.

EXEMPLARY EMBODIMENTS

Exemplary embodiments for carrying out the present invention will be explained in detail with reference to the accompanying drawings.

Exemplary Embodiment 1

Figure 1A:
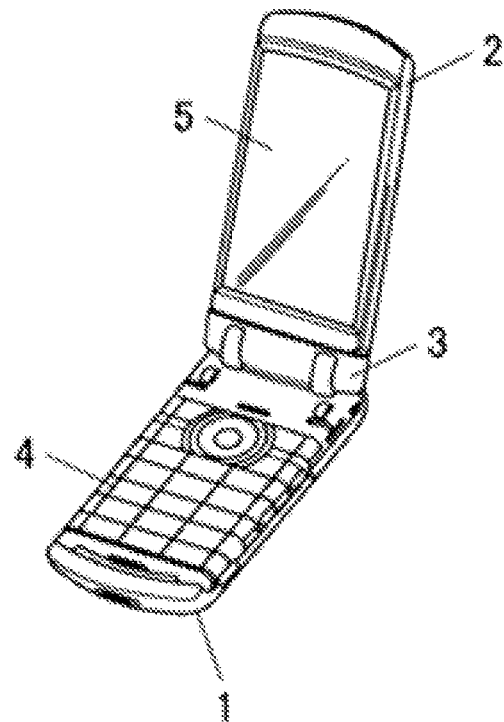
FIG. 1A is a perspective diagram of a portable telephone of a first exemplary embodiment when opened in the lengthwise direction.
Figure 1B:
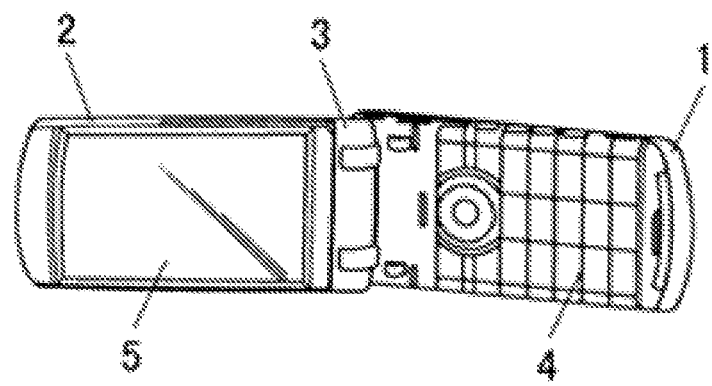
FIG. 1B is a perspective diagram of a portable telephone of a first exemplary embodiment when opened and in the horizontal state.
Figure 1C:
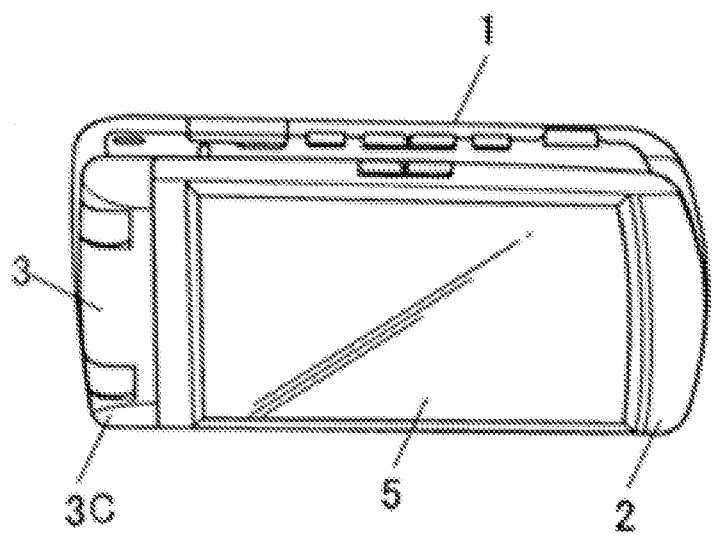
FIG. 1C is a perspective diagram of a portable telephone of a first exemplary embodiment when folded such that the display screen is on top.
Figure 2:
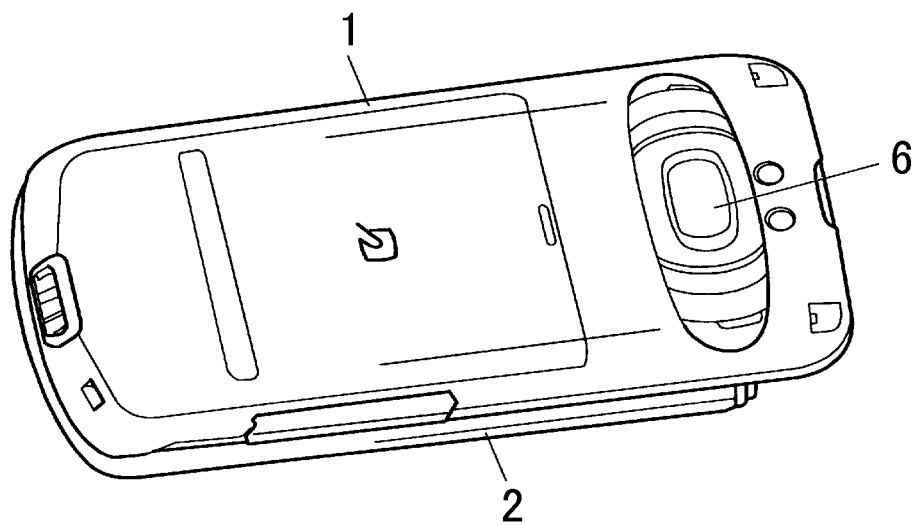
FIG. 2 is a perspective diagram illustrating the portable telephone of FIG. 1C from the opposite side.

As illustrated in FIG. 1A to FIG. 2, in a first exemplary embodiment of the invention a folding-type portable telephone comprises a first housing 1 and a second housing 2. The first housing 1 and second housing 2 are connected via a biaxial hinge in a hinge cover 3 such that they can be freely opened or closed and freely rotated. In addition, the first housing 1 comprises an operation section 4 on one surface and a camera section 6 on the other surface. The second housing 2 comprises a display screen 5.

This folding-type portable telephone can be transformed to a different state from the folded state by way of the biaxial hinge. For example, as illustrated in FIG. 1A, this portable telephone can be opened in the lengthwise direction. Moreover, as illustrated in FIG. 1B, the portable telephone that is opened in the lengthwise direction in this way can be used sideways. Furthermore, as illustrated in FIG. 1C and FIG. 2, this portable telephone can be folded such that the display screen 5 is on top.

Figure 3:
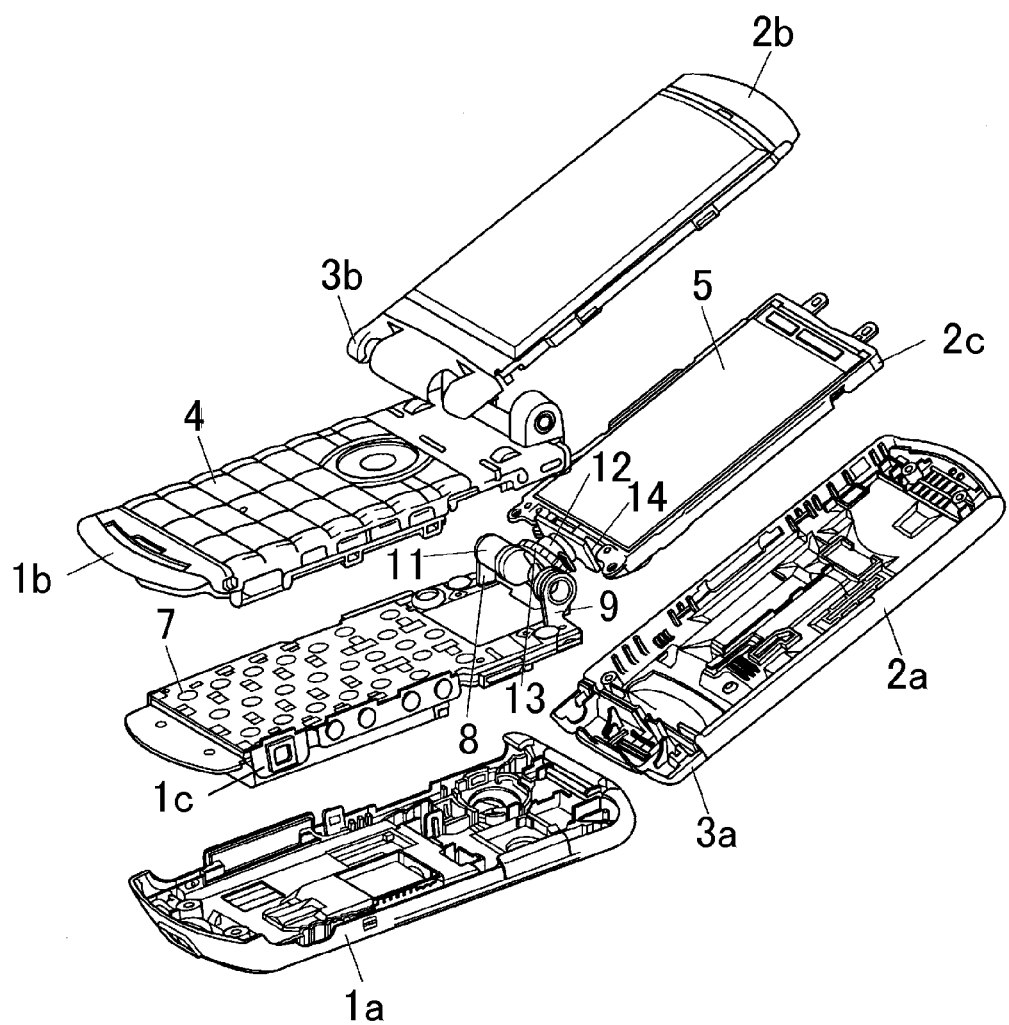
FIG. 3 is an exploded perspective diagram illustrating the construction of the portable telephone in FIGS. 1A to 1C.

FIG. 3 is an exploded view illustrating the construction of a portable telephone. In the following, the internal construction of a portable telephone will be explained.

The first housing 1 comprises a resin bottom case 1a, a resin top case 1b, and a metal middle case 1a. A keyboard 7 of the operation section 4 is assembled in the middle case 1c. The second housing 2 comprises a resin bottom case 2a, resin top case 2b and a metal middle case 2c. A display panel having a display screen 5 is assembled in the middle case. The display screen 5 is liquid crystal or organic EL, for example. A hinge cover 3 comprises a resin bottom case 3a and top case 3b.

A hinge bracket 8 is attached to one side section on one end section in the lengthwise direction of the metal middle case 1c of the first housing 1. In this hinge bracket 8, a bearing supports a first rotating shaft 11 such that it rotates freely around a horizontal axis of rotation. This first rotating shaft 11 and a second rotating shaft 12 whose axis of rotation is in the vertical direction are integrated by a base angle 13, which acts as a linking member. Moreover, a hinge bracket 9 is attached to the other side section of one end section in the lengthwise direction of the middle case 1c. The end second on the opposite side from the first rotating shaft 11 of the base angle 13 is supported in the hinge bracket 9 by a bearing such that it rotates freely via a dummy shaft.

Furthermore, a vertically erect plate-shaped slide member 14 is integrally provided on one end section in the lengthwise direction of the metal middle case 2c of the second housing 2. A second rotating shaft 12 is assembled in this slide member 14 such that it is capable of sliding. As described above, the biaxial hinge comprises a first rotating shaft 11 and second rotating shaft 12 having orthogonal axes. The first housing 1 and second housing 2 can be freely folded (opened and closed) by way of the first rotating shaft 11, and the second housing 2 can be freely rotated with respect to the first housing 1 by way of the second rotating shaft 12. A hinge cover 3 covers this biaxial hinge section.

Figure 4A:
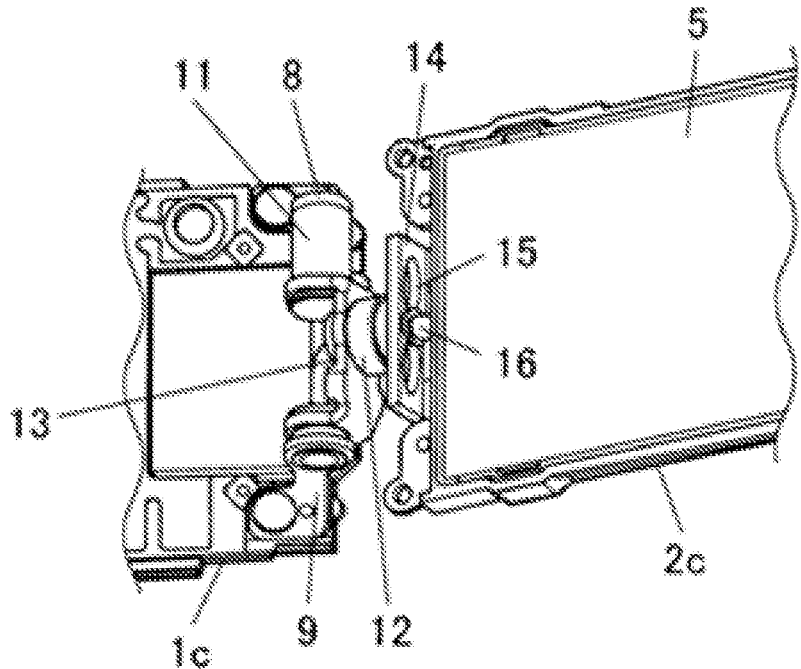
FIG. 4A is an enlarged diagram of a biaxial hinge, slide member and display screen of the portable telephone illustrated in FIG. 3.
Figure 4B:
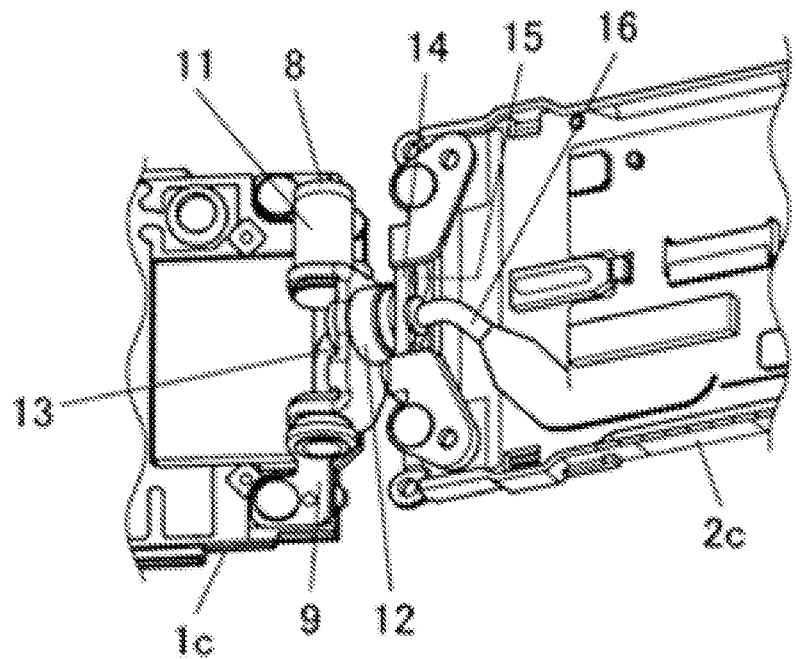
FIG. 4B is a diagram illustrating the state of the portable telephone in FIG. 4A when the display screen is rotated to the opposite side.
Figure 4C:
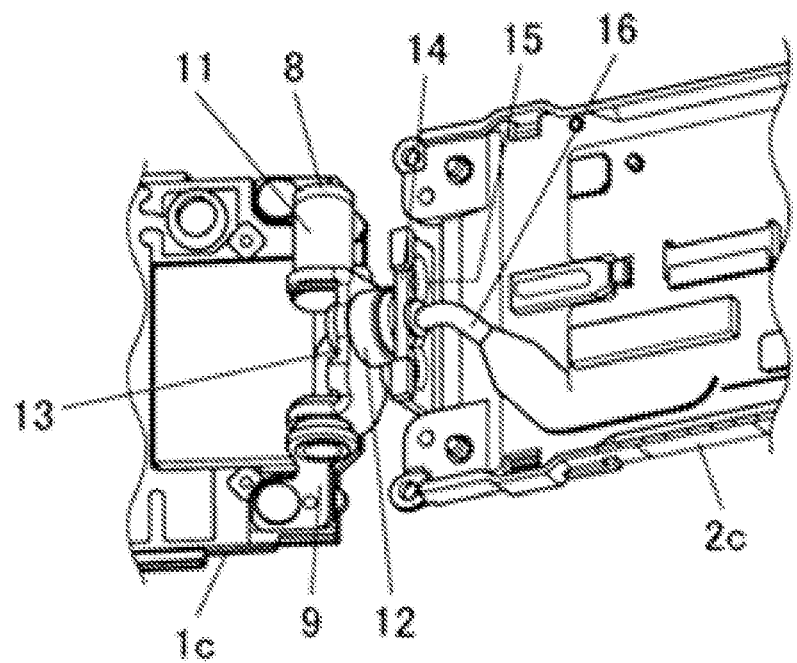
FIG. 4C is a diagram illustrating the portable telephone in FIG. 4B of which part is omitted.

Next, the operation of the hinge and slide member of this portable telephone is explained. First, the first housing 1 and second housing 2 can be rotated via the biaxial hinge and folded. The case of rotating both housings by way of the second rotating shaft 12 of the biaxial hinge is illustrated in the enlarged views of the section around the biaxial hinge of FIGS. 4A to 4C. A hollow section is formed in the second rotating shaft 12. In this hollow section, a wire 16 passes through a coaxial thin line between the inside of the first housing 1 and second housing 2. FIG. 4A corresponds to FIG. 1A and illustrates the section around the biaxial hinge of the portable telephone when the portable telephone is opened in the lengthwise direction, and the display screen 5 and operation section are facing in the same direction. The portable telephone illustrated in FIG. 4A is such that when the second housing 2 is rotated upside down by way of the second rotating shaft 12, the portable telephone becomes as illustrated in FIG. 4B. FIG. 4C illustrates the portable telephone in FIG. 4B when part of the slide member 14 has been omitted. In the exemplary embodiment, the slide member 14 can be rotated around the second rotating shaft 12. In another exemplary embodiment, the slide member 14 can be rotated with the second rotating shaft 12 to which it is integrated.

Figure 5A:
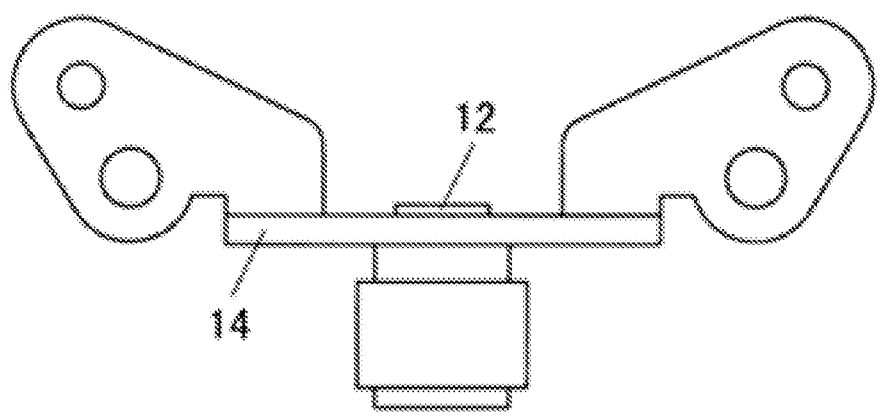
FIG. 5A is top view of the second rotating shaft and slide member illustrated in FIGS. 4A to 4C.
Figure 5B:
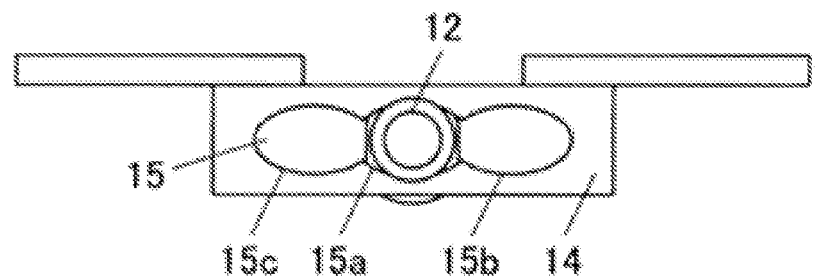
FIG. 5B is a front view of the second rotating shaft and slide member illustrated in FIG. 5A.

In addition, the first housing 1 and second housing 2 are slid with respect to each other by way of the slide member 14. FIGS. 5A and 5B illustrate the second rotating shaft 12 and slide member 14. The slide member 14 comprises a slide groove 15 that extends in the horizontal direction. This slide groove 15 comprises a central fastening groove 15a that fastens the second rotating shaft 12, and left and right end fastening grooves 15b, 15c on the left and right end sections. The border section between the central fastening groove 15a, and left and right fastening grooves 15b, 15c is such that it is a little less than the outer diameter of the insert section of the second rotating shaft 12. This makes it possible to fasten the second rotating shaft 12 by any one of the three aligned fastening grooves 15a, 15b, 15c.

When the first housing 1 and second housing 2 are slid, the second rotating shaft 12 is fastened by the center fastening groove 15a as illustrated in FIGS. 4A to FIG. 5.

Figure 6A:
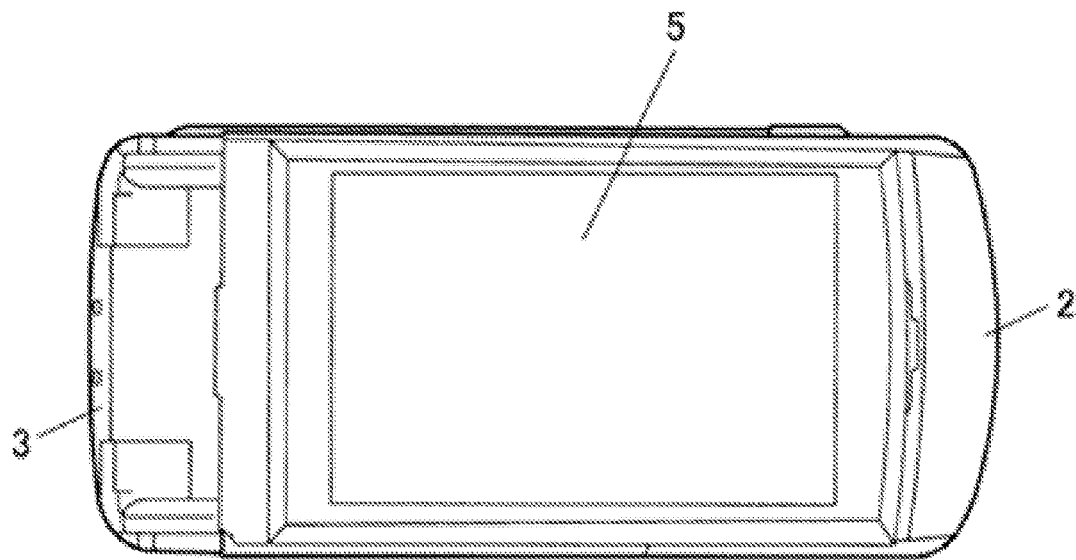
FIG. 6A is a front view of the portable telephone illustrated in FIG. 1C that is folded such that the display surface is on top.
Figure 6B:
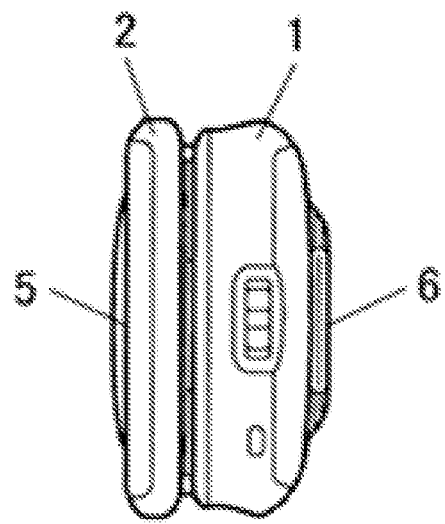
FIG. 6B is a side view of the portable telephone illustrated in FIG. 6A.
Figure 6C:
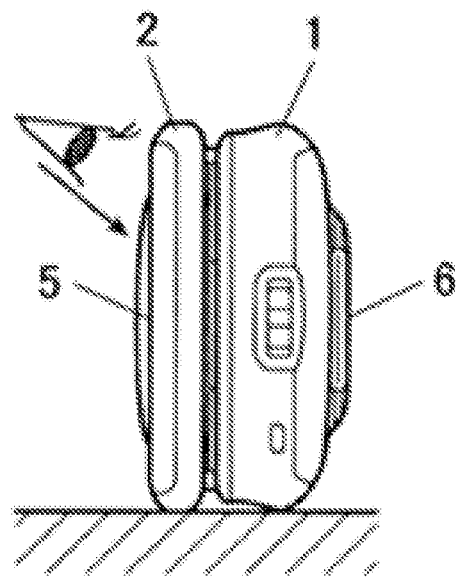
FIG. 6C is a side view of the portable telephone illustrated in FIG. 6A, in the case when placed on a floor.

When the portable telephone that is folded with the display screen 5 on top as illustrated in FIGS. 6A and 6B is placed on a flat surface such as a floor (hereafter referred to as the placement surface) as illustrated in FIG. 6C with the second rotating shaft 12 fastened to the center fastening groove 15a, the first housing 1 and second house 2 stand vertical with respect to the placement surface, so the display screen 5 also similarly stands vertical with respect to the placement surface. Normally, the user looks down at the portable telephone that is placed on the placement surface from above at an angle. Therefore, when the display screen 5 is vertical with respect to the placement surface, the line of sight of the user is at an angle with respect to the display screen 5, so it is difficult for the user to see the display screen 5.

Figure 7:
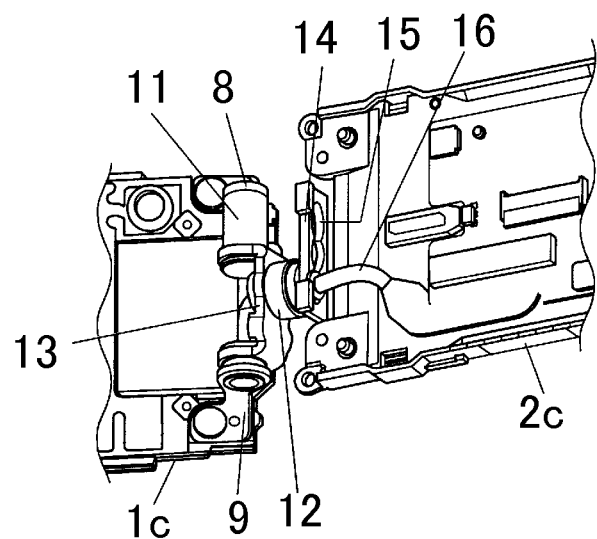
FIG. 7 is a diagram illustrating the second rotating shaft and slide member illustrated in FIGS. 4A to 4C in which the positional relationship is changed to one side.
Figure 8A:
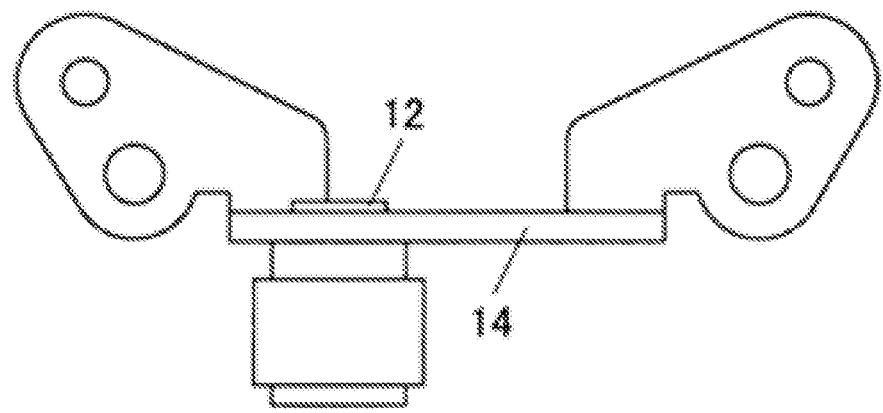
FIG. 8A is a top view of the second rotating shaft and slide member illustrated in FIG. 7.
Figure 8B:
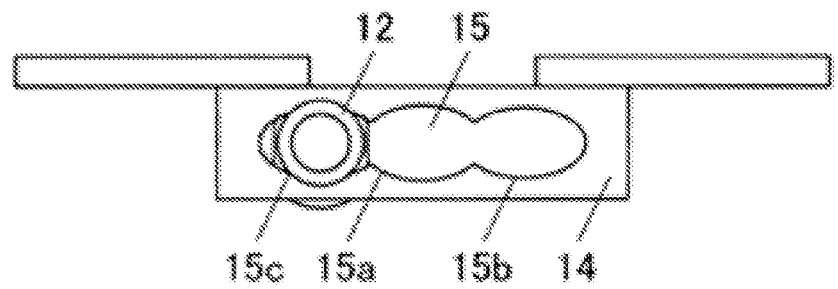
FIG. 8B is a front view of the second rotating shaft and slide member illustrated in FIG. 8A.

When the first housing 1 and second housing 2 are slid to one side, the second rotating shaft 12 is fastened to the fastening groove 15c on one end section as illustrated in FIGS. 7 to FIG. 8B.

Figure 9A:
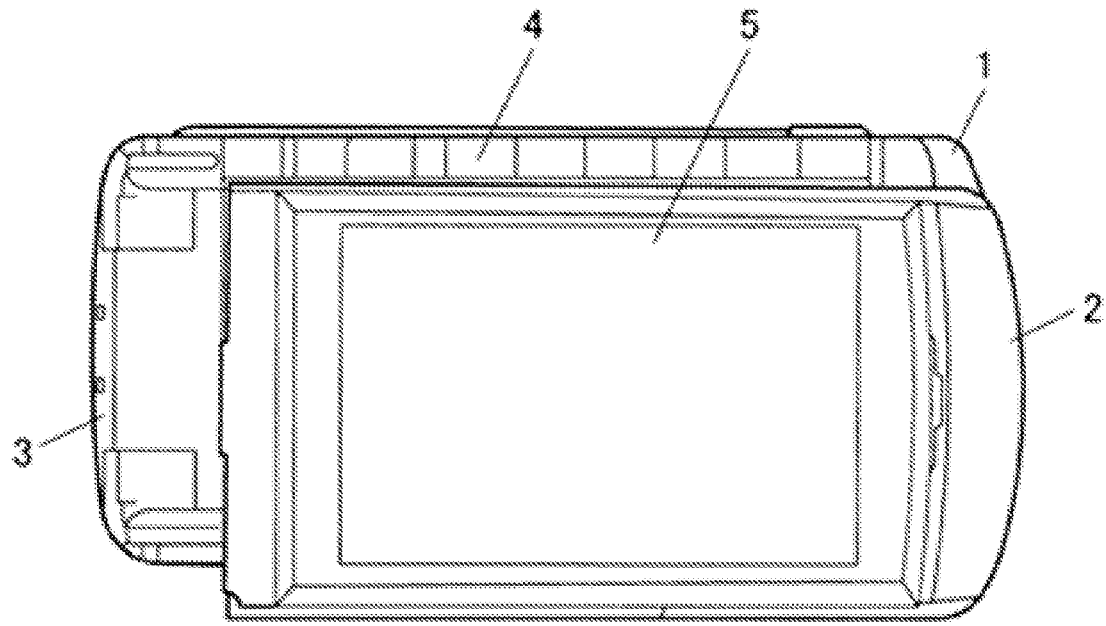
FIG. 9A is a front view of a portable telephone of a first exemplary embodiment in which shifting of one end occurred using the second rotating shaft and slide member illustrated in FIG. 7 and FIGS. 8A to 8C.
Figure 9B:
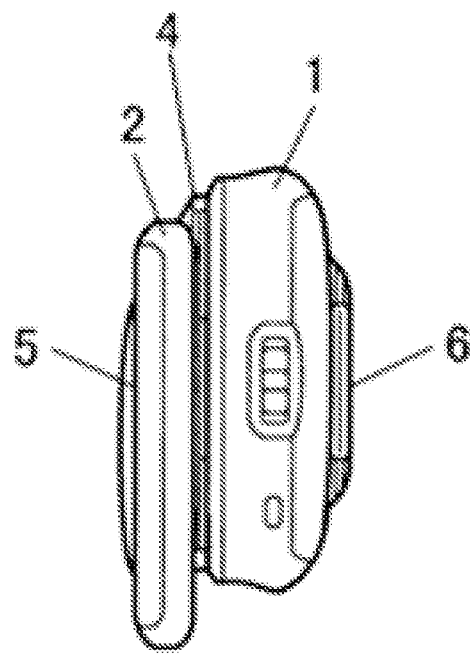
FIG. 9B is a side view of the portable telephone illustrated in FIG. 9A.
Figure 9C:
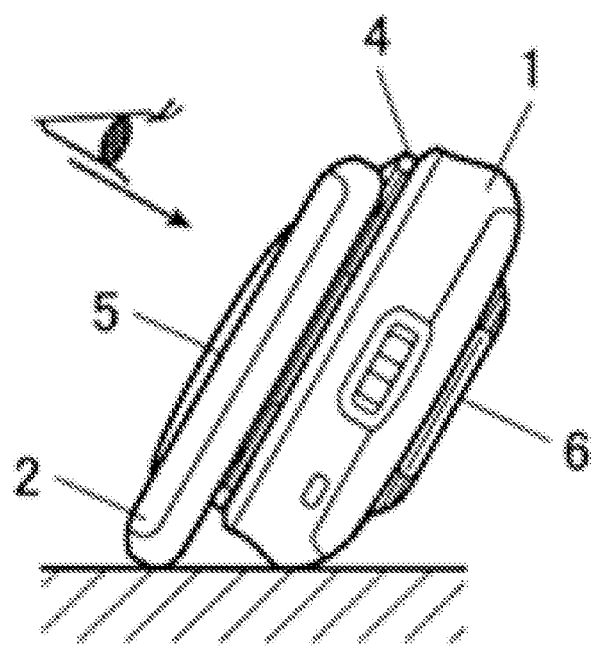
FIG. 9C is a side view of the portable telephone illustrated in FIG. 9A when placed on a floor.

In the portable telephone that is folded with the display screen 5 on top as illustrated in FIGS. 9A and 9B with the second rotating shaft 12 fasted to the fastening groove 15c on one end section in this way, the bottom end section of the second housing 2 protrudes further downward than the bottom end section of the first housing 1, making a step. Therefore, when placed on the placement surface as illustrated in FIG. 9C, this portable telephone stands with the second housing 2 tilted toward the direction of the first housing 1 due to the step. By doing so, the line of sight of the user becomes perpendicular or close to perpendicular with respect to the display screen 5, so the display screen 5 become easy for the user to see. In this case, the position of the center of gravity of the first housing 1 and second housing 2 is above the position where the first housing 1 comes in contact with the placement surface, or is above between the position where the first housing 1 comes in contact with the placement surface and the position where the second housing 2 comes in contact with the placement surface.

Figure 10:
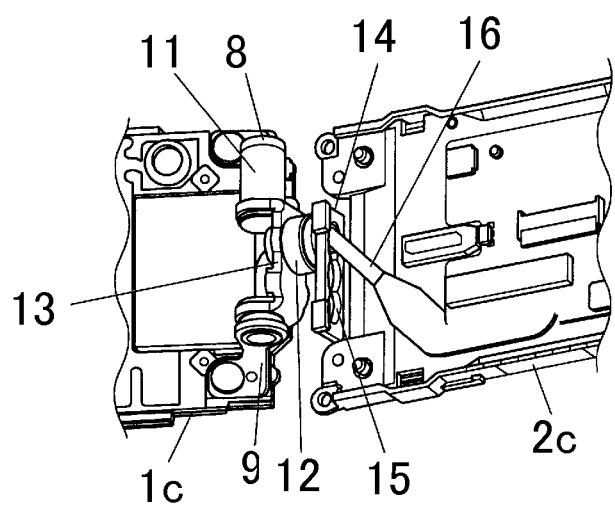
FIG. 10 is a diagram illustrating the second rotating shaft and slide member illustrated in FIGS. 4A to 4C when the positional relationship is changed to the other side.
Figure 11A:
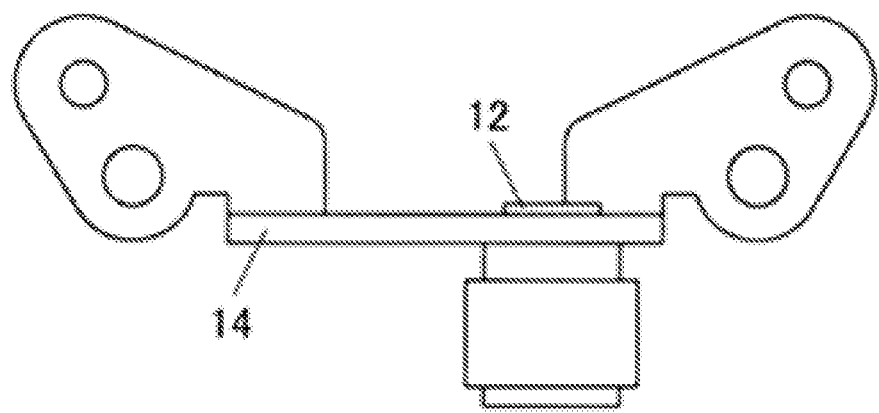
FIG. 11A is a top view of the second rotating shaft and slide member illustrated in FIG. 10.
Figure 11B:
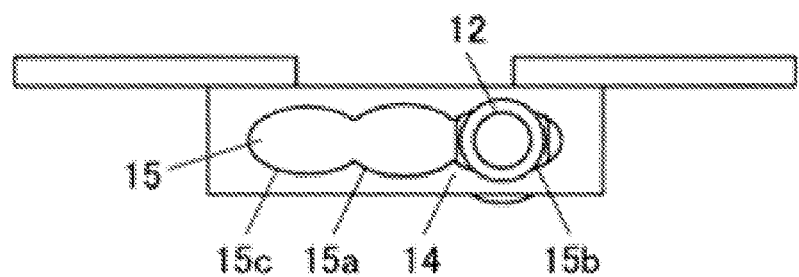
FIG. 11B is a front view of the second rotating shaft and slide member illustrated in FIG. 11A.

When the first housing 1 and second housing 2 are slid toward the other side, the second rotating shaft 12 is fastened by the fastening groove 15b on the other end section as illustrated in FIG. 10 to FIG. 11B.

Figure 12A:
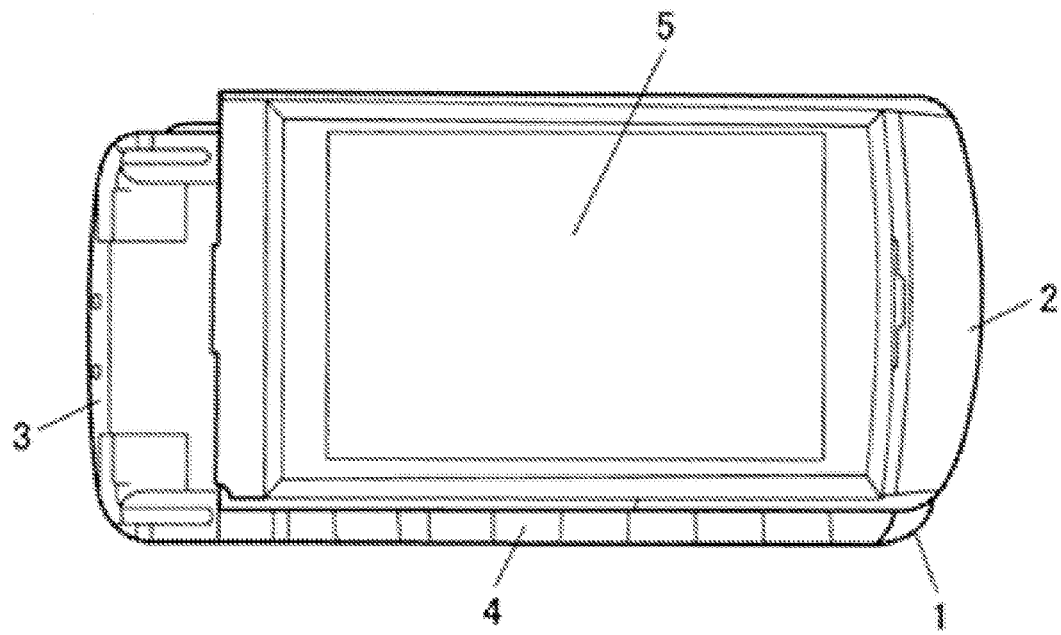
FIG. 12A is a top view of a portable telephone of a first exemplary embodiment in which shifting occurred in one end by the second rotating shaft and slide member illustrated in FIG. 10 and FIGS. 11A and 11B.
Figure 12B:
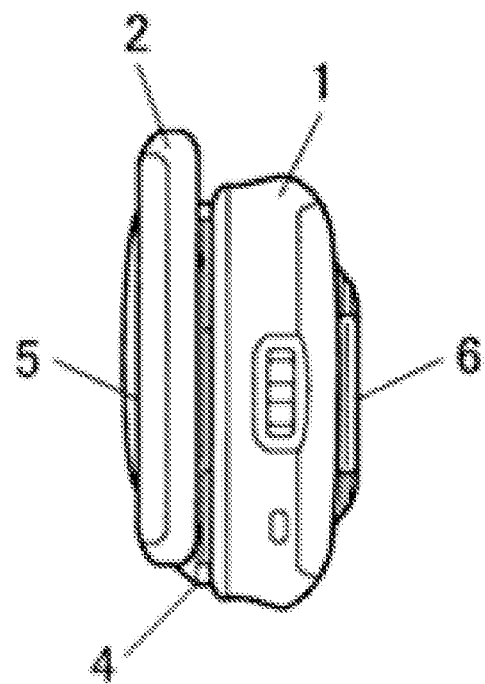
FIG. 12B is a side view of the portable telephone illustrated in FIG. 12A.
Figure 12C:
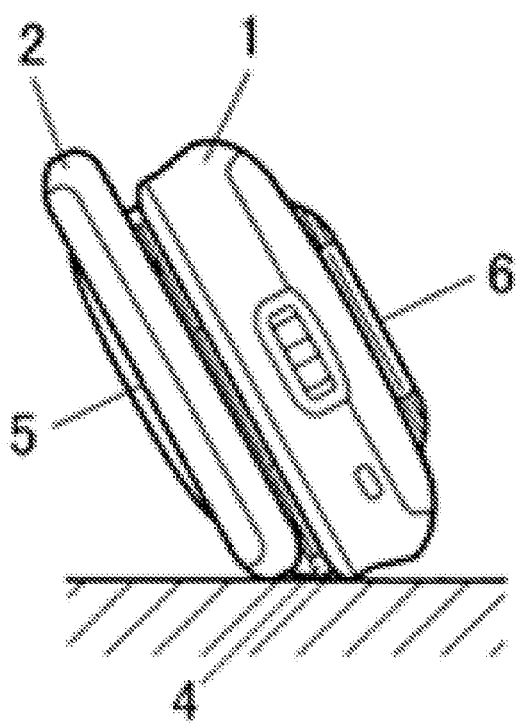
FIG. 12C is a side view of the portable telephone illustrated in FIG. 12A when placed on floor.

In the case of a portable telephone that is folded with the camera section 6 in front as illustrated in FIGS. 12A and 12B and with the second rotating shaft 12 fastened to the fastening groove 15b on the other end section in this way, the bottom section of the first housing 1 protrudes further downward than the bottom end section of the second housing 2, making a step. Therefore, when placed on a placement surface as illustrated in FIG. 12C, this portable telephone stands with the first housing 1 tilted toward the direction of the second housing 2 due to the step, so the camera section faces at an upward angle. By doing so, the field of view of the camera is not blocked by the placement surface and it is possible to fit the object whose image is being taken in the field of view of the camera, so it becomes easy to use the self-timer function of the camera provided in portable telephone. In this case, the position of the center of gravity of the first housing 1 and second housing 2 is above the position where the second housing 2 comes in contact with the placement surface, or above between the position where the second housing 2 comes in contact with the placement surface and the position where the first housing 1 comes in contact with the placement surface.

Figure 13:
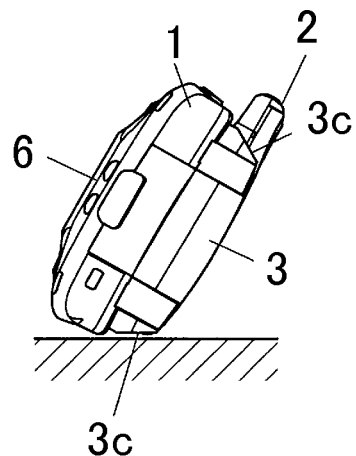
FIG. 13 is a side view of the portable telephone illustrated in FIGS. 12A to 12C as seen from the side of the hinge cover.

FIG. 13 illustrates the portable telephone illustrated in FIGS. 12A to 12C as seen from the side of the hinge cover 3. Beveled sections 3c, which are sloped surfaces, are formed on both of the end sections 3d on the left and right of the hinge cover 3. As illustrated in the figure, when the portable telephone, which is folded with the camera section 6 at the front, is placed on the placement surface, these sloped beveled sections 3c prevent interference between the left and right end sections of the hinge cover 3 and the placement surface.

With the folding-type portable telephone of the first exemplary embodiment described above, by sliding the overlapping first housing 1 and second housing 2 in the crosswise direction by way of the second rotating shaft 12 and slide member 14, a step is formed on the end sections of the housings. By doing so, the portable telephone that is placed on the placement surface in a viewing state is such that the overlapping first housing 1 and second housing 2 stand at angle. This brings the display screen 5 close to being perpendicular with the line of sight, so the screen becomes easier to see. Moreover, the camera section 6 is tilted upward at an angle, so using the self-timer function of the camera to take images becomes easier.

(Variation 1)

Figure 14:
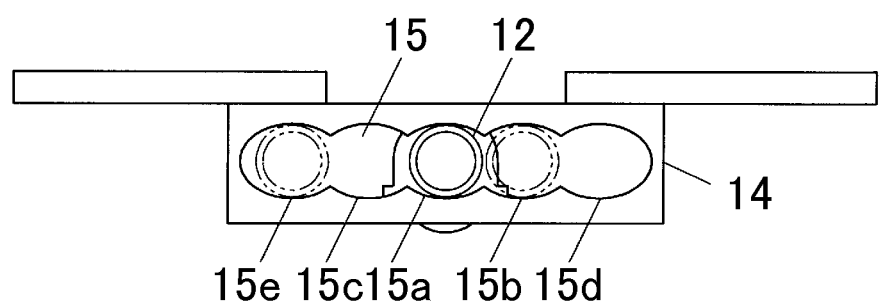
FIG. 14 is a front view of the second rotating shaft and slide member of a portable telephone of a first variation of the first exemplary embodiment.

In a first variation illustrated in FIG. 14, the slide amount of the slide member is increased. In the first exemplary embodiment, construction is such that the slide groove 15 corresponds to sliding amounts in three steps, however, instead of this, construction is possible in which the slide groove 15 corresponds to sliding amounts in five steps. The invention is not limited to this, however, as illustrated in the figure, in addition to the center fastening groove 15a, and left and right fastening grooves 15b, 15c, the sliding groove 15 may also further have left and right fastening grooves 15d, 15e on both end sections.

In addition, by changing the shape, position or number of the fastening grooves, construction is possible in which sliding can be done in an arbitrary slide amount.

(Variation 2)

Figure 15:
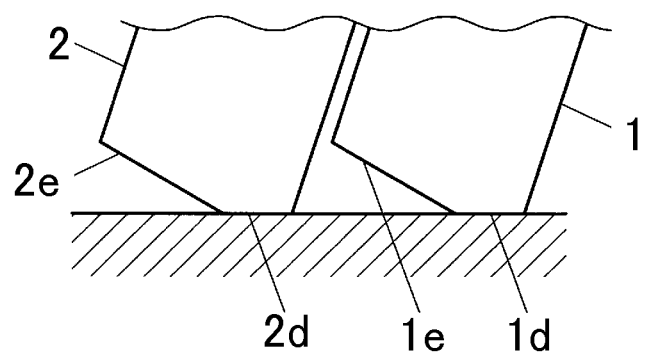
FIG. 15 is a side view of the bottom end where shifting occurred of a portable telephone of a second variation of the first exemplary embodiment.

In a second variation illustrated in FIG. 15, the beveled construction is provided on the bottom end sections of the overlapping housings 1, 2 where the step is formed. For example, flat and sloped beveled sections 1d and 1e, and 2d and 2e can be provided on the end sections of the overlapping first housing 1 and second housing 2 where the step is formed. When doing this, when the portable telephone stands in a state such that the second housing 2 tilts toward the direction of the first housing 1, the beveled sections 1d and 2d come in contact with the placement surface. On the other hand, when the portable telephone stands in a state such that the first housing 1 tilts toward the direction of the second housing 2, the beveled sections 1e and 2e come in contact with the placement surface. By these flat inclined surfaces coming in contact with the placement surface in this way, the portable telephone stably stands at an angle.

(Variation 3)

Figure 16A:
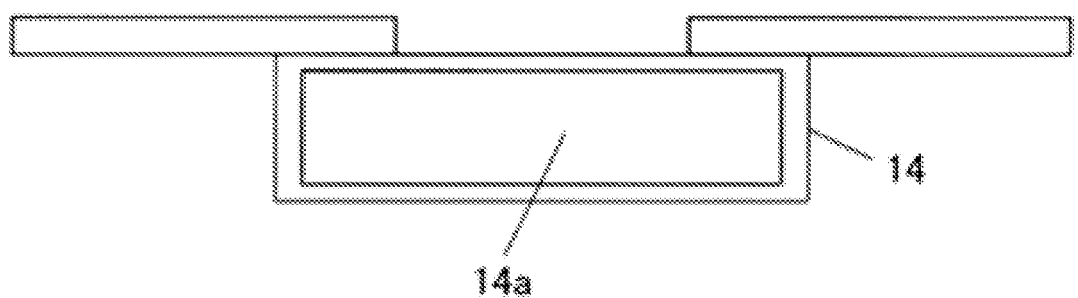
FIG. 16A is a front view of the slide member of a portable telephone of a third variation of the first exemplary embodiment.
Figure 16B:
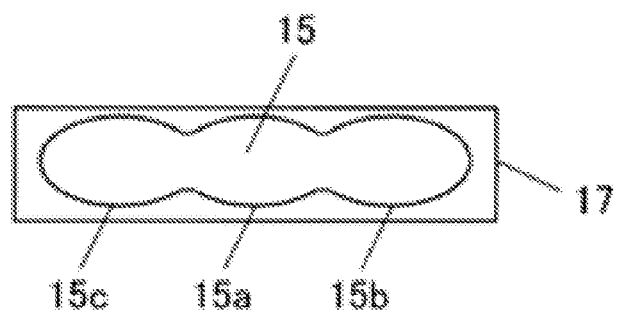
FIG. 16B is a front view of another piece of the slide member of a portable telephone of a third variation of the first exemplary embodiment.
Figure 16C:
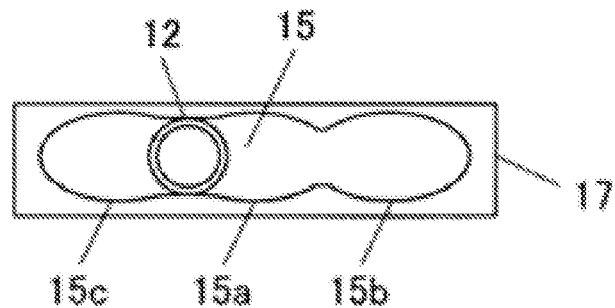
FIG. 16C is a diagram illustrating the relationship between the other piece of the slide member and the second rotating shaft illustrated in FIG. 3B.

In a third variation illustrated in FIGS. 16A to 16C, a resin slide groove is provided in the slide member 14. In the first exemplary embodiment, the sliding mechanism 15 was provided in the slide member 14, however, instead of this, a separate resin piece 17 in which fastening grooves 15a, 15b, 15c are formed as illustrated in FIG. 16B may be fitted into a horizontally long hole 14a that is formed in the slide member 14 as illustrated in FIG. 16A.

In this variation, the boundary sections between the three aligned fastening grooves 15a, 15b, 15c hold the second rotating shaft 12 that is fastened in the fastening grooves 15a, 15b, 15c, with the tightness due to the elasticity of resin. On the other hand, as the second rotating shaft 12 slides, the boundary section vertically expands due to elastic deformation as illustrated in FIG. 16C, so the sliding movement can be performed well.

(Variation 4)

Figure 17A:
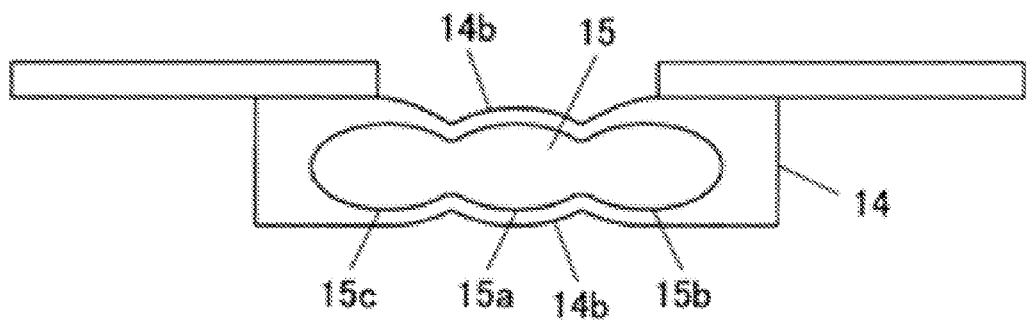
FIG. 17A is a front view of the slide member of a portable telephone of a fourth variation of the first exemplary embodiment.
Figure 17B:
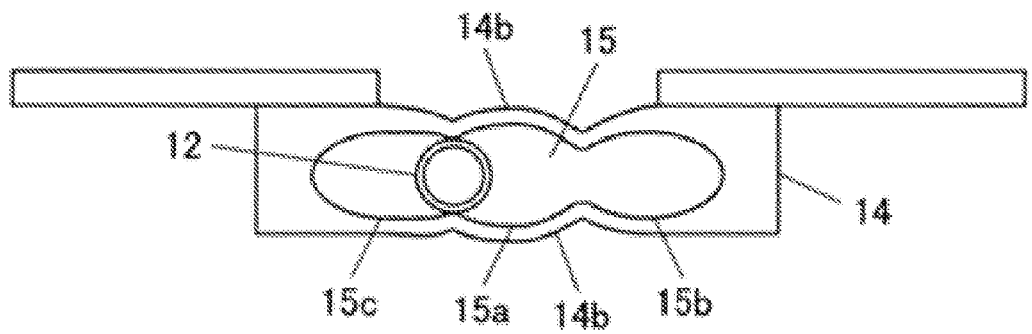
FIG. 17B is a diagram illustrating the relationship between the slide member and the second rotating shaft illustrated in FIG. 17A.

In a fourth variation illustrated in FIGS. 17A and 17B, a flexible slide groove is provided in the slide member 14. As illustrated in FIG. 17A, a thin groove section 14b that runs along the top and bottom edge of the slide groove 15, or in other words runs along the top and bottom edge of the three aligned fastening groves 15a, 15b, 15c is formed in the slide member 14 of this variation.

In this variation, as the second rotating shaft 12 slides, the thin section 14b along the top and bottom edges of the boundary sections between the three aligned fastening grooves 15a, 15b, 15c vertically deforms and expands, so the sliding movement can be performed well.

(Variation 5)

Figure 18A:
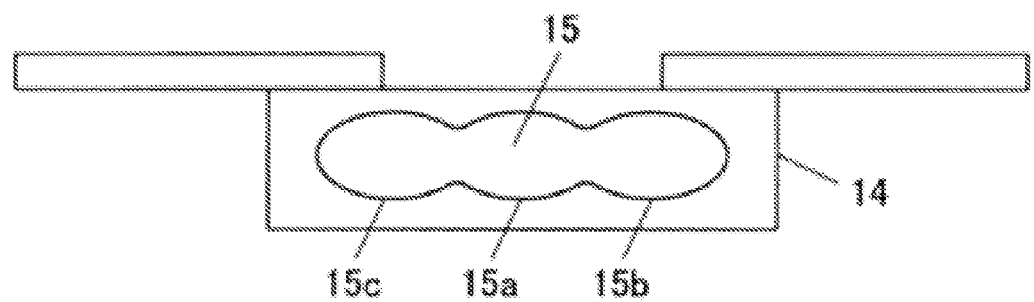
FIG. 18A is a front view of the slide member of a portable telephone of a fifth variation of the first exemplary embodiment.

In a fifth variation illustrated in FIGS. 18A and 18B a resin ring 18 is provided around the second rotating shaft 12. In this variation, the second rotating shaft 12 fits in the three aligned fastening grooves 15a, 15b, 15c by way of the resin ring 18. In this case, the boundary sections between the three aligned fastening groove 15a, 15b, 15c are set a little smaller than the outer diameter of the resin ring 18.

In this variation, as the second rotating shaft 12 slides, the resin ring 18 is vertically pressed and elastically deformed at the boundary sections between the three aligned fastening sections 15a, 15b, 15c, making it possible for the sliding movement to be performed well.

(Variation 6)

Figure 21:
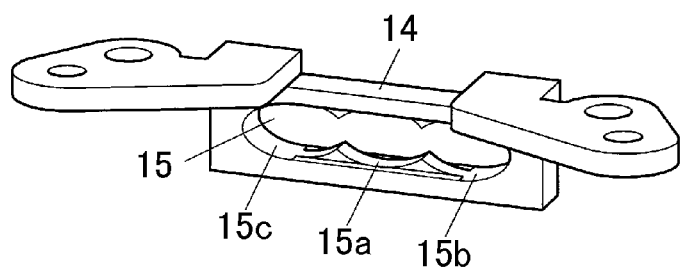
FIG. 21 is a perspective diagram of the slide member in FIGS. 19A to 20B.
Figure 22A:
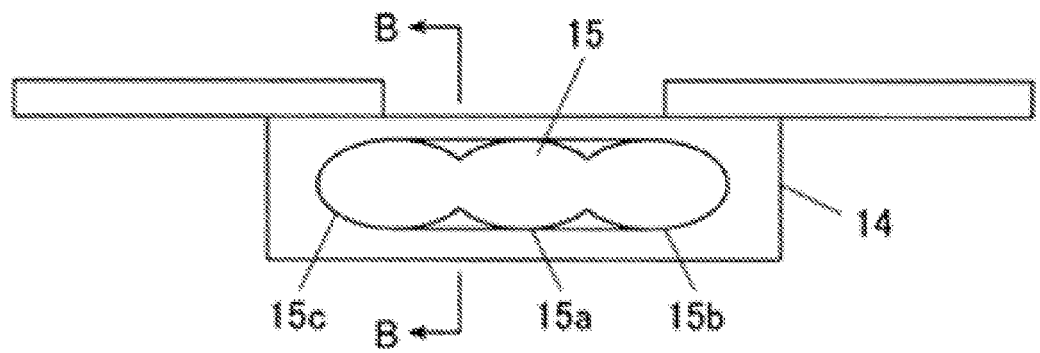
FIG. 22A is a front view of the slide member illustrated in FIG. 21.
Figure 22B:
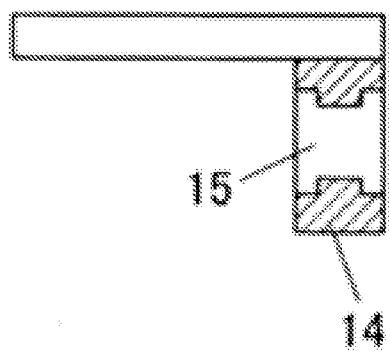
FIG. 22B is a cross-sectional view of section B-B of the slide member illustrated in FIG. 22A.
Figure 22C:
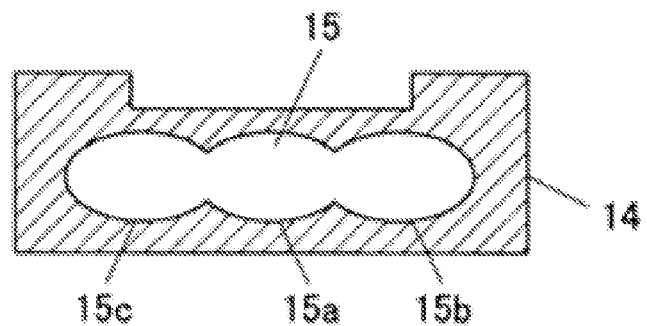
FIG. 22C is a cross-sectional view of the section C-C of the slide member illustrated in FIG. 19A.

In a sixth variation as illustrated in FIGS. 19A, 19B and 21, the slide member 14 is formed such that it is thick in the direction that the second rotating shaft 12 is inserted. On the other hand, as illustrated in FIG. 21 and FIGS. 22A to 22C, the slide groove 15, or in other words, the boundary sections between the fastening grooves 15a, 15b, 15c, are formed such that they are thin in the direction in which the second rotating shaft 12 is inserted.

Figure 20A:
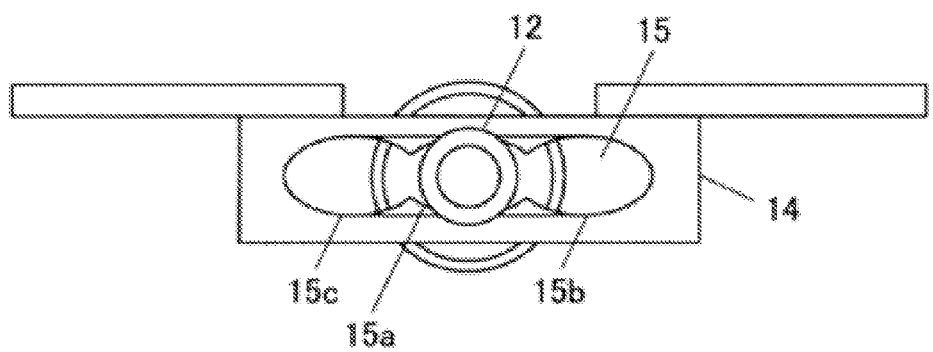
FIG. 20A is a front view of the slide member and second rotating shaft illustrated in FIG. 19B.
Figure 20B:
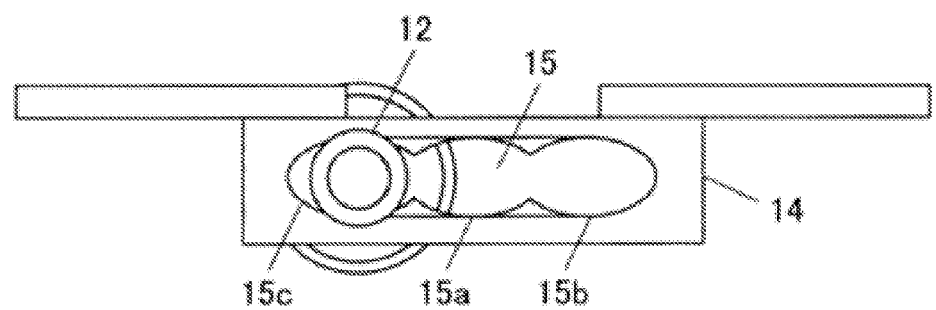
FIG. 20B is a front view of the slide member and second rotating shaft illustrated in FIG. 20A when the positional relationship is changed.

The second rotating shaft 12 that is held in the thick slide member 14 is prevented from being loose when inserted in the slide groove 15. Moreover, regardless of being firmly held in this way, the boundary sections between the fastening grooves 15a, 15, b, 15c are thin, so when sliding the second rotating shaft 12 that is fastened in the fastening groove 15a as illustrated in FIG. 19A and FIG. 20 to the fastening groove 15c as illustrated FIG. 19B and FIG. 20B, the boundary sections expand vertically due to deformation so that sliding movement can be performed well.

Exemplary Embodiment 2

In the first exemplary embodiment, a sliding mechanism is provided in the crosswise direction in a folding-type portable telephone, however, the construction of overlapping the first housing 1 and second housing 2 is possible in any type of portable telephone. Therefore, an exemplary embodiment is explained below in which a sliding mechanism is provided in the crosswise direction in a sliding-type portable telephone. As illustrated in FIGS. 23A to 24B, in this second exemplary embodiment, a sliding-type portable telephone comprises a first housing 21 and second housing 22. The first housing 21 comprises an operation section 24 on one end section in the lengthwise direction of one surface, and a camera section 26 on the other surface. The second housing 22 comprises a display screen 25 on one surface.

In addition, the first housing 21 comprises a center locking screw section 32 in one end section in the lengthwise direction of one surface, and comprises two guide members 34 each on both the left and right of that section. On the other hand, the second housing 22 comprises a center slide groove 31 in the lengthwise direction in the center of the other surface, and comprises a slide grooves 33 in the lengthwise direction on both the left and right of that groove. The center locking screw section 32 retains and engages with the center lengthwise slide groove 31, and the left and right guide members 34 retain and engage with the left and right lengthwise slide grooves 33.

Figure 23A:
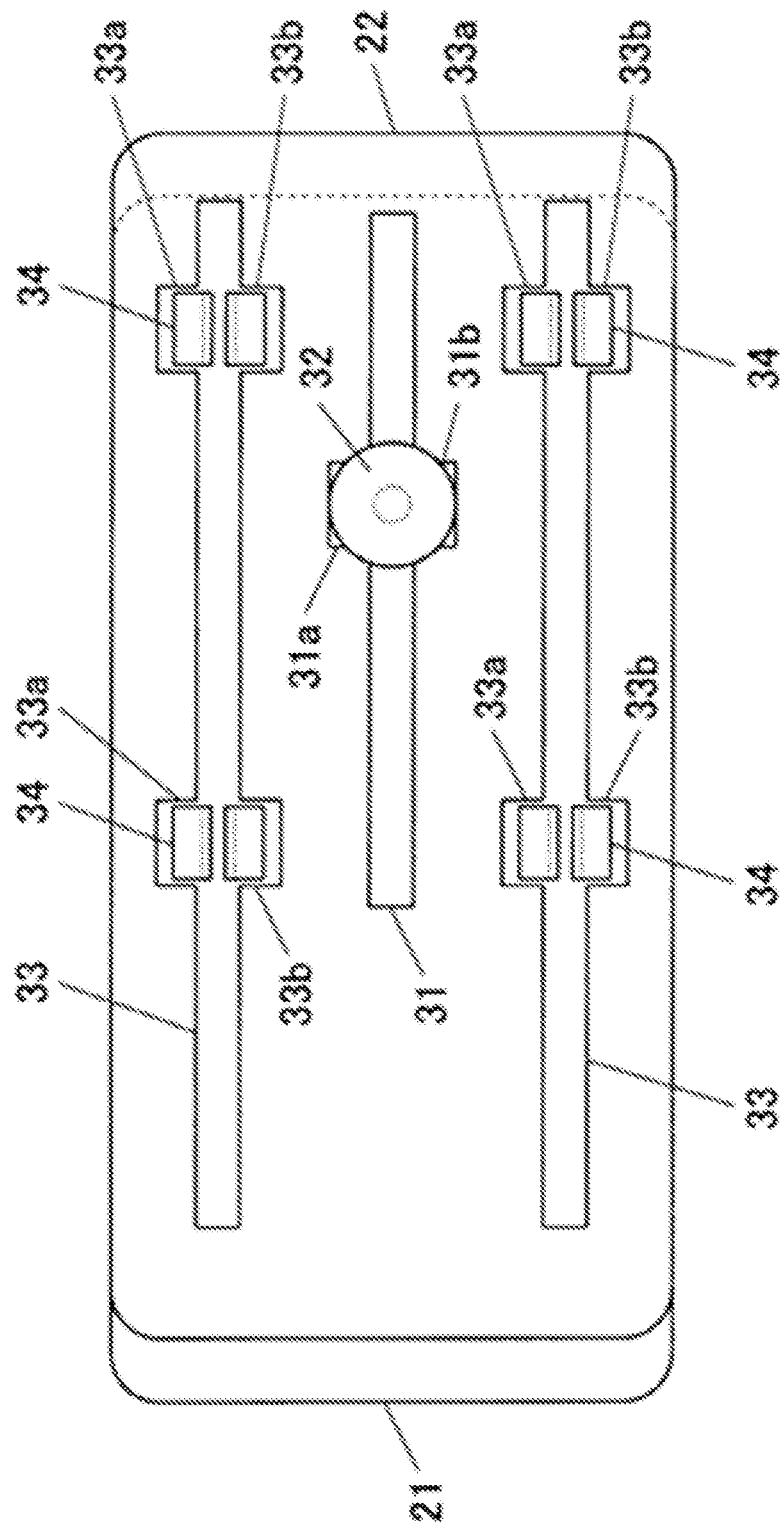
FIG. 23A is a front view illustrating the slide mechanism of a slide-type portable telephone of a second exemplary embodiment.
Figure 23B:
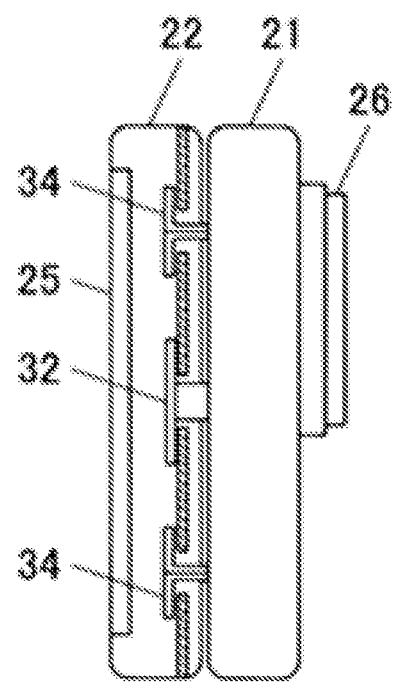
FIG. 23B is a bottom view illustrating the slide mechanism of a slide-type portable telephone of a second exemplary embodiment.

As illustrated in FIGS. 23A to 23C, fastening grooves 31a, 31b in the crosswise direction are formed in the center lengthwise slide groove 31 at the position of the locking screw when the first housing 21 and second housing 22 are overlapped, and the portable telephone is closed, or in other words, when the top ends of both housings are aligned, and are such that they are orthogonal to the center lengthwise slide groove 31. Furthermore, as illustrated in FIG. 23, fastening grooves 33a, 33b in the crosswise direction are formed in the lengthwise slide grooves 33 on both sides at the positions of the guide members 34 when the first housing 21 and second housing 22 are overlapped, and the portable telephone is closed, and are such that they are each orthogonal to the lengthwise slide grooves 33 on both sides.

Figure 24A:
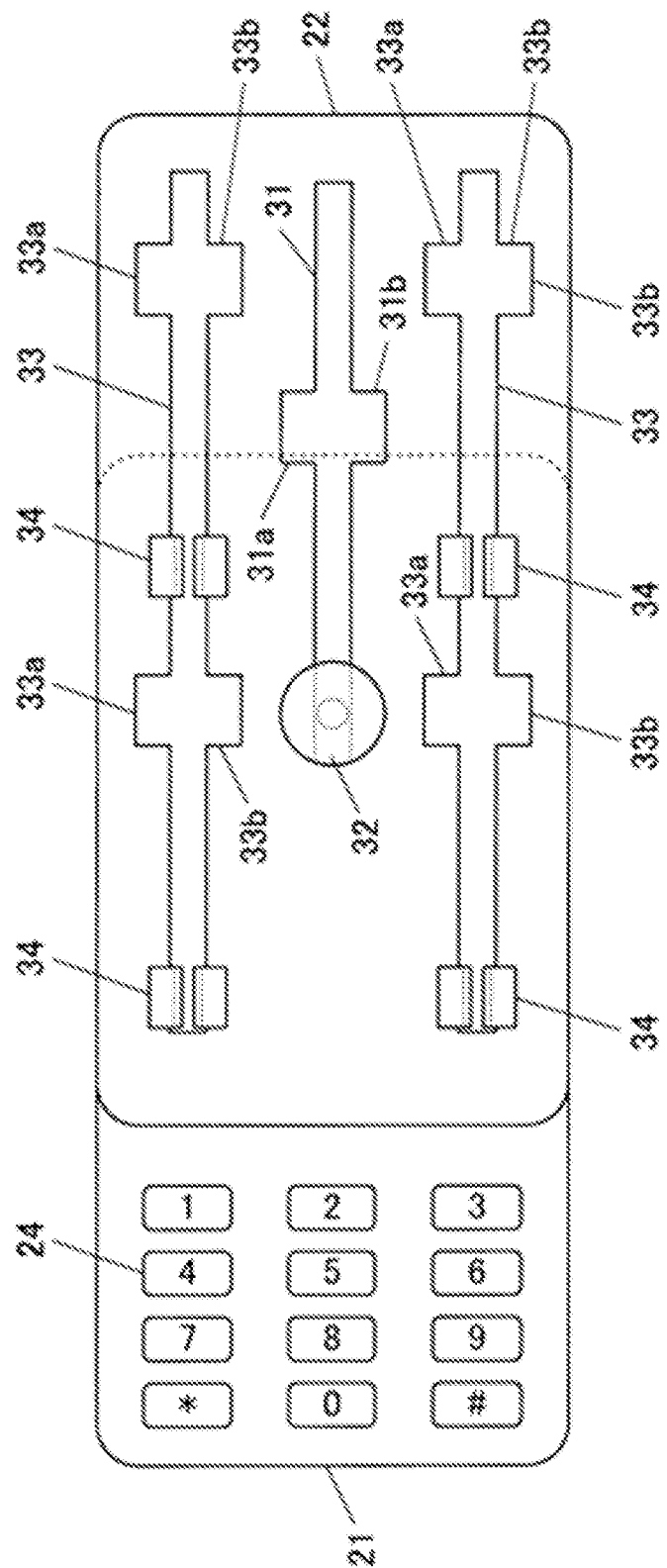
FIG. 24A is a front view of the portable telephone illustrated in FIGS. 23A to 23C where the housings are slid in the lengthwise direction.
Figure 24B:
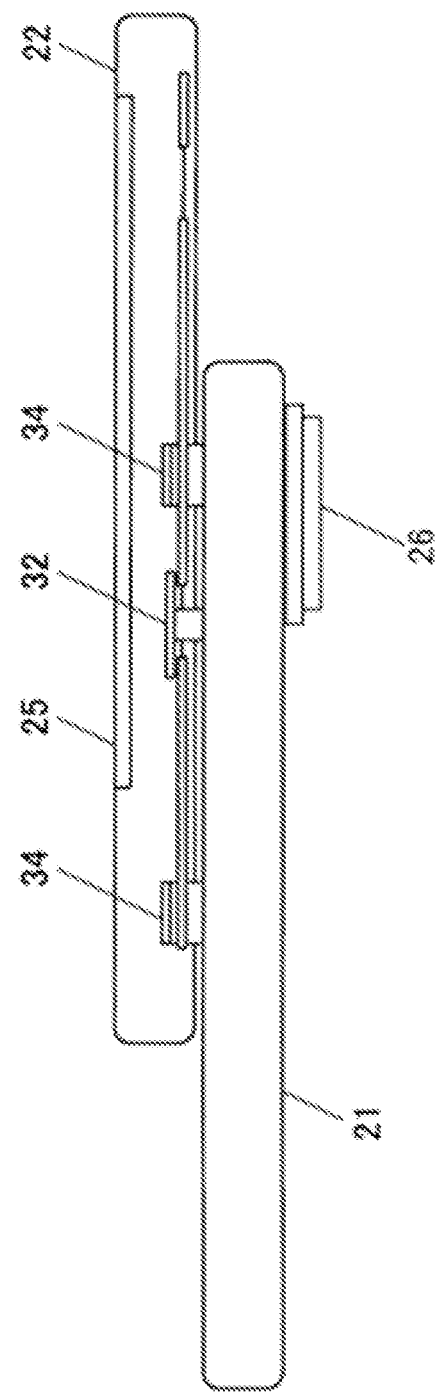
FIG. 24B is a bottom view illustrating the portable telephone illustrated in FIG. 24A.

Next, the operation of the sliding mechanism in the lengthwise direction of this portable telephone will be explained. With the construction described above, the first housing 21 and second housing 22 of the invention both slide in the lengthwise direction. When the closed first housing 21 and second housing 22 are slid in the lengthwise direction as illustrated in FIG. 23B, the center lengthwise slide groove 31 and the locking screw member 32 that engages with it slide relative to each other, while at the same time, the lengthwise slide grooves 33 on both sides and the guide members 34 that engage with them slide relative to each other, and the operation section 24 is exposed, or the housings become less overlapped as illustrated in FIGS. 24A and 24B.

Figure 25:
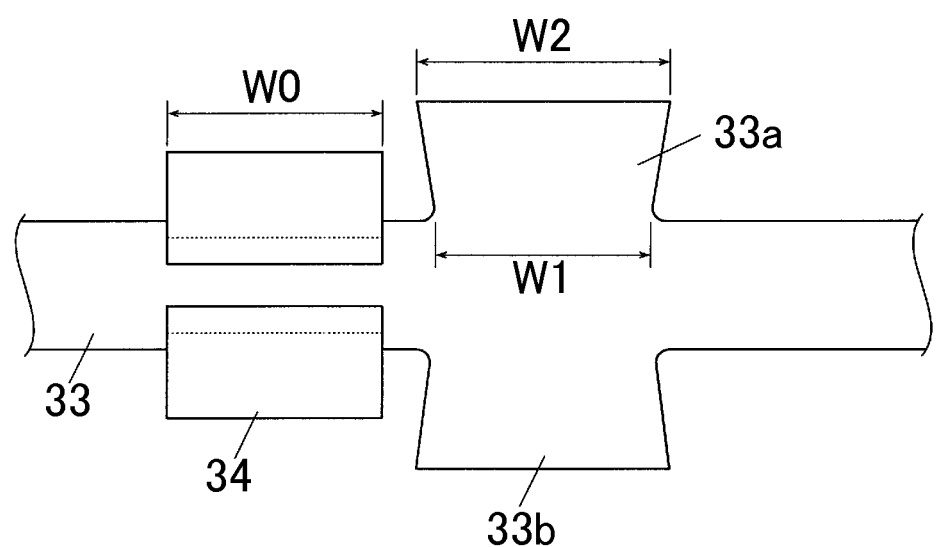
FIG. 25 is an enlarged view of the fastening section illustrated in FIGS. 23A to 23C.

Furthermore, not only can the portable telephone of this invention slide in the lengthwise direction, but can also slide in the crosswise direction. In order to explain the sliding mechanism in this crosswise direction in more detail, the relationship between the lengthwise slide grooves 33 and crosswise fastening grooves 33a, 33b on both sides, and the guide members 34 that engage with them is enlarged and illustrated in FIG. 25.

As illustrated in the figure, the width W1 of the opening sections of the crosswise fastening grooves 33a, 33b from the lengthwise slide groove 33 is set to be equal to or less than the width W0 of the guide members 34, and the width W2 of the base section of the crosswise fastening grooves 33a, 33b is set to be equal to or greater than the width W0 of the guide members 34. By doing so, the guide members that are fastened inside the crosswise fastening grooves 33a, 33b are secured. The angle section from the lengthwise slide groove 33 to the openings of the crosswise fastening grooves 33a, 33b is shaped so that guide members 34 and crosswise fastening grooves 33a, 33b can smoothly fit together, for example, has an R-type smooth beveled shape as illustrated in the figure. The shape of this angle section may also simply be a bevel shape or an R shape.

Figure 26B:
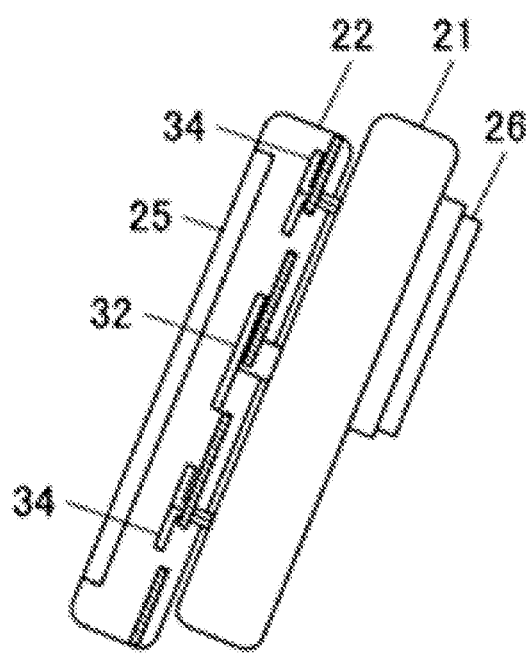
FIG. 26B is a side view of the portable telephone illustrated in FIG. 26A.

Here, when the overlapping and closed first housing 1 and second housing 2 are slid to one side in the crosswise direction, the locking screw member 32 and guide members 34 move into the fastening grooves 31a and 33a as illustrated in FIGS. 26A and 26B.

When the locking screw member 32 and guide members 34 are fastened in the crosswise fastening grooves 31a and 33a in this way, the bottom end section of the second housing 22 protrudes downward further than the bottom end section of the first housing 21, forming a step. Therefore, when placed on a placement surface, this portable telephone stands on its own by the step such that the second housing 22 tilts in the direction toward the first housing 21, so the display screen 25 is tilted toward the back, making it easier to see. In this case, the center of gravity of the first housing 21 and second housing 22 is above the position where the first housing 21 comes in contact with the placement surface, or is above between the position where the first housing 21 comes in contact with the placement surface and the position where the second housing 22 comes in contact with the placement surface.

Moreover, when the overlapping and closed first housing 21 and second housing 22 are slid to the other side in the crosswise direction, the locking screw member 32 and guide members 34 move into the other crosswise fastening grooves 31b, 33b as illustrated in FIG. 27.

Figure 27B:
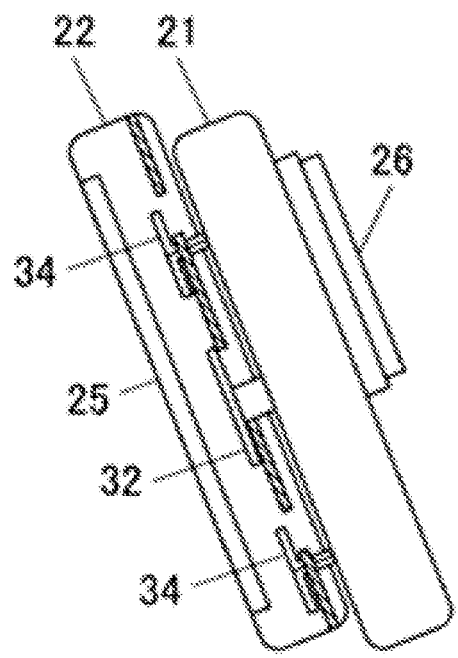
FIG. 27B is a side view of the portable telephone illustrated in FIG. 27A.

When the locking screw member 32 and guide members 34 are fastened in the other crosswise fastening grooves 31b and 33b in this way, the bottom end section of the first housing 21 protrudes downward further than the bottom end section of the second housing 22, forming a step as illustrated in FIG. 27B. Therefore, when placed on the placement surface, this portable telephone stands on its own by the step such that the first housing 21 tilting in the direction toward the second housing 22, so the camera section faces upward at an angle making it easy to use the self-timer function of the camera to take images. In this case, the center of gravity of the first housing 21 and second housing 22 is above the position where the second housing 22 comes in contact with the placement surface, or is above between the position where the second housing 22 comes in contact with the placement surface and the position where the first housing 21 comes in contact with the placement surface.

With the sliding-type portable telephone of this second exemplary embodiment described above, when the overlapping and closed first housing 21 and second housing 22 are slid in the crosswise direction by way of the crosswise fastening grooves 31a, 31b, 33a, 33b, the locking screw member 32 and guide members 34, a step is formed on the end sections of the housings. Consequently, when placed on a placement surface in view style, this portable telephone stands on its own such that the overlapping first housing 21 and second housing 22 are tilted. Therefore, the display screen 25 becomes nearly perpendicular with the line of sight and it becomes easier to see the screen. In addition, the camera section 26 faces upward at an angle, making it easier to use the self-timer function of the camera to take images.

Moreover, the a lengthwise slide groove 31 and locking screw member 32 are provided in the center of the lengthwise slide grooves 33 and guide members 34 on both sides, so the first housing 21 and second housing 22 are firmly secured during the sliding movement.

The center lengthwise slide groove 31 and locking screw member 32 may also be omitted.

Exemplary Embodiment 3

In the exemplary embodiments described above, the case in which sliding is performed with the long axes and the short axes of the first housing and second housing in an overlapping state as a standard was explained, however, the overlapping direction of the first housing and second housing (angle between the long axes and short axes when overlapped) is arbitrary. This is illustrated in a third exemplary embodiment and fourth exemplary embodiment. As illustrated in FIG. 28 and FIG. 29, in a third exemplary embodiment of the invention, a sliding-type T-shape portable telephone comprises a first housing 41 and second housing 42. The first housing 41 comprises an operation section 44 on one end section in the lengthwise direction of one surface. The second housing 42 comprises a display screen 45 on one surface.

It is not illustrated in the figure, however, the first housing 41 and second housing 42 comprise a center lengthwise slide groove 31 and locking screw member 32, and lengthwise slide grooves 33 and guide members 34 on both sides that are the same as those of the second exemplary embodiment described above. The axis of the locking screw member 32 is longer than the axis of the guide members 34, and even though the guide members 34 come out from the crosswise fastening grooves 33a, 33b, the locking screw member 32 does not come out. Therefore, when the guide members 34 come out from the crosswise fastening grooves 33a, 33b, the second housing 42 can rotate around the locking screw member 32. Here, when the second housing 42 is rotated, the portable telephone becomes a T shape in which the top edge of the first housing 41 and one long edge of the second housing 42 overlap.

Figure 28A:
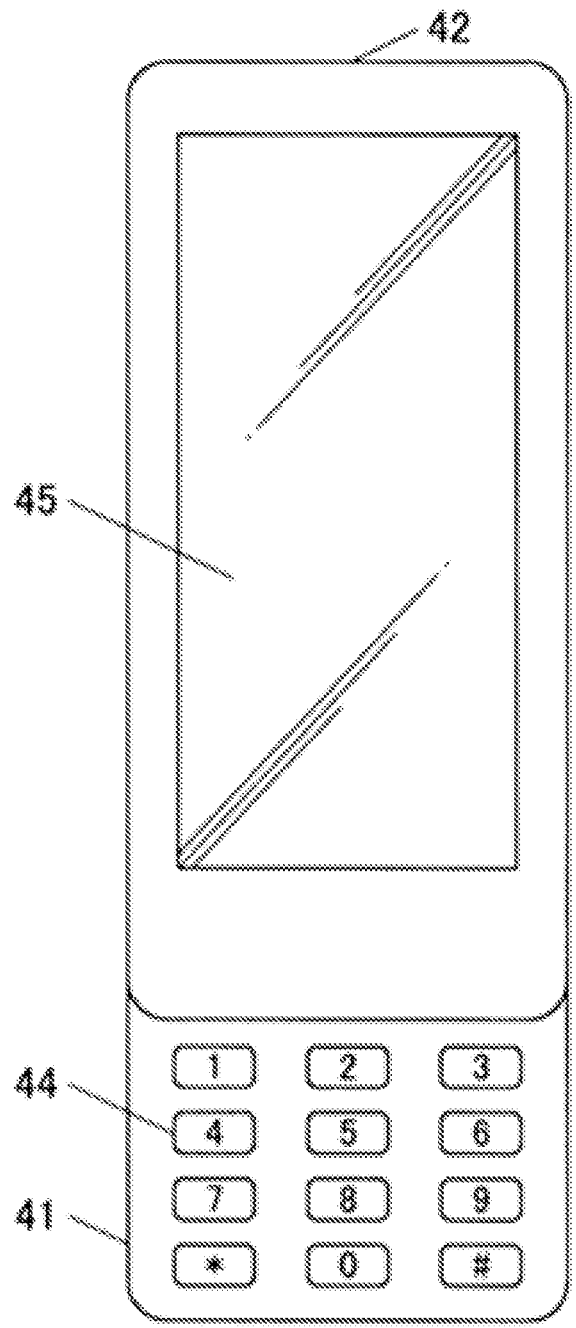
FIG. 28A is a front view of the normal state of a slide-type T-shape portable telephone of a third exemplary embodiment.
Figure 28B:
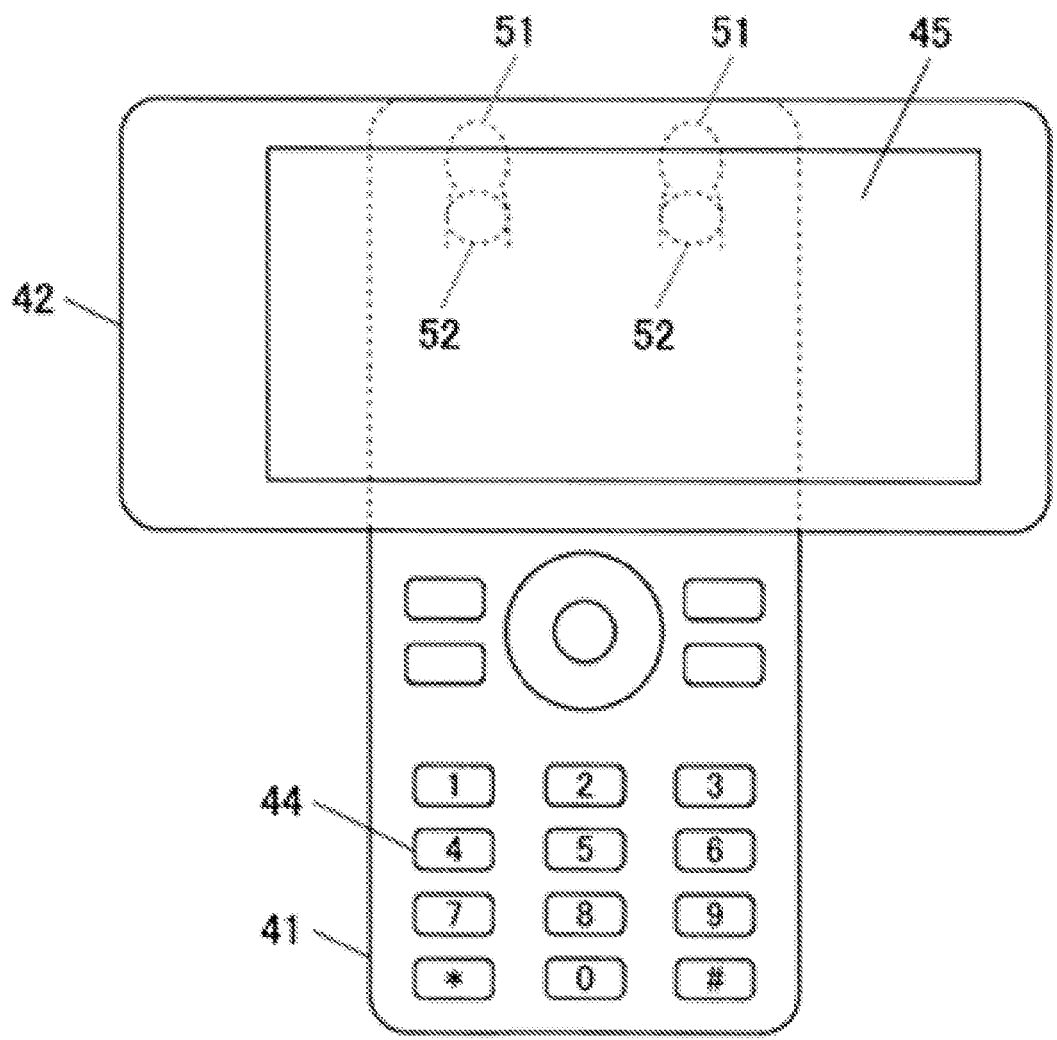
FIG. 28B is a front view illustrating the slide-type T-shape portable telephone of a third exemplary embodiment where the housings are rotated to change to a T shape.

Moreover, the first housing 41 comprises a pair of left and right lengthwise fastening grooves 51 on one end section in the lengthwise direction of one surface. The second housing 42 comprises a pair of left and right guide members 52 that are provided so that they protrude from one long edge section of the other surface. When the portable telephone is in a T shape as illustrated in FIG. 28B, the pair of left and right guide members 52 are not engaged with the pair of left and right lengthwise fastening grooves 51, however, by sliding both housings, they engage as illustrated in FIG. 28A.

Figure 29A:
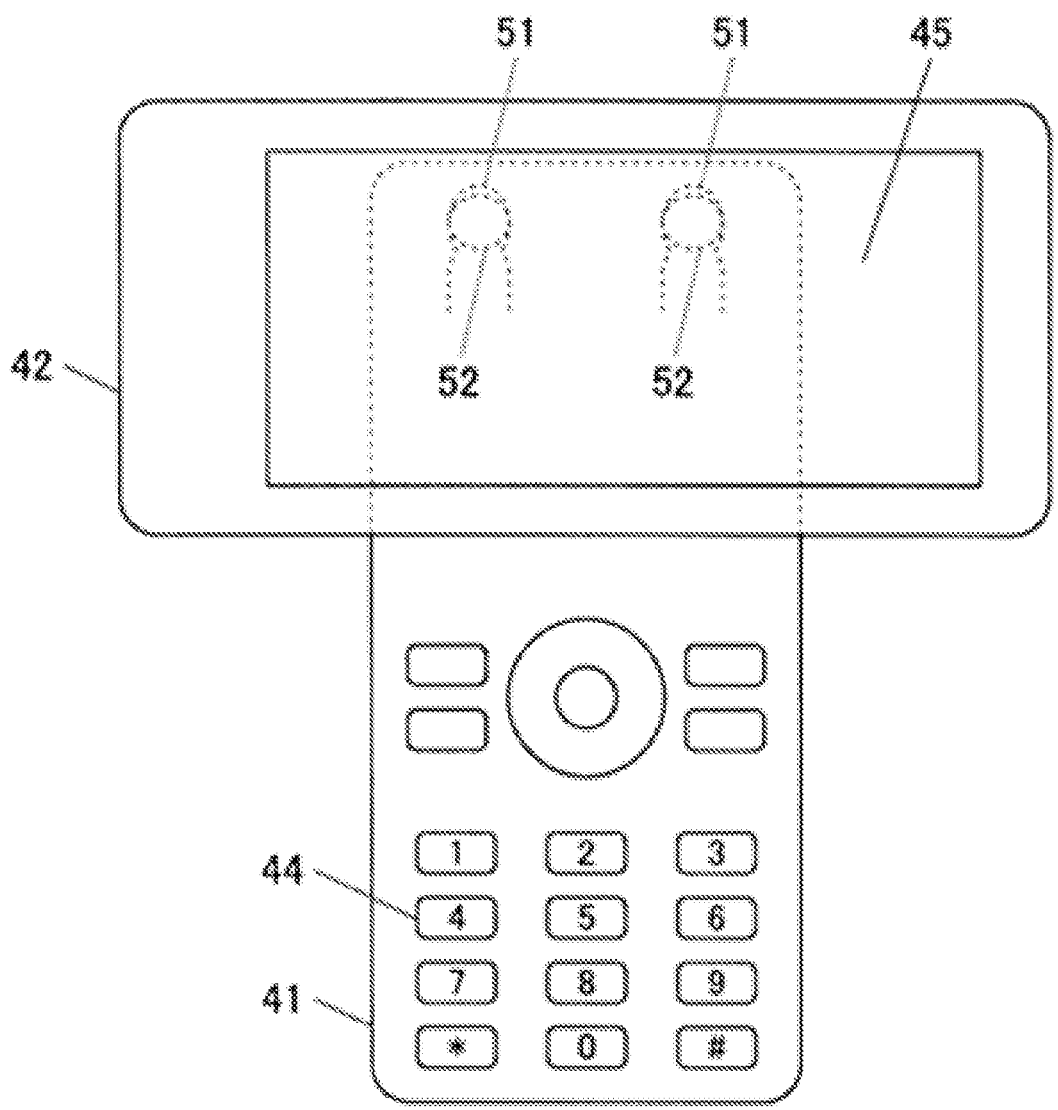
FIG. 29A is a front view of the portable telephone illustrated in FIG. 28B when slid after changed to a T shape.

Next, the operation of the sliding mechanism when this portable telephone is in the T shape is explained. When the portable telephone is in the T shape as illustrated in FIG. 28B, the left and right guide members 52 engage with the left and right lengthwise fastening grooves 51 as the horizontally arranged second housing 42 is slid as illustrated in FIG. 29A.

Figure 29B:
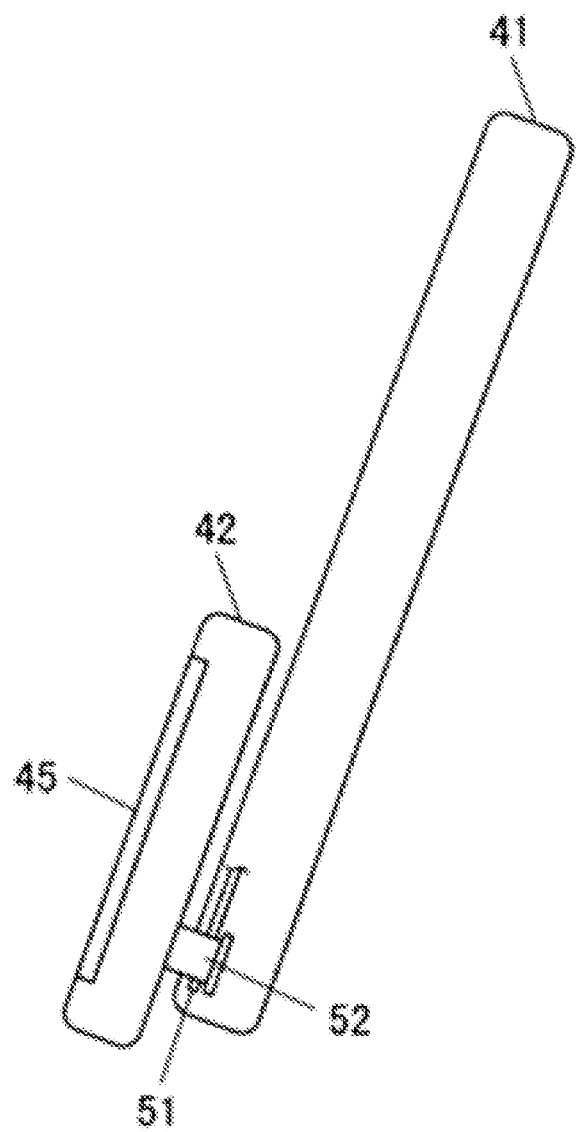
FIG. 29B is a side view of the portable telephone illustrated in FIG. 29A when turned upside down and placed on a floor.

Here, as illustrated in FIG. 29B, the top end section of the second housing 42 protrudes from the top end section of the first housing 41 (one long edge section), forming a step. Therefore, when facing the side with the step downward and placing the portable telephone on the placement surface, this portable telephone stands up on its own by the step such that second housing 42 tilts in the direction toward the first housing 41, so the display screen 45 tilts toward the back and becomes easier to see. In this case, the center of gravity of the first housing 41 and the second housing 42 is above the position where the first housing 41 comes in contact with the placement surface, or is above between the position where the first housing 41 comes in contact with the placement surface and the position where the second housing 42 comes in contact with the placement surface.

With the sliding-type T shape portable telephone of this third exemplary embodiment, when the first housing 41 and second housing 42 that are placed in a T shape are slid in the lengthwise direction, a step is formed at the end section of both housings. By facing the side of the step downward and placing this portable telephone on the placement surface, the portable telephone stands on its own such that the first housing 41 and second housing 42 tilt, so the display screen becomes nearly perpendicular with the line of sight, making it easier to see the screen.

It is not illustrated in the figures, however, by sliding both of the housings in the opposite direction and placing the portable telephone on the placement surface, the camera section faces upward at an angle, and thus it becomes easier to use the self-timer function of the camera to take images. In this case, the position of the center of gravity of the first housing 41 and the second housing 42 is above the position where the second housing 42 comes in contact with the placement surface, or is above between the position where the second housing 42 comes in contact with the placement surface and the position where the first housing comes in contact with the placement surface.

Above, the construction of a portable telephone was explained in which fastening grooves 51 are located on the side of the first housing 41 and guide members 52 are located on the side of the second housing 42, however, the construction of the portable telephone is not limited to this; for example, construction is possible in which the guide members are located on the side of the first housing 41, and the fastening grooves are located on the side of the second housing 42.

(Variation 7)

When the sliding-type T shape portable telephone of this third exemplary embodiment is used in a T shape, the display screen 45 may viewed by holding the first housing 41 by hand, or may be viewed by placing the portable telephone on a placement surface as described above. When switching between these methods of use, it may be necessary to change the direction of the image display, or in other word change the direction that the image is displayed on the display screen 45. Therefore, the direction when displaying an image on the display screen 45 may be changed automatically according to the orientation of the portable telephone. Here a housing orientation monitoring device and display screen control device are provided in the portable telephone. The housing orientation monitoring device is a device such as a gravity sensor, for example, and monitors the orientation of the housings. The housing orientation monitoring device is connected to the display screen control device, and sends the housing orientation information that the housing orientation monitoring device monitors to the display screen control device. The display screen control device is connected to the display screen 45, and based on the information from the housing orientation monitoring device, selects the image display direction corresponding to the current orientation of the housings, and according to this, changes the image display direction on the display screen 45. For example, when the housing orientation monitoring device is a gravity sensor, the gravity sensor detects the direction of gravitational force and outputs the information of that gravitational direction. The display screen control device receives that output, and from the gravitational direction, calculates the position of the vertical direction of two specified opposing edges of the display screen 45, determines the edge that is to be located on top with respect to the gravitational direction, and selects the image display direction such that the determined edge becomes the top edge of the display screen. In addition, the display screen control device displays an image on the display screen 45. In this way, depending on whether the image is viewed by holding the T shape portable telephone by hand, or the image is viewed by placing the portable telephone on the placement surface, the direction in which the image is displayed on the display screen 45 is switched automatically.

In addition, the direction when displaying an image on the display screen 45 maybe automatically changed according to the sliding state of the portable telephone. Here, a housing slide monitoring device, and display screen control device are provided in the portable telephone. The housing slide monitoring device monitors whether or not the housings of the portable telephone have been slid in order to place the portable telephone on a placement surface. The housing slide monitoring device is a method, for example, of detecting whether or not the grooves 51 have engaged with the guide members 52. The housing slide monitoring device is connected to the display screen control device, and sends monitoring information to the display screen control device of whether or not the housings have slid. The display screen control device is connected to the display screen 45, and based on the information from the housing slide monitoring device, selects the image display direction corresponding to the sliding status of the housings, and changes the image display direction of the display screen 45 accordingly. For example, in the case where the housing slide monitoring device is an engagement detection unit, when the T shape portable telephone is slid in order to place the portable telephone on a placement surface, the grooves 51 engage with the guide members 52, and the engagement detection unit detects this engagement. The detected signal is then sent to the display screen control device, and as long as this signal continues to be sent, the display screen control device positions the image display direction of the display screen 45 in a direction opposite a specified direction. On the other hand, when the slide state is released, the grooves 51 and guide members 52 become separated, and the signal from the engagement detection unit ends. When the signal is no longer sent, the display screen control device positions the image display direction of the display screen 45 in the specified direction. In this way, it is possible to automatically switch the direction that an image is displayed on the display screen 45 between when the T shape portable telephone is slid and placed on a placement surface, and when the portable telephone is held by hand and not slid.

Moreover, by combining the two kinds of automatic switching described above, when the portable telephone is slid in order to place the portable telephone on a placement surface, the orientation of the housings may be monitored, and changing of the image display direction can be stopped. When doing this, a housing slide monitoring device, housing orientation monitoring device and display screen control device are provided in the portable telephone. The housing slide monitoring device and housing orientation monitoring device are the same as those described above, and are both connected to a common display screen control device such that they can send respective monitoring information to that display screen control device. The display screen control device is connected to the display screen 45, and can change the image display direction. When information, which indicates that the housings have been slid in order to place the portable telephone on a placement surface, is received from the housing slide monitoring device, the display screen control device ignores information from the housing orientation monitoring device, and positions the image display direction of the display screen 45 in a direction opposite that of a specified direction. Moreover, when information, which indicates that the housings having not been slid in order to place the portable telephone on a placement surface, is received from the housing slide monitoring device, the display screen control device changes the image display direction of the display screen 45 based on information from the housing orientation monitoring device. By doing so, when the housings have been slid in order to place the portable telephone on a placement surface, the orientation of the housings can be monitored and changing of the image display direction can be stopped. Furthermore, when the housings have been slid in order to place the portable telephone on a placement surface, the housing orientation monitoring device may stop this change. Here a stopping device is further provided in the portable telephone. The stopping device is connected to the housing slide monitoring device and the housing orientation monitoring device. The stopping device receives information from the housing slide monitoring device, and when information is received that indicates that the housings have been slid in order to place the portable telephone on a placement surface, the stopping device stops the housing orientation monitoring device. By doing so, it is possible to stop the operation of the housing orientation monitoring device when not needed, so it is possible to reduce power consumption.

Exemplary Embodiment 4

Figure 30:
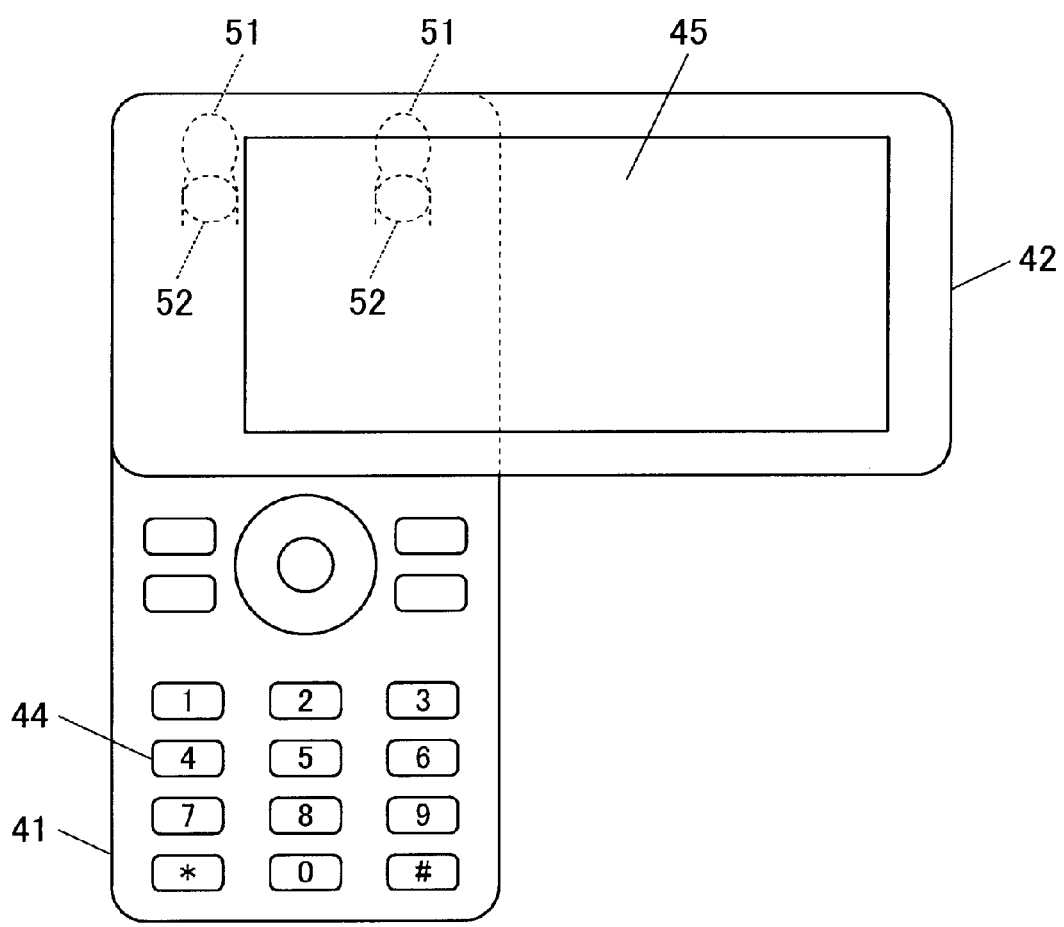
FIG. 30 is a front view of a slide-type L-shape portable telephone of a fourth exemplary embodiment after changed to an L shape.
Figure 31A:
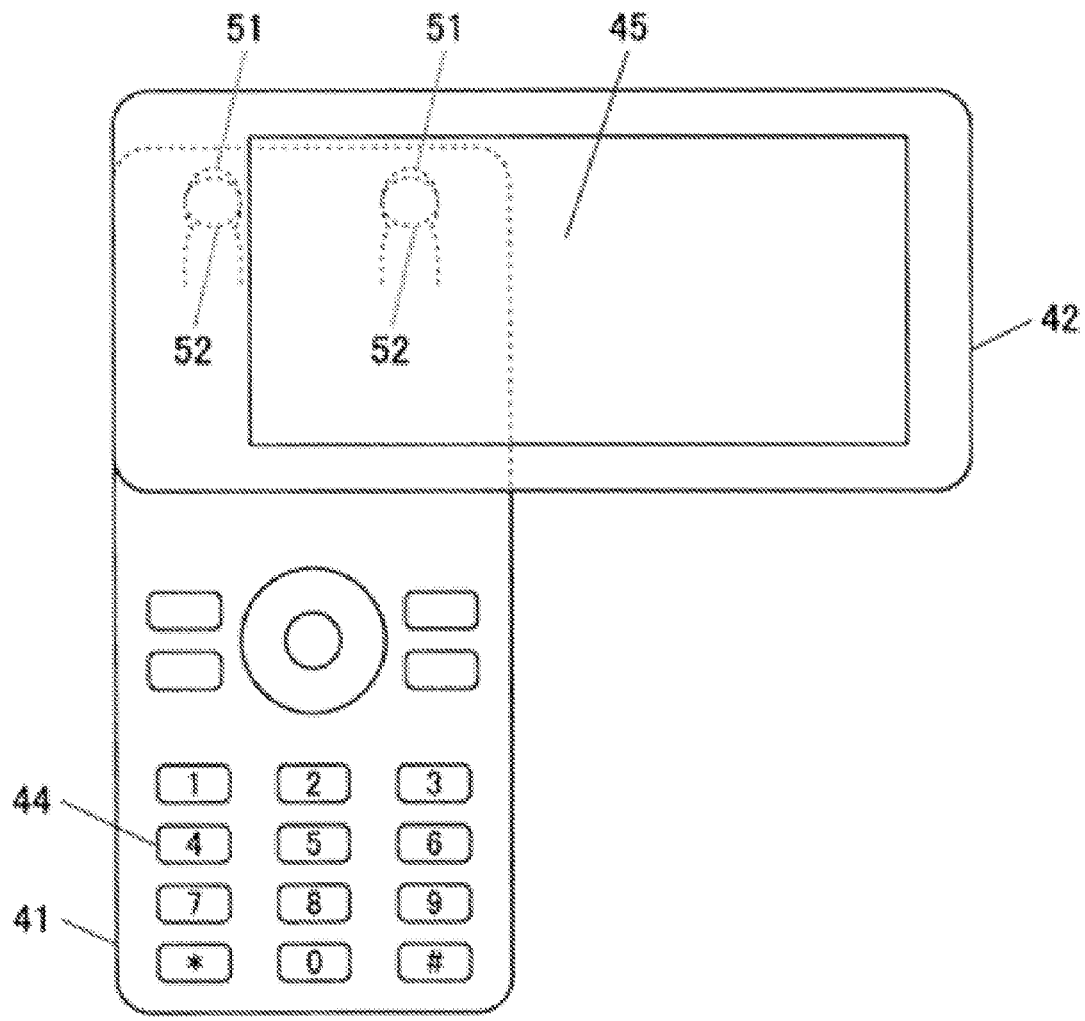
FIG. 31A is a front view of the portable telephone illustrated in FIG. 30 when slid after changed to an L shape.
Figure 31B:
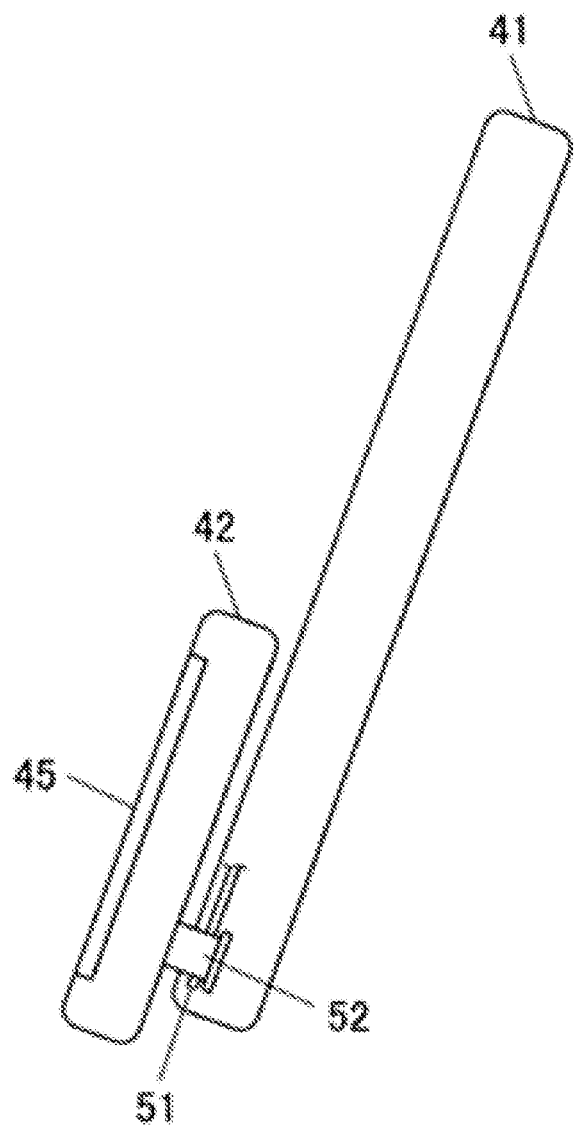
FIG. 31B is a side view of the portable telephone illustrated in FIG. 31A when turned upside down and placed on a floor.

As illustrated in FIG. 30 to FIG. 31B, in a fourth exemplary embodiment of the invention, a sliding-type L shape portable telephone comprises a first housing 41 and second housing 42. The first housing 41 comprises an operation section 44 on one end section in the lengthwise direction of one surface. The second housing 42 comprises a display screen on one surface.

It is not illustrated in the figures, however, the first housing 41 and second housing 42 comprise a center lengthwise slide groove 31 and locking screw member 32, and lengthwise slide grooves 33 and guide members 34 on both sides that are the same as in the third exemplary embodiment described above. Here, the axis of the locking screw member 32 is longer than the axis of the guide members 34 such that the locking screw member 32 does not come out even though the guide members 34 may come out from crosswise fastening grooves 33a, 33b. Therefore, when the guide members 34 come out from the crosswise fastening grooves 33a, 33b, the second housing 42 can rotate around the locking screw member 32. Here, as illustrated in FIG. 30, when the second housing 42 is rotated, a corner of the upper edge of the first housing and a corner of one long side of the second housing 42 overlap, and the portable telephone becomes an L shape.

The first housing 41 comprises a pair of left and right lengthwise fastening grooves 51 in one end section in the lengthwise direction of one surface. The second housing 42 comprises a pair of protruding guide members 52 on the side of one end section in the lengthwise direction of the other surface. When the portable telephone is in an L shape as illustrated in FIG. 30, the pair of left and right guide members 52 are not engaged with the respective lengthwise fastening grooves 51, however, by sliding the housings, they engage as illustrated in FIG. 31A.

Next, the operation of the sliding mechanism when this portable telephone is in the L state will be explained. In the portable telephone that is in the L state as illustrated in FIG. 30, when the second housing 42 that is arranged horizontally is slid toward one end section in the lengthwise direction in the lengthwise direction of the first housing 41, the guide members 52 engage with the left and right lengthwise fastening members 52 as illustrated in FIG. 31A.

Here, as illustrated in FIG. 31B, the top end section of the second housing 42 protrudes from the top end section (one long side) of the first housing 41, forming a step. Therefore, when the side where the step is formed is faced downward and the portable telephone is placed on a placement surface, this portable telephone stands on its own by the step such that the second housing 42 is tilted in the direction of the first housing 41, so the display screen 45 tilts toward the back side an becomes easier to see. In this case, the center of gravity of the first housing 41 and second housing 42 is above the position where the first housing 41 comes in contact with the placement surface, or above between the position where the first housing 41 comes in contact with the placement surface and the position where the second housing 42 comes in contact with the placement surface.

With the sliding-type L shape portable telephone of this fourth exemplary embodiment described above, when the first housing 41 and second housing 42 that are arranged in an L shape are slid in the lengthwise direction, a step is formed on the end sections of the housings. Therefore, when the side where the step is formed is faced downward and the portable telephone is placed on a placement surface, the portable telephone stands on its own with the first housing 41 and second housing 42 tilting, so the display screen 45 becomes nearly perpendicular with respect to the line of sight, and thus the screen become easier to see.

It is not illustrated in the figures, however, by sliding the housings in the opposite direction from that described above and placing the portable telephone on a placement surface, the camera section faces upward at an angle and it becomes easier to use the self-timer function of the camera to take images. In this case, the center of gravity of the first housing and the second housing is above the position where the second housing 42 comes in contact with the placement surface, or between above the position where the second housing 42 comes in contact with the placement surface and the position where the first housing 41 comes in contact with the placement surface.

In addition, in the explanation above, the construction of a portable telephone was explained in which the fastening grooves are arranged on the side of the first housing 41 and the guide members 52 are arranged on the side of the second housing 42, however, the construction of the portable telephone is not limited to this, and for example, construction is possible in which the guide members are arranged on the side of the first housing 41 and the fastening grooves are arranged on the side of the second housing 42.

(Variation 8)

Similar to the fourth exemplary embodiment, it is possible to provide the portable telephone with a gravity sensor, for example, and to automatically change the direction of the display when displaying an image on the display screen 45 according to the orientation of the portable telephone. Moreover, it is also possible to provide the portable telephone with a detection unit for detecting, for example, when the grooves 51 and guide members 52 engage, and to automatically change the direction of the display when displaying an image on the display screen 45 according to the state of sliding of the portable telephone. Furthermore, it is possible to combine the two methods of switching described above and to stop monitoring the orientation of the housings and changing of the image display direction when the portable telephone has been slid in order to place the portable telephone on a placement surface.

Exemplary Embodiment 5

Figure 32A:
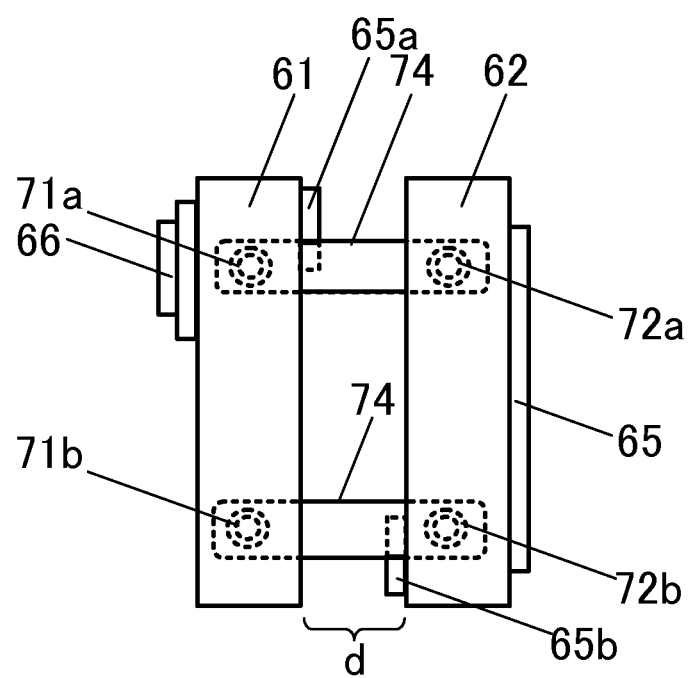
FIG. 32A is a side view of the normal state of a slide-type portable telephone of a fifth exemplary embodiment.

In the exemplary embodiments described above, sliding of the first housing and second housing was possible through the engagement of fastening grooves and guide members, however the sliding mechanism is not limited to this. In the following, an exemplary embodiment is explained in which the first housing and second housing are connected using an arm and rotating shaft such that they can slide. As illustrated in FIGS. 32A to 32C, in a fifth exemplary embodiment of the invention, a sliding-type portable telephone comprises a first housing 61 and second housing 62. The first housing 61 comprises an operation section 64a at one end in the lengthwise direction on one surface. The second housing 62 comprises a display screen 65 on one end in the lengthwise direction of one surface, and an operation section 64b on the other end in the lengthwise direction of one surface.

Figure 33A:
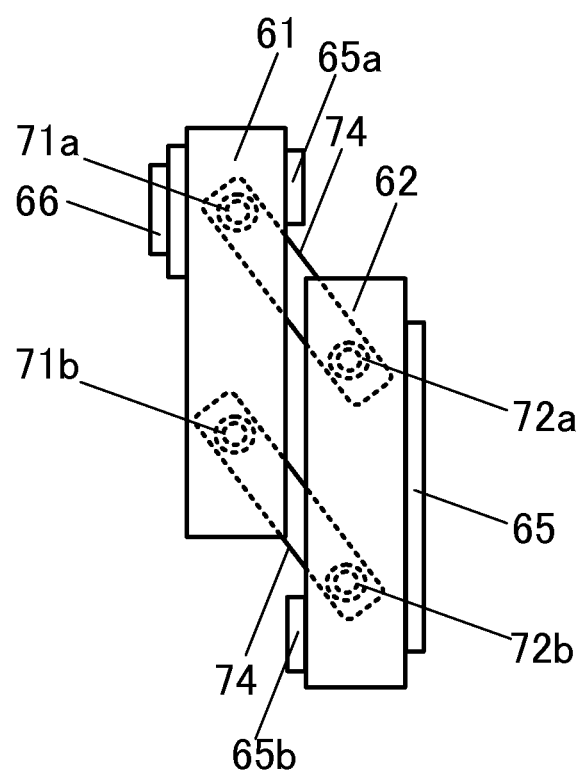
FIG. 33A is a side view of the portable telephone illustrated in FIG. 31C when slid to one direction in the crosswise direction after being slid in the lengthwise direction.
Figure 33C:
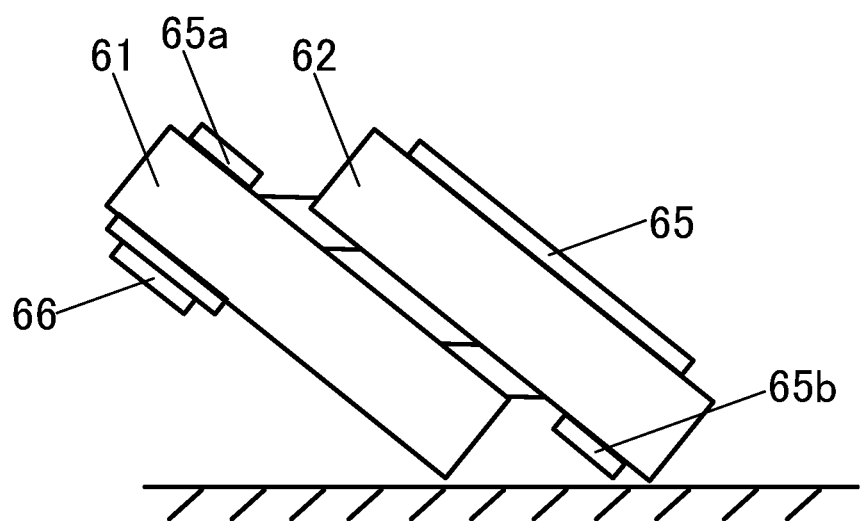
FIG. 33C is a side view of the portable telephone illustrated in FIG. 33A when placed on a floor.

As illustrated in FIG. 32B, the first housing 61 comprises a pair of left and right rotating shafts 71a, 71b along the long axis on one end section in the lengthwise direction of one surface. These rotating shafts 71a, 71b are fixed to the first housing 61. On the other hand, the second housing 62 comprises a pair of left and right rotating shafts 72a, 72b and bearings 73 along the long axis of the other surface. Here, as illustrated in FIG. 32A, when the first housing 61 and second housing 62 are closed, or in other words, when the top and bottom ends and left and right ends of the housings are aligned, the rotating shafts that correspond to the left and right of the first housing 61 and second housing 62, or in other words, rotating shafts 71a and 72a, and 71b and 72b face each other. The rotating shafts 72a, 72b are also supported by the bearings 73. The rotating shafts 72a, 72b can move inside the bearings, so as illustrated in FIG. 32C, the first housing 61 and second housing 62 can slide in the long axis direction. Furthermore, the end sections of the rotating shafts that correspond to the left and right of the first housing 61 and second housing 62, in other words rotating shafts 71a and 72a, and 71b and 72b, are connected by arms 74. The arms 74 rotate around the rotating shafts to which they are connected. As illustrated in the figures, when the first housing 61 and second housing 62 are closed, a specified gap d is formed between the first housing 61 and second housing 62 by the arms 74. As illustrated in FIGS. 33A and 33B, this makes it possible for the first housing 61 and second housing 62 to slide in the crosswise direction. In the explanation above, after sliding the housings along the long axis in the lengthwise direction, the housings are then slid along the short axis in the crosswise direction, however, it is possible to slide the housings in the crosswise direction without sliding them in the lengthwise direction, and it is also possible to slide the housings in the lengthwise direction after sliding them in the crosswise direction.

As illustrated in FIG. 34, both end sections of the rotating shafts that correspond to the left and right of the first housing 61 and second housing 62 can be connected to arms 74.

Next, the operation of the sliding mechanism of this portable telephone will be explained. When both housings of a portable telephone that is closed as illustrated in FIG. 32A are slid in the crosswise direction, the arms 74 are caused to tilt and stop when one surface of the first housing 61 comes in contact with the other surface of the second housing 62.

Here, as illustrated in FIG. 33A, the bottom end section of the second housing 62 protrudes from the bottom end section of the first housing 61, forming a step. Therefore, when the portable telephone is placed on a placement surface, this portable telephone stands up on its own such that the second housing 62 is tilted in the direction of the first housing 61, so the display screen 45 tilts toward the back and becomes easier to see. In this case, the center of gravity of the first housing 61 and second housing 62 is above the position where the first housing 61 comes in contact with the placement surface, or above between the position where the first housing 61 comes in contact with the placement surface and the second housing 62 comes in contact with the placement surface.

With the sliding-type portable telephone of this fifth exemplary embodiment, when the first housing 61 and second housing 62 are slid in the crosswise direction, a step is formed on the end sections of the housings. Consequently, when the portable telephone is placed on a placement surface, the portable telephone stands up on its own with the first housing 61 and second housing 62 tilted, so the display screen 65 becomes nearly perpendicular with the line of sight, and thus the screen becomes easier to see.

A camera section 66 may also be provided on the other surface of the first housing. Here, when the portable telephone is turned upside down and placed on the placement surface, the camera section 66 faces upward at an angle, so it becomes easier to use the self-timer function of the camera to take images. In this case, the center of gravity of the first housing 61 and the second housing 62 is above the position where the second housing comes in contact with the placement surface, or above between the position where the second housing 62 comes in contact with the placement surface and the position where the first housing 61 comes in contact with the placement surface. In the explanation above, the housings where slid along the short axis direction in the crosswise direction after sliding the housing along the long axis direction in the lengthwise direction, however, the housings can be slid in the crosswise direction without sliding them in the lengthwise direction, or the housings can be slid in the lengthwise direction after sliding them in the crosswise direction.

Moreover, as illustrated in FIG. 33B, it is possible to provide sub displays 65a, 65b on one end section in the crosswise direction of one surface of the first housing 61 or on the other end section in the crosswise direction of the other surface of the second housing 62, that protrude out when the housings are slid in the crosswise direction. Information related to the display screen 65, for example, when the display screen 65 is used as a television, information such as the television channel being viewed can be displayed on the sub display 65a. When the camera section 66 described above is provided, information related to the camera section 66, for example, the amount of time remaining until an image is taken when using the portable telephone to take images using the self-timer function, can be displayed on the sub display 65b.

Exemplary Embodiment 6

Figure 36A:
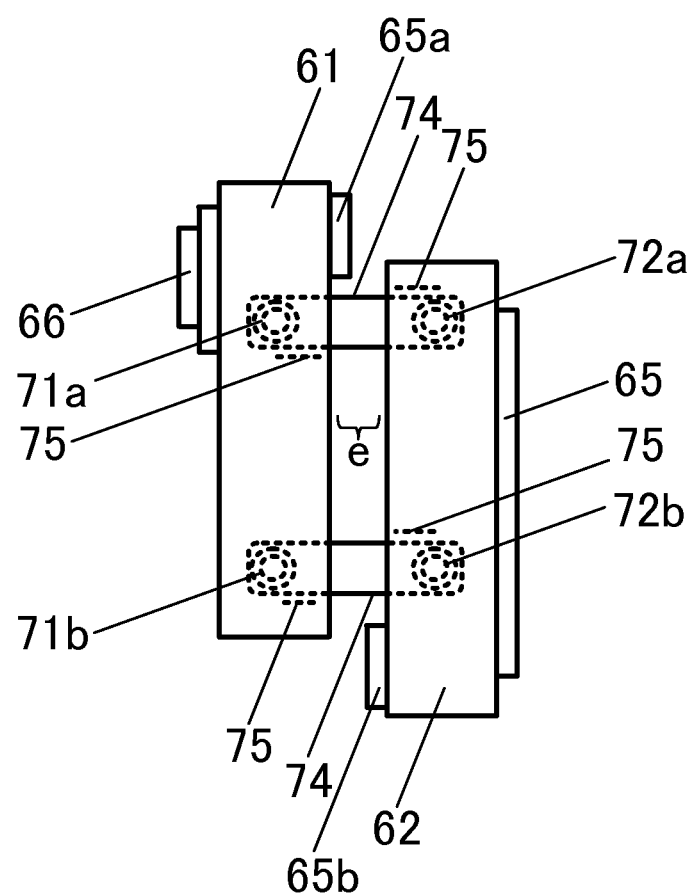
FIG. 36A is a side view of the portable telephone illustrated in FIG. 32C when slid to one side in the crosswise direction after being slid in the lengthwise direction.
Figure 36B:
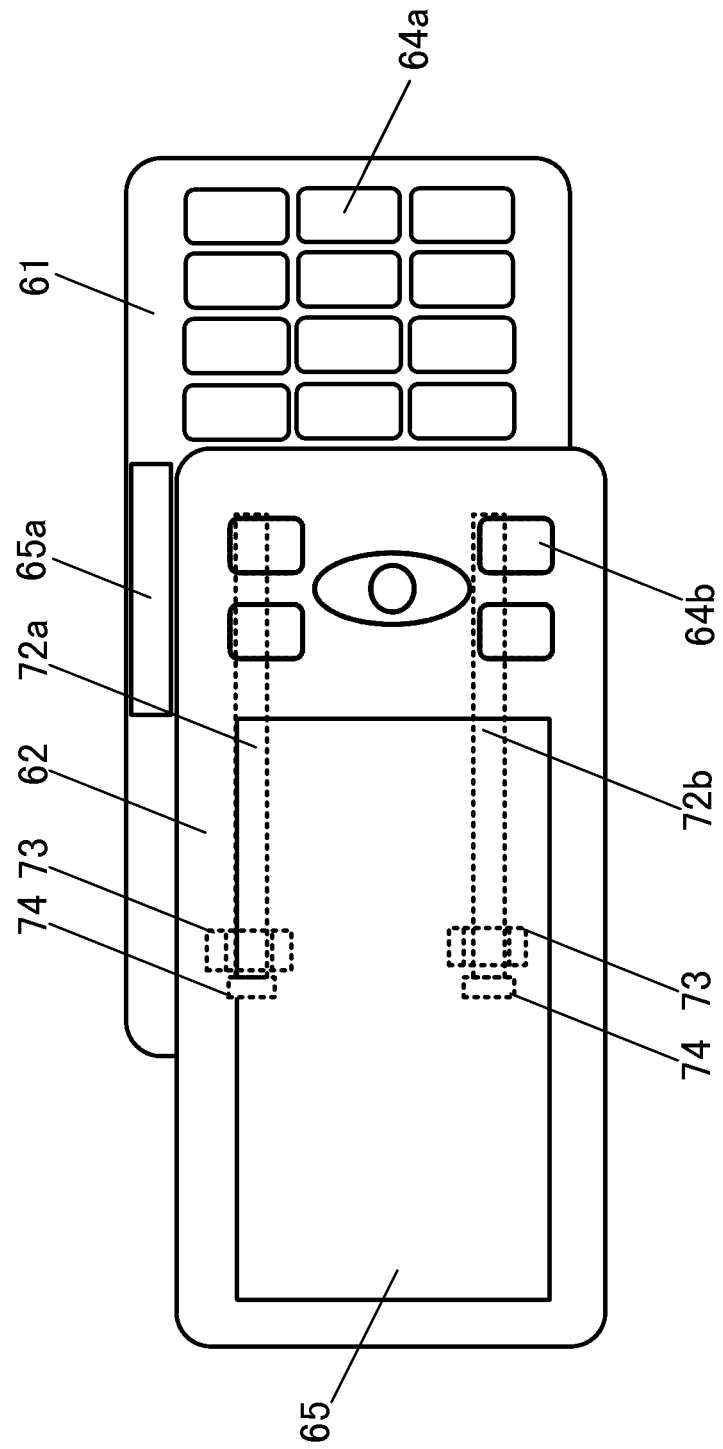
FIG. 36B is a front view of the portable telephone illustrated in FIG. 36A.
Figure 36C:
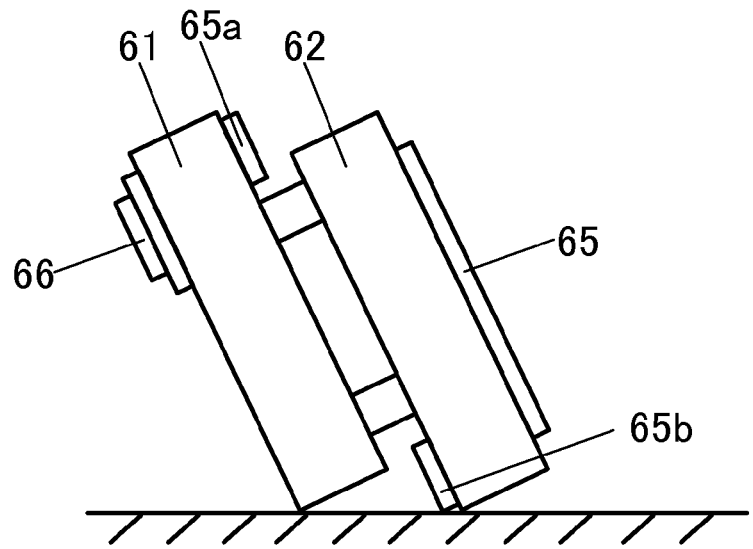
FIG. 36C is a side view of the portable telephone illustrated in FIG. 36A when placed on a floor.

In the fifth exemplary embodiment described above, the arms 74 create a specified gap d between the closed first housing and second housing, however, construction is also possible in which there is no gap. As illustrated in FIGS. 36A to 36C, in a sixth exemplary embodiment of the invention, a sliding-type portable telephone comprises a first housing 61 and a second housing 62. The first housing 61 comprises an operation section 64a on one end section in the lengthwise direction of one surface. The second housing 62 comprises a display screen 65 on one end section in the lengthwise direction of one surface and an operation section 64b on the other end section in the lengthwise direction of one surface.

Figure 35A:
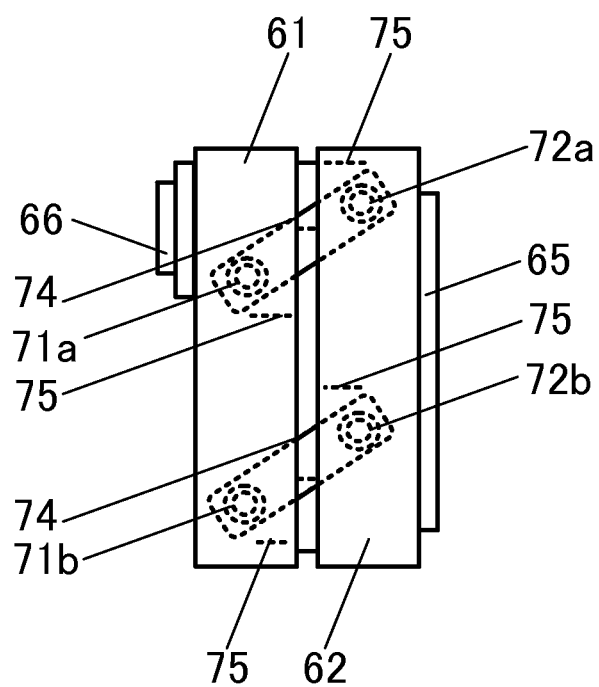
FIG. 35A is a side view of the normal state of a slide-type portable telephone of a sixth exemplary embodiment.

As illustrated in FIG. 35A, the first housing 61 comprises a pair of left and right rotating shafts 71a, 71b along the long axis on one end in the lengthwise direction of one surface. These rotating shafts 71a, 71b are fixed to the first housing 61 such that they can rotate. On the other hand, the second housing 62 comprises a pair of left and right rotating shafts 72a, 72b and bearings 73 along the long axis on the other surface. Here, as illustrated in FIG. 35A, when the first housing 61 and second housing 62 are closed, or in other words, when the top and bottom ends and left and right ends of the housings are aligned, the rotating shafts that correspond to the left and right of the first housing 61 and second housing 62, or in other words, rotating shafts 71a and 72a, and 71b and 72b, face each other at an angle. In addition, as illustrated in FIG. 35B, the rotating shafts 72a, 72b are supported by the bearings 73. The rotating shafts 72a, 72b can move inside the bearings 73, so as illustrated in FIG. 35C, the first housing 61 and second housing 62 can slide in the lengthwise direction. Furthermore, one of the end sections of the rotating shafts that correspond to the left and right of the first housing 61 and second housing 62, in other words, rotating shafts 71a and 72a, and 71b and 72b are connected to each other by way of the arms 74. The arms 74 rotate around the rotating shaft to which they are connected. As illustrated in FIGS. 36A and 36B, the first housing 61 and second housing 62 slide in only one direction in the crosswise direction. There are stoppers 75 provided near the connection portions of the arms 74 and rotating shafts 71a, 71b, 72a, 72b. By restricting the range of movement of the arms 74, the stoppers 75 perform the function of stopping the sliding. Part of the first housing and second housing cover members may be used as the stoppers 75.

As illustrated in FIG. 34, in this exemplary embodiment as well, similar to the fifth exemplary embodiment, both ends sections of the rotating shafts that correspond to the left and right of the first housing 61 and second housing 62 may be connected by way of arms 74.

Next, the operation of the sliding mechanism of this portable telephone will be explained. In a closed portable telephone as illustrated in FIG. 35A, as the housings are slid in one direction in the crosswise direction, the arms 74 rise and come in contact with the stoppers and stop as illustrated in FIG. 36A. Here, the arms 74 cause a specified gap e to occur between the first housing 61 and second housing 62.

Here, as illustrated in FIG. 36A, the bottom end section of the second housing 62 protrudes from the bottom end section of the first housing 61, forming a step. Therefore, as illustrated in FIG. 36C, when the portable telephone is placed on a placement surface, this portable telephone stands up on its own by the step such that the second housing 62 tilts in the direction toward the first housing 61, so the display screen 45 is tilted toward the back side, becoming easier to see. In this case, the position of the center of gravity of the first housing 61 and the second housing 62 is above the position where the first housing 61 comes in contact with the placement surface, or above between the position where the first housing 61 comes in contact with the placement surface and the position where the second housing 62 comes in contact with the placement surface. Moreover, here, by providing a specified gap e, the space between the position where the first housing 61 comes in contact with the placement surface and the position where the second housing 62 comes in contact with the placement surface becomes wider, and the center of gravity becomes more stable.

With the sliding-type portable telephone of this sixth exemplary embodiment described above, when the first housing 61 and second housing 62 are slid in the crosswise direction, a step is formed on the end sections of the housings. Therefore, when the portable telephone is placed on a placement surface, the portable telephone stands on its own with the first housing 61 and second housing 62 tilted, so the display screen 65 becomes nearly perpendicular with the line of sight, and thus the screen become easier to see.

A camera section 66 can be provided on the other surface of the first housing 61. When the portable telephone is turned upside down and placed on a placement surface, the camera section 66 faces upward at an angle, making it possible to more easily use the self-timer function of the camera to take images. In this case, the position of the center of gravity of the first housing 61 and second housing 62 is above the position where the second housing 62 comes in contact with the placement surface, or above between the position where the second housing 62 comes in contact with the placement surface and the position where the first housing 61 comes in contact with the placement surface.

As illustrated in FIG. 36B, it is possible to provide sub displays 65a, 65b on one end section in the crosswise direction of one surface of the first housing 61 or on the other end section in the crosswise direction of the other surface of the second housing 62, that protrude out when the housings are slid in the crosswise direction. Information related to the display screen 65, for example, when the display screen 65 is used as a television, information such as the television channel being viewed can be displayed on the sub display 65a. When the camera section 66 described above is provided, information related to the camera section 66, for example, the amount of time remaining until an image is taken when using the portable telephone to take images using the self-timer function, can be displayed on the sub display 65b.

(Variation 9)

Figure 37A:
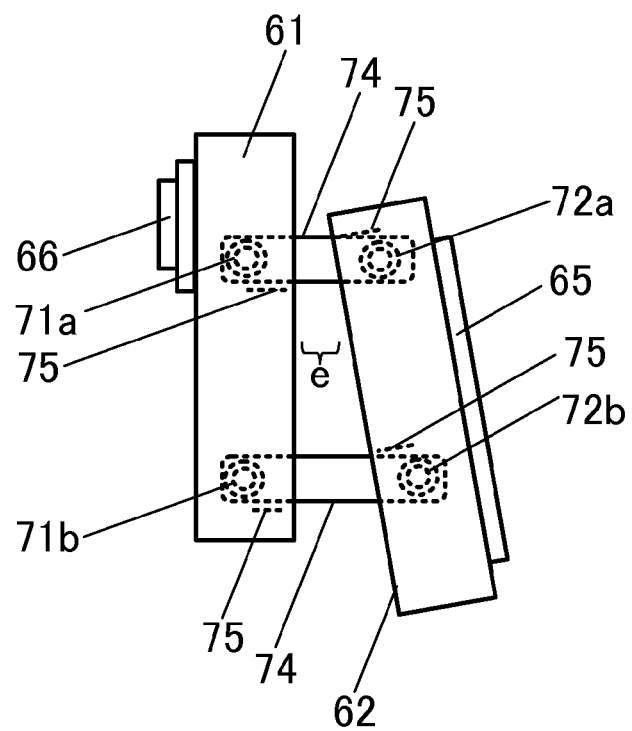
FIG. 37A is a side view of a slide-type portable telephone of a ninth variation when slid to one side in the crosswise direction.
Figure 37B:
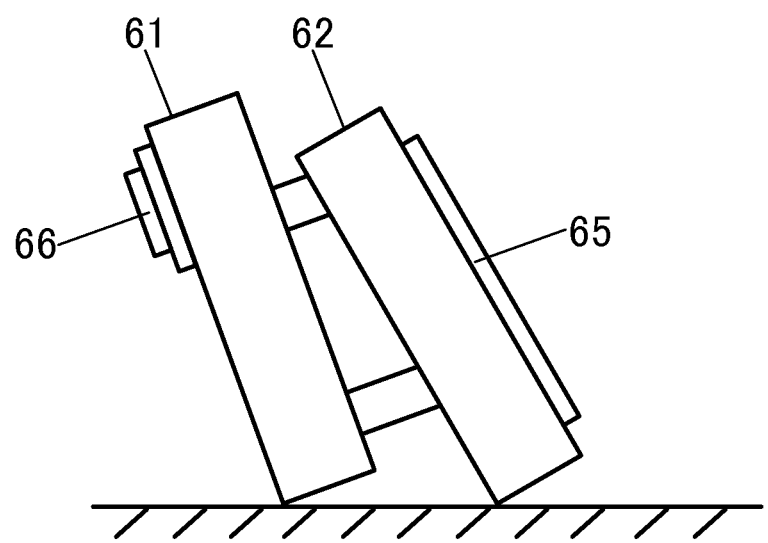
FIG. 37B is a side view of the portable telephone illustrated in FIG. 37A when placed on a floor.

In variation 9 of the sixth exemplary embodiment illustrated in FIG. 37A, one of the arms 74 is long. By doing so, the stability of the portable telephone when used for viewing television or as a camera can be improved beforehand.

Exemplary Embodiment 7

Figure 38A:
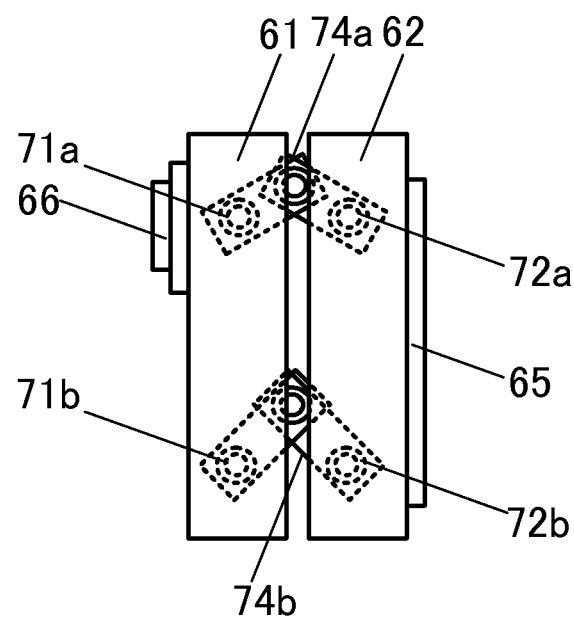
FIG. 38A is a side view of the normal state of a slide-type portable telephone of a seventh exemplary embodiment.
Figure 38B:
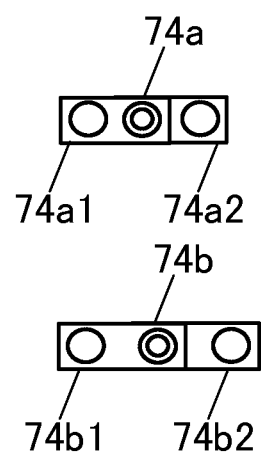
FIG. 38B is a diagram illustrating the extended state of an arm section of a slide-type portable telephone of a seventh exemplary embodiment.

In the sixth exemplary embodiment described above, the arms 74 formed a specified gap e between the slid first housing and second housing. The larger the gap, the more stability there is when the portable telephone is placed on a placement surface. Therefore, an exemplary embodiment will be explained below that allows for the length of the arms to be lengthened or shortened. As illustrated in FIGS. 38A and 38B, in a seventh exemplary embodiment of the invention, a sliding-type portable telephone comprises a first housing 61 and second housing 62. As in the sixth exemplary embodiment described above, the first housing 61 comprises an operation section 64a on the other end section in the lengthwise direction of one surface, and the second housing 62 comprises a display screen 65 on one end section in the lengthwise direction of one surface, and an operation section 64b on the other end section in the lengthwise direction of one surface (refer to FIG. 36).

Similar to as in the sixth exemplary embodiment, the first housing 61 comprises a pair of left and right rotating shafts 71a, 71b along the long axis of one end section in the lengthwise direction of one surface. These rotating shafts 71a, 71b are fastened to the first housing such that they can rotate. On the other hand, the second housing 62 comprises a pair of left and right rotating shafts 72a, 72b and bearings 73 along the long axis on the other surface. Here, when the first housing 61 and second housing 62 are closed, in other words when the top and bottom ends and left and right ends of the housings are aligned and the first housing and second housing overlap with hardly any gap, the rotating shafts that correspond to the left and right of the first housing 61 and second housing 62, in other words, rotating shafts 71a and 72a, and 71b and 72b face each other. In addition, the rotating shafts 72a, 72b are supported by the bearings 73. The rotating shafts 72a, 72b can move inside the bearings 73, so, as in the sixth exemplary embodiment, the first housing 61 and second housing 62 can slide in the lengthwise direction. Furthermore, both end sections of the rotating shafts that correspond to the left and right of the first housing 61 and second housing 62, in other words, rotating shafts 71a and 72a, and 71b and 72b are connected to each other by arms 74a and 74b as illustrated in FIG. 38A. The arms 74a, 74b rotate around the respective axis of rotation to which they are connected. Moreover, the arms 74a, 74b comprise a first arm section 74a1, 74a2 and second arm section 74b1, 74b2. The other ends of the first arm section and second arm section are connected to the end sections of the rotating shafts described above. As illustrated in FIG. 38A, when the first housing 61 and second housing 62 are closed, the arms 74 are folded, and the first housing 61 and second housing 62 overlap with hardly any gap between them. When the arms are in the extended state, as illustrated in FIG. 38B, the arm 74b that is connected to the rotating shafts 71b, 72b on the left side is longer than the arm 74a that is connected to the rotating shafts 71a, 72a on the right side.

Next, the operation of the opening/closing mechanism of this portable telephone is explained. In a portable telephone that is closed as illustrated in FIG. 38A, when the first housing 61 is moved such as to become separated from the second housing 62, the arms 74a, 74b extend and the arms 74a, 74b stop after being completely extended. The lengths of the arms 74a and 74b are different, so a difference is formed in the opening of the top ends and the bottom ends of the housings.

Figure 39A:
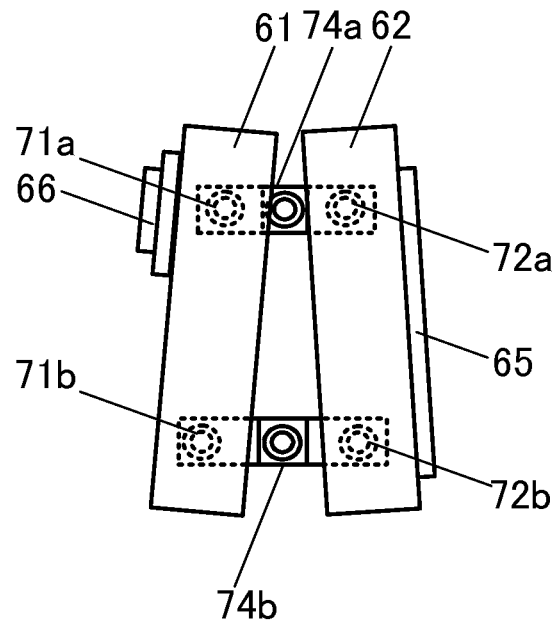
FIG. 39A is a side view of the portable telephone illustrated in FIG. 38A when the arm section is extended.
Figure 39B:
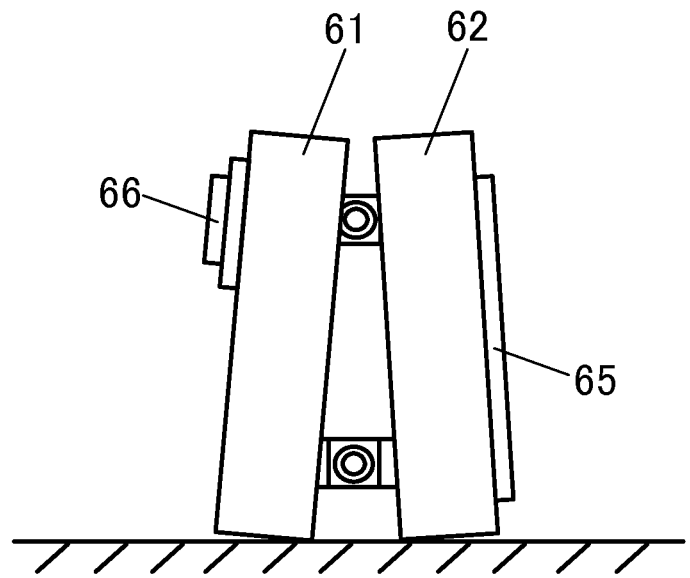
FIG. 39B is a side view of the portable telephone illustrated in FIG. 39A when placed on the floor.

Here, when the second housing 62 and first housing 61 are viewed from the side as illustrated in FIG. 39A, the outer shape is a trapezoidal shape having a small top edge. Therefore, when the portable telephone is placed on a placement surface, this portable telephone stands on its own as illustrated in FIG. 39B with the both the second housing 62 and first housing 61 leaning toward each other, so the display screen 45 tilts toward the back, becoming easier to see. In this case, the position of the center of gravity of the first housing 61 and second housing 62 is above between the position where the second housing 62 comes in contact with the placement surface and the position where the first housing 61 comes in contact with the placement surface.

With the sliding-type portable telephone of this seventh exemplary embodiment described above, when the first housing 61 and second housing 62 are moved such that they separate from each other, a difference is formed in the opening at the top end and bottom end of the housings. Therefore, when the portable telephone is placed on a placement surface, the portable telephone stands up on its own with the second housing 62 and first housing 61 leaning toward each other, so the display screen 65 becomes nearly perpendicular to the line of sight, and thus the screen becomes easier to see.

A camera section 66 may also be provided on the other surface of the first housing 61. In that case, when the portable telephone is turned upside down and placed on a placement surface, the camera section 66 faces upward at an angle, and thus it becomes easier to use the self-timer function of the camera to take images.

(Variation 10)

Figure 40A:
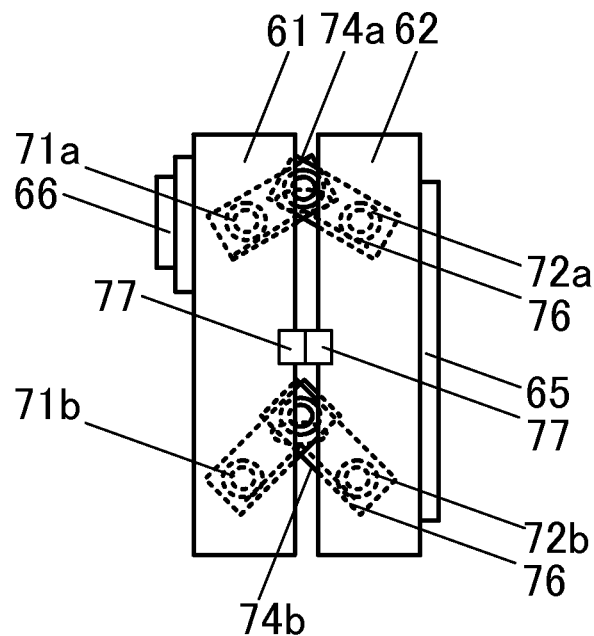
FIG. 40A is a side view of the normal state of a slide-type portable telephone of a tenth variation.
Figure 40B:
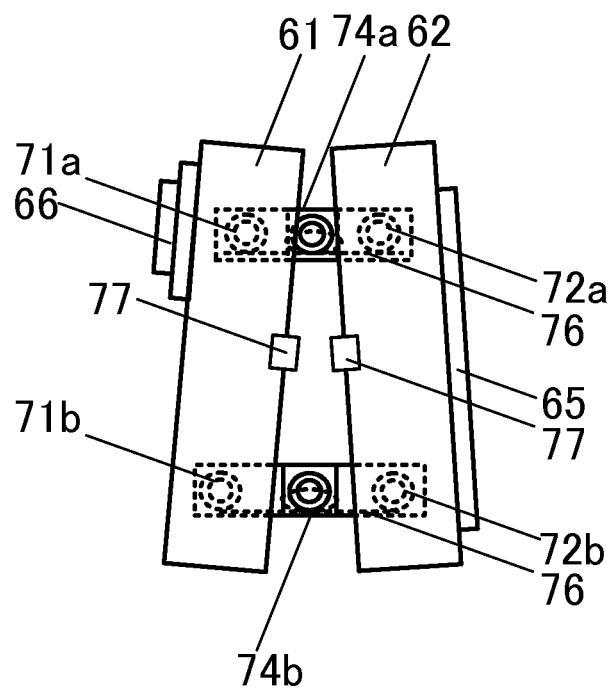
FIG. 40B is a side view of a slide-type portable telephone of a tenth variation when an open/close stopper is open.

Moreover, in the exemplary embodiments described above, the arms 74a, 74b are extended manually, however, in variation 10 of the seventh exemplary embodiment illustrated in FIG. 40A, torsion coil springs 76 are provided in the arms 74a, 74b and constantly apply a force in the direction spreading the arms. In this case as well, opening/closing stoppers 77 are provided on both or just one of the first housing 61 and second housing 62 in order to maintain the folded state of the arms 74a, 74b. The opening/closing stoppers 77, for example, are flexible tabs that can engage with each other. When suppressed by the opening/closing stoppers 77, the first housing 61 and second housing 62 are closed as illustrated in FIG. 40A. However, when the opening/closing stoppers are operated and released, the torsion coil springs 76 automatically extend the arms 74a, 74b, and this opens the first housing 61 and second housing 62 as illustrated in FIG. 40B. In this case, by just operating the opening/closing stoppers 77, the portable telephone can move on its own to an adequate opened state. A detailed explanation is omitted here, however, as illustrated in FIG. 35C, the first housing 61 and second housing 62, could also both slide in the lengthwise direction.

Exemplary Embodiment 8

When standing the portable telephone up on its own using the sixth and seventh exemplary embodiments, separating the first housing and second housing was explained as being preferred, however, this kind of feature may also be implemented in a portable telephone comprising a first housing and second housing that are connected by way of a biaxial hinge as described in the first exemplary embodiment. The construction of the portable telephone of the eighth exemplary embodiment of the invention is the same as that of the first exemplary embodiment except for the slide member 14.

Figure 41:
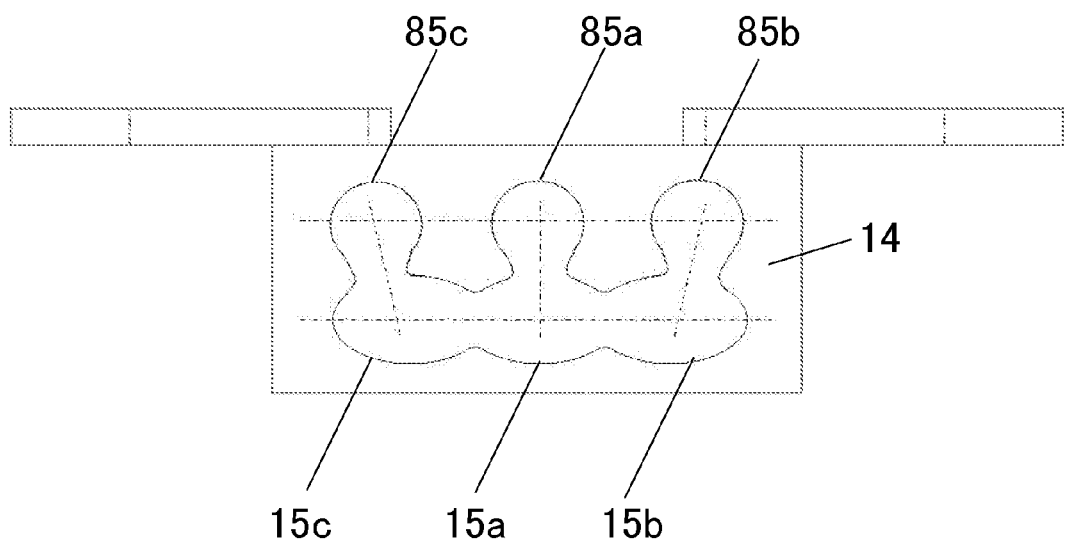
FIG. 41 is a front view of the slide member of a portable telephone of an eighth exemplary embodiment.

As illustrated in FIG. 41, the slide member 14 of this exemplary embodiment comprises three aligned fastening grooves 15a, 15b, 15c, and further comprises three fastening grooves 85a, 85b, 85c that are provided above the fastening grooves 15a, 15b, 15c. When the portable telephone is closed and the housings are not shifted, the second rotating shaft 12 is secured in the center fastening groove 15a.

Figure 42A:
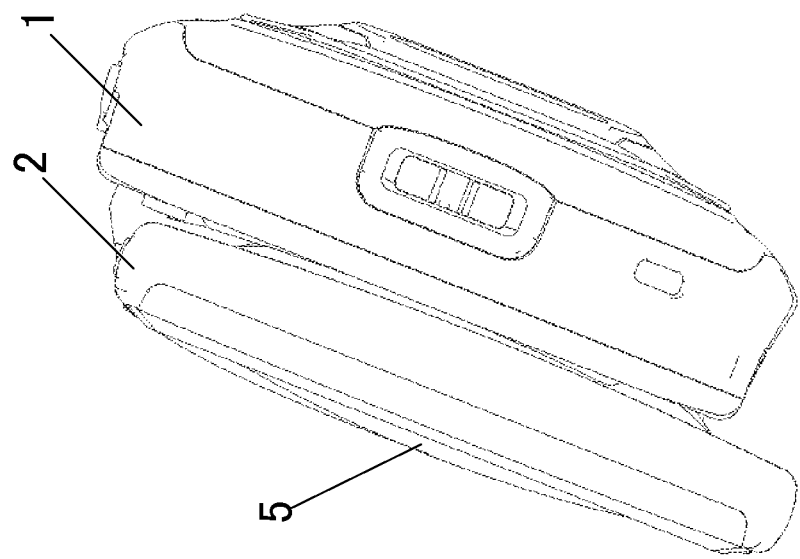
FIG. 42A is a diagram illustrating the positional relationship between the slide member and second rotating shaft of the portable telephone of an eighth exemplary embodiment when slid to one side in the crosswise direction.
Figure 42B:
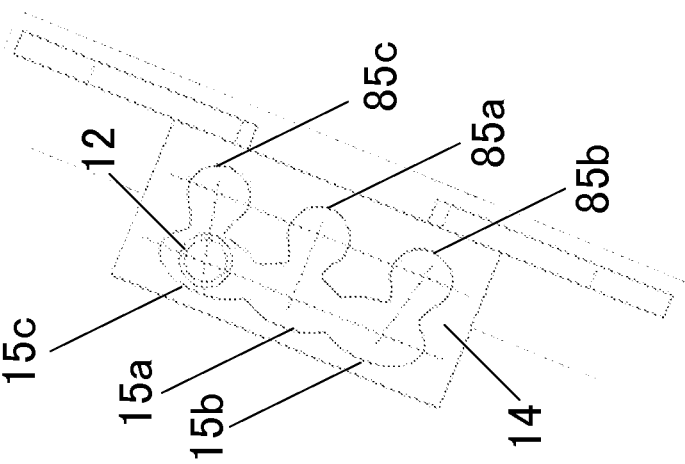
FIG. 42B is a side view of a portable telephone of an eighth exemplary embodiment when slid to one side in the crosswise direction.

Next, the operation of the sliding mechanism of this portable telephone will be explained. When the portable telephone is closed and the housings have not been slid, both of the housings of this portable telephone can be slid in the crosswise direction as in the case of the portable telephone of the first exemplary embodiment. For example, when the housings are slid in one direction in the crosswise direction, the second rotating shaft 12 is secured in the fastening groove 15c as illustrated in FIG. 42A. Here, when the second housing 2 is moved such that it separates from the first housing 1, the second rotating shaft 12 moves from the fastening groove 15 to the fastening groove 85c, and is secured in fastening groove 85c as illustrated in FIG. 43A. In this way, it is possible to slide the second housing 2 in a direction away from the first housing 1 (diagonally upward toward the left in FIG. 43A). Sliding the housings in a separating direction in this way may be performed after sliding the housings in the other direction in the crosswise direction, or even when the housings have not been slid in the crosswise direction. When the second housing 2 has been slid forward from the first housing 1 in this way, the gap f between the housings becomes large as illustrated in FIG. 43B.

By securing the second rotating shaft 12 in fastening groove 85c or fastening groove 85b on one of the ends in this way, the gap between housings becomes large, so when the portable telephone is placed on a placement surface, this portable telephone stably stands on its own as in the first exemplary embodiment.

With the folding-type portable telephone of this eighth exemplary embodiment, when the overlapping first housing 1 and second housing 2 are slid in the crosswise direction by way of the second rotating shaft 12 and sliding member 14, and then further slid forward, wide step is formed on the end sections of both housings. Therefore, when this portable telephone is placed on a placement surface in view style, the portable telephone stands on its own with the overlapping first housing 1 and second housing 2 in a tilted state. Therefore, the display screen 5 becomes nearly perpendicular to the line of sight, and thus the screen becomes easier to see. In addition, the camera section 6 faces upward at an angle, and thus it becomes easier to use the self-timer function of the camera to take images.

Figure 44A:
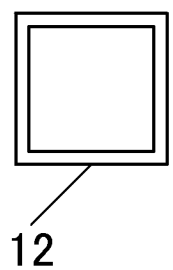
FIG. 44A is a side view of a second rotating shaft having a square-shaped cross-section, and is for explaining a variation of the eighth exemplary embodiment.
Figure 44B:
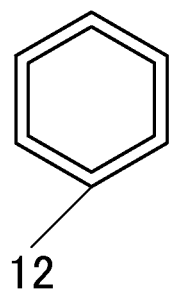
FIG. 44B is a side view of a second rotating shaft having a hexagonal-shaped cross-section, and is for explaining a variation of the eighth exemplary embodiment.
Figure 44C:
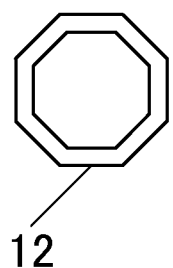
FIG. 44C is a side view of a second rotating shaft having an octagonal-shaped cross-section, and is for explaining a variation of the eighth exemplary embodiment.

In the exemplary embodiments described above, the cross-sectional shape of the second rotating shaft 12 is circular, however, a polygonal shape as illustrated in FIGS. 44A to 44C is also possible. In the state in which the second housing 2 is pulled-out in a direction separating from the first housing, the slide member 14, and thus the second housing 2 can rotate easily around the second rotating shaft 12, however, by making the cross-sectional shape of the second rotating shaft 12 polygonal, this rotation can be suppressed.

In the first through eighth exemplary embodiments described above, an example of a portable telephone was used, however, the invention is not limited to this, and may equally be applied to all electronic devices having two housings that are connected such that they can freely move, such as a PDA, a notebook computer, a wearable personal computer, a calculator, an electronic dictionary and the like.

In the first through eighth exemplary embodiments, an example of a portable telephone having two housings that are joined by a biaxial hinge such that the housings can freely move was given, however, the connection section of the housings could also be a rotating hinge that connects the two housings such that they can freely rotate on the same plane.

Furthermore, in the first through eighth exemplary embodiments described above, the construction of the connection section and shape of the fastening section are arbitrary, and of course it is possible to suitably change the construction of the detailed parts.

For example, in the first through eighth exemplary embodiments, the two housings preferably have a rectangular solid shape as illustrated in the respective diagrams, however the invention is not limited to this, and could be another shape such as an elliptical cylinder.

Moreover, a second variation of the first exemplary embodiment, beveled sections 1d, 1e, 2d, 2e were formed using a flat sloped surface on the bottom end sections of the overlapping housings 1, 2 where the step is formed, however, these beveled sections may also be applied to the other exemplary embodiments 2 to 8. The other variation also can be applied to other exemplary embodiments. It is possible to provide a camera section on the side of the display screen to be used when using the portable telephone as a television telephone or when taking self images.

Furthermore, by making the length in the short axis direction of the first housing shorter than the length in the short axis direction of the second housing, it is possible to form a step beforehand. In so doing, in exemplary embodiments 1 to 6 and 8, the angle of the screen when standing the portable telephone up on its own can be selected from the angle of the step provided beforehand, or the angle after further sliding the housings.

The essence of the invention was explained and illustrated by referencing one or more of the preferred exemplary embodiments, however it is clear that the arrangement and details of the preferred exemplary embodiments can be modified as long as those modifications do not depart from the essence of the invention disclosed here, and furthermore, it is clear that it is intended that the invention be interpreted as including all modifications and changes as long as they are within the scope and intent of the invention disclosed here.

The present invention improves the convenience of using a portable telephone having two housings when the portable telephone is placed on a floor and the like, however, the intention is not limited to a portable telephone, and can be applied to and has industrial applicability for all objects having two housings and that can be used by being placed on a floor and the like.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A device comprising:
a first housing including a first end section;
a second housing including a second end section; and
a first connection section and a second connection section that connect the first housing and the second housing,
wherein the first connection section connects the first housing and the second housing such that the first housing is movable with respect to the second housing along a first direction,
the second connection section connects the first housing and the second housing such that the first housing is movable with respect to the second housing along a second direction that is different from the first direction, between a position where the first housing and the second housing are overlapped so that the first end section is aligned with the second end section, and a position where the first housing is apart from the second housing by a specified distance while maintaining that the first end section is aligned with the second end section, the second direction being parallel to a stacking direction of the first housing with respect to the second housing,
the first connection section connects the first housing and the second housing such that the first housing and the second housing are relatively slidable with respect to each other in the lengthwise direction of the second housing,
the second connection section includes a bendable arm,
the bendable arm connects the first housing and the second housing such that the first housing and the second housing are movable along the second direction by bending or extending the bendable arm,
the device includes an elastic member that is fastened to the bendable arm and applies a force in a direction of extension of the bendable arm, and
when the first housing and the second housing are not connected by a stopper, the bendable arm is extended by the elastic member, and the first housing and the second housing are separated along the second direction by the bendable arm which is extended.

2. The device according to claim 1, further comprising:
the stopper that connects the first housing and the second housing such that the first housing and the second housing are removable from each other when the first end section flushes with the second end section;
wherein when the first housing and the second housing are connected by the stopper, the bendable arm is bent.

3. A device comprising:
a first housing including a first end section;
a second housing including a second end section; and
a first connection means and a second connection means that connect the first housing and the second housing,
wherein the first connection means connects the first housing and the second housing such that the first housing is movable with respect to the second housing along a first direction,
the second connection means connects the first housing and the second housing such that the first housing is movable with respect to the second housing along a second direction that is different from the first direction, between a position where the first housing and the second housing are overlapped so that the first end section is aligned with the second end section, and a position where the first housing is apart from the second housing by a specified distance while maintaining that the first end section is aligned with the second end section, the second direction being parallel to a stacking direction of the first housing with respect to the second housing,
the first connection means connects the first housing and the second housing such that the first housing and the second housing are relatively slidable with respect to each other in the lengthwise direction of the second housing,
the second connection means includes a bendable arm,
the bendable arm connects the first housing and the second housing such that the first housing and the second housing are movable along the second direction by bending or extending the bendable arm,
the device includes an elastic member that is fastened to the bendable arm and applies a force in a direction of extension of the bendable arm, and
when the first housing and the second housing are not connected by a stopper, the bendable arm is extended by the elastic member, and the first housing and the second housing are separated along the second direction by the bendable arm which is extended.

\* \* \* \* \*